US012586007B2

(12) United States Patent
Kichikawa et al.

(10) Patent No.: US 12,586,007 B2
(45) Date of Patent: Mar. 24, 2026

(54) INFORMATION PROCESSING SYSTEM AND METHOD OF INFORMATION PROCESSING

(71) Applicant: FRONTEO, Inc., Tokyo (JP)

(72) Inventors: Yuichi Kichikawa, Tokyo (JP); Toru Hisamitsu, Tokyo (JP)

(73) Assignee: FRONTEO, INC., Tokyo (JP)

( * ) Notice: Subject to any disclaimer, the term of this patent is extended or adjusted under 35 U.S.C. 154(b) by 299 days.

(21) Appl. No.: 18/458,728

(22) Filed: Aug. 30, 2023

(65) Prior Publication Data

US 2024/0112097 A1 Apr. 4, 2024

(30) Foreign Application Priority Data

Sep. 27, 2022 (JP) ................................. 2022-153775

(51) Int. Cl.
*G06Q 10/047* (2023.01)
*G06Q 10/087* (2023.01)
(52) U.S. Cl.
CPC ......... *G06Q 10/047* (2013.01); *G06Q 10/087* (2013.01)
(58) Field of Classification Search
CPC ............................... G06Q 10/06; G06Q 10/08
See application file for complete search history.

(56) References Cited

U.S. PATENT DOCUMENTS

| | | | | |
|---|---|---|---|---|
| 10,685,184 B1 * | 6/2020 | Arfa | ......................... | G06F 16/34 |
| 11,671,436 B1 * | 6/2023 | Xu | .......................... | G06F 18/24 |
| | | | | 726/22 |
| 2003/0172007 A1 * | 9/2003 | Helmolt | ........... | G06Q 10/06316 |
| | | | | 705/28 |

(Continued)

FOREIGN PATENT DOCUMENTS

| | | | |
|---|---|---|---|
| JP | 2005352637 A | * | 12/2005 |
| JP | 7034447 B1 | | 3/2022 |

OTHER PUBLICATIONS

Trouillon et al. ("Complex Embeddings for Simple Link Prediction", hereinafter Trouillon, 2016). (Year: 2016).*

(Continued)

*Primary Examiner* — Florian M Zeender
*Assistant Examiner* — Vanessa Deligi
(74) *Attorney, Agent, or Firm* — Rimon P.C.

(57) ABSTRACT

An information processing system includes, a supply-chain-network obtaining unit configured to obtain a supply chain network in which a plurality of nodes each corresponding to one of a plurality of companies are connected together through links, a subnetwork extracting unit configured to extract a subnetwork including at least one of an upstream subnetwork and a downstream subnetwork, the upstream subnetwork including an upstream company that supplies the product to a company corresponding to a processing target node among the plurality of companies, the downstream subnetwork including a downstream company that is supplied with the product from the company corresponding to the processing target node, a vector obtaining unit configured to determine a complex vector representing the processing target node, and a similarity calculating unit configured to calculate a similarity between two of the plurality of nodes in accordance with the two complex vectors corresponding to the two nodes.

10 Claims, 32 Drawing Sheets

(56) References Cited

U.S. PATENT DOCUMENTS

| | | | | |
|---|---|---|---|---|
| 2018/0197128 A1* | 7/2018 | Carstens | ............. | G06F 16/9024 |
| 2019/0073420 A1* | 3/2019 | Agapiev | ............... | G06F 16/951 |
| 2019/0188616 A1* | 6/2019 | Urban | ............... | G06Q 10/0875 |
| 2019/0303858 A1* | 10/2019 | Katsoulakos | ...... | G06Q 10/0835 |
| 2019/0354544 A1* | 11/2019 | Hertz | ..................... | G06N 5/025 |
| 2022/0101401 A1* | 3/2022 | Zhao | ..................... | G06Q 30/06 |
| 2022/0405772 A1 | 12/2022 | Hisamitsu et al. | | |
| 2023/0334417 A1* | 10/2023 | Lionello | ................ | G06Q 30/08 |
| 2024/0104462 A1* | 3/2024 | Nomoto | ........... | G06Q 10/06315 |

OTHER PUBLICATIONS

Takayuki Mizuno, Takaaki Ohnishi, Tsutomu Watanabe, "Structure of global buyer-supplier networks and its implications for conflict minerals regulations" EPJ Data Science, published on Jan. 16, 2016, (URL:https://doi.org/10.1140/epjds/s13688-016-0063-7).

* cited by examiner

| COMPANY NAME | INDUSTRIAL CLASSIFICATION | REPUTATION | COUNTRY |
|---|---|---|---|
| C1 | NONFERROUS-METAL PRIMARY SMELTING AND REFINING INDUSTRY | NO PROBLEM | α COUNTRY |
| C2 | SEMICONDUCTOR DEVICE MANUFACTURING INDUSTRY | HAVING TRACK RECORD OF BEING SANCTIONED | β COUNTRY |
| ⋮ | ⋮ | ⋮ | ⋮ |

| SALES SOURCE COMPANY | SALES DESTINATION COMPANY | TRADING PRODUCT |
|---|---|---|
| C1 | C10 | P1 |
| C10 | C5 | P2 |
| ⋮ | ⋮ | ⋮ |

FIG. 6

····COMPANY A

FIG. 13

$$
\begin{array}{lll}
\text{WITH-PHASE FLOW AMOUNT OF NODE 1} \rightarrow & 0.75\ e^{2i\Delta\theta} & \text{---- CONTRIBUTION TO NODE 8} \\
\text{WITH-PHASE FLOW AMOUNT OF NODE 2} \rightarrow & 0.25\ e^{2i\Delta\theta} & \text{---- CONTRIBUTION TO NODE 8} \\
\text{WITH-PHASE FLOW AMOUNT OF NODE 3} \rightarrow & 0.5\ e^{i\Delta\theta} & \text{---- CONTRIBUTION TO NODE 8} \\
\text{WITH-PHASE FLOW AMOUNT OF NODE 4} \rightarrow & 0.5\ e^{i\Delta\theta} & \text{---- CONTRIBUTION TO NODE 8} \\
\text{WITH-PHASE FLOW AMOUNT OF NODE 5} \rightarrow & 0 & \text{---- CONTRIBUTION TO NODE 8} \\
\text{WITH-PHASE FLOW AMOUNT OF NODE 6} \rightarrow & 0 & \text{---- CONTRIBUTION TO NODE 8} \\
\text{WITH-PHASE FLOW AMOUNT OF NODE 7} \rightarrow & 0 & \text{---- CONTRIBUTION TO NODE 8} \\
\text{WITH-PHASE FLOW AMOUNT OF NODE 8} \rightarrow & 1 & \text{NODE 8 ITSELF} \\
\text{WITH-PHASE FLOW AMOUNT OF NODE 9} \rightarrow & 0 & \text{---- CONTRIBUTION FROM NODE 8} \\
\text{WITH-PHASE FLOW AMOUNT OF NODE 10} \rightarrow & 0 & \text{---- CONTRIBUTION FROM NODE 8} \\
\text{WITH-PHASE FLOW AMOUNT OF NODE 11} \rightarrow & 0.5\ e^{-i\Delta\theta} & \text{---- CONTRIBUTION FROM NODE 8} \\
\text{WITH-PHASE FLOW AMOUNT OF NODE 12} \rightarrow & 0.5e^{-i\Delta\theta} & \text{---- CONTRIBUTION FROM NODE 8} \\
\text{WITH-PHASE FLOW AMOUNT OF NODE 13} \rightarrow & 0.25e^{-2i\Delta\theta} & \text{---- CONTRIBUTION FROM NODE 8} \\
\text{WITH-PHASE FLOW AMOUNT OF NODE 14} \rightarrow & 0.75\ e^{-2i\Delta\theta} & \text{---- CONTRIBUTION FROM NODE 8}
\end{array}
$$

FIG. 15A $$
\begin{pmatrix}
0.75\,e^{2i\Delta\theta} \\
0.25\,e^{2i\Delta\theta} \\
0.5\,e^{i\Delta\theta} \\
0.5\,e^{i\Delta\theta} \\
0 \\
0 \\
0 \\
1 \\
0 \\
0 \\
0.5\,e^{-i\Delta\theta} \\
0.5e^{-i\Delta\theta} \\
0.25e^{-2i\Delta\theta} \\
0.75e^{-2i\Delta\theta}
\end{pmatrix}
\Longleftrightarrow
\begin{pmatrix}
0.75\,e^{i\Delta\theta} \\
0.25\,e^{i\Delta\theta} \\
0.5\,e^{2i\Delta\theta} \\
0.5\,e^{2i\Delta\theta} \\
0 \\
0 \\
1 \\
0 \\
0 \\
0 \\
0.5\,e^{-2i\Delta\theta} \\
0.5e^{-2i\Delta\theta} \\
0.25e^{-i\Delta\theta} \\
0.75e^{-i\Delta\theta}
\end{pmatrix}
$$

FIG. 15B $$
\begin{pmatrix}
0.75 \\
0.25 \\
0.5 \\
0.5 \\
0 \\
0 \\
0 \\
1 \\
0 \\
0 \\
0.5 \\
0.5 \\
0.25 \\
0.75
\end{pmatrix}
\Longleftrightarrow
\begin{pmatrix}
0.75 \\
0.25 \\
0.5 \\
0.5 \\
0 \\
0 \\
1 \\
0 \\
0 \\
0 \\
0.5 \\
0.5 \\
0.25 \\
0.75
\end{pmatrix}
$$

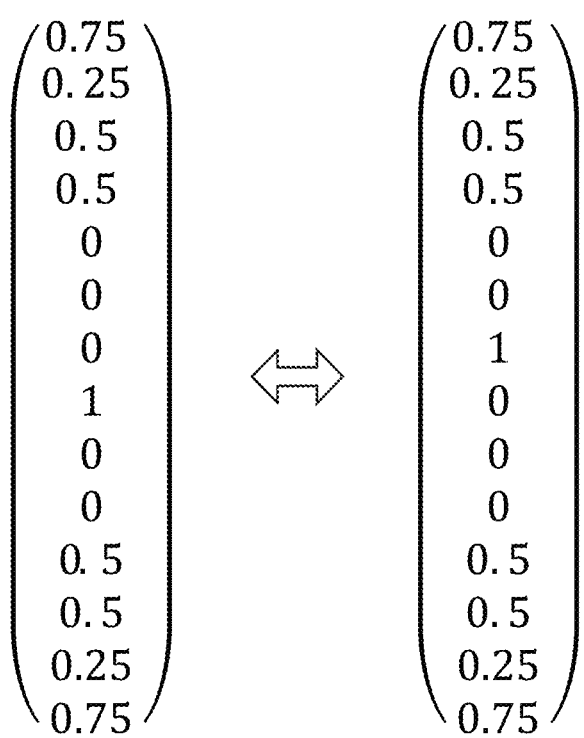

| INDUSTRIAL CLASSIFICATION THAT IS TO BE DELETED |
|---|
| ⬭ IC1 |
| ⬭ IC2 |
| ⬭ IC3 |
| ⬭ IC4 |
| ⬭ IC5 |
| ⬭ IC6 |
| ⬭ IC7 |
| ⋮ |

FIG. 27

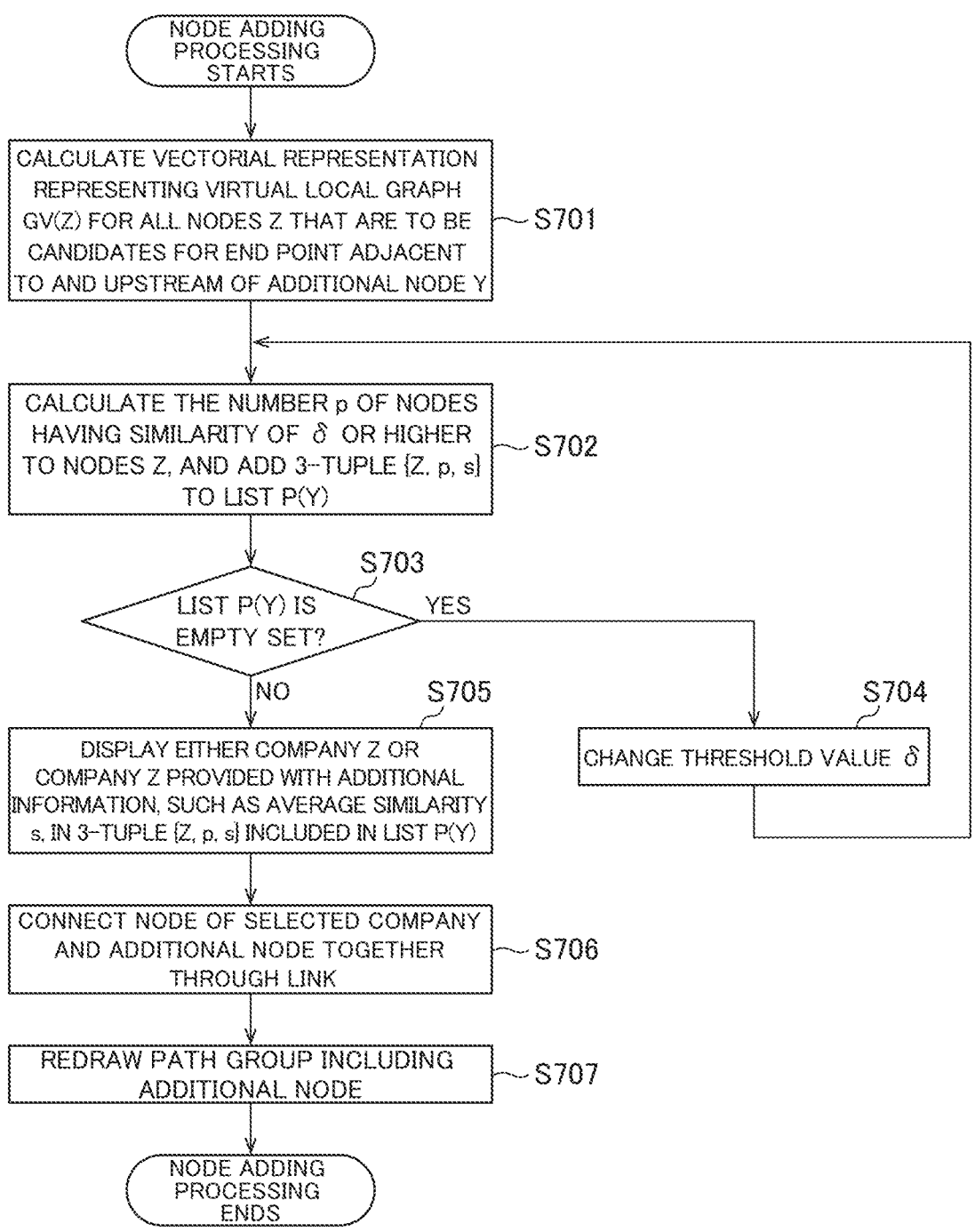

NODE ADDING
PROCESSING
STARTS

CALCULATE VECTORIAL REPRESENTATION
REPRESENTING VIRTUAL LOCAL GRAPH
GV(Z) FOR ALL NODES Z THAT ARE TO BE
CANDIDATES FOR END POINT ADJACENT
TO AND UPSTREAM OF ADDITIONAL NODE Y ⟩~S701

CALCULATE THE NUMBER p OF NODES
HAVING SIMILARITY OF $\delta$ OR HIGHER
TO NODES Z, AND ADD 3-TUPLE {Z, p, s}
TO LIST P(Y) ⟩~S702

S703
LIST P(Y) IS
EMPTY SET?          YES

NO          S705

DISPLAY EITHER COMPANY Z OR
COMPANY Z PROVIDED WITH ADDITIONAL
INFORMATION, SUCH AS AVERAGE SIMILARITY
s, IN 3-TUPLE {Z, p, s} INCLUDED IN LIST P(Y)

S704
CHANGE THRESHOLD VALUE $\delta$

CONNECT NODE OF SELECTED COMPANY
AND ADDITIONAL NODE TOGETHER
THROUGH LINK ⟩~S706

REDRAW PATH GROUP INCLUDING
ADDITIONAL NODE ⟩~S707

NODE ADDING
PROCESSING
ENDS

FIG. 36

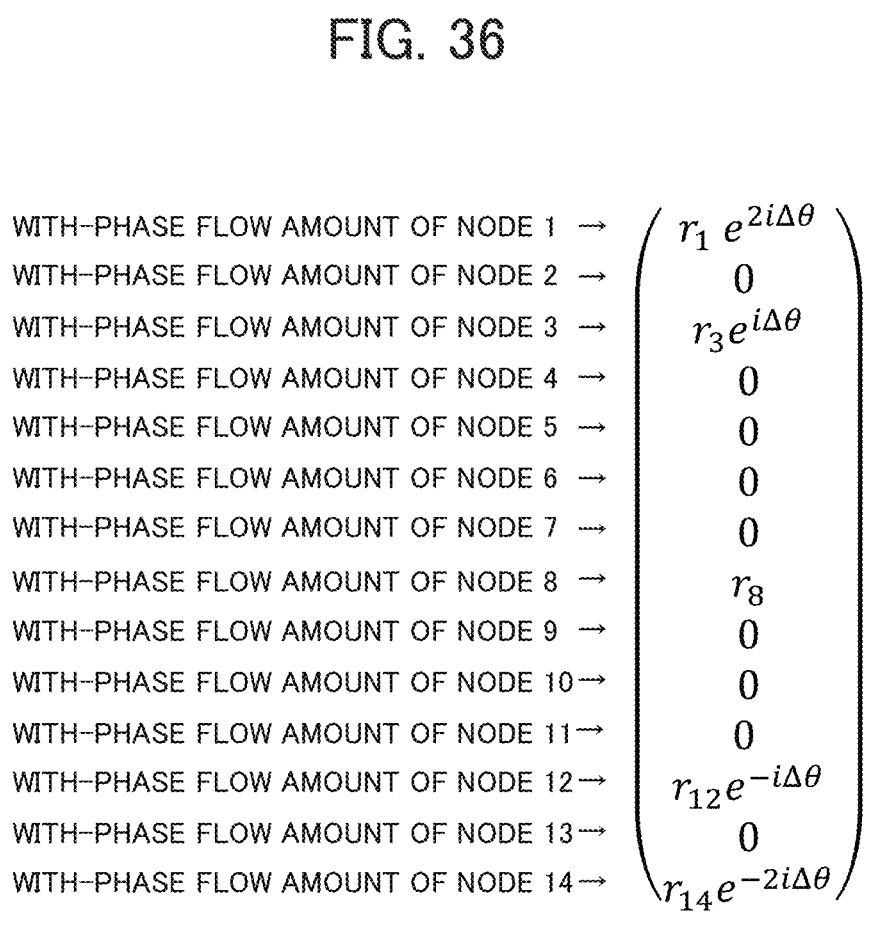

WITH-PHASE FLOW AMOUNT OF NODE 1 → $\begin{pmatrix} r_1\,e^{2i\Delta\theta} \\ 0 \\ r_3 e^{i\Delta\theta} \\ 0 \\ 0 \\ 0 \\ 0 \\ r_8 \\ 0 \\ 0 \\ 0 \\ r_{12}e^{-i\Delta\theta} \\ 0 \\ r_{14}e^{-2i\Delta\theta} \end{pmatrix}$

WITH-PHASE FLOW AMOUNT OF NODE 2 →

WITH-PHASE FLOW AMOUNT OF NODE 3 →

WITH-PHASE FLOW AMOUNT OF NODE 4 →

WITH-PHASE FLOW AMOUNT OF NODE 5 →

WITH-PHASE FLOW AMOUNT OF NODE 6 →

WITH-PHASE FLOW AMOUNT OF NODE 7 →

WITH-PHASE FLOW AMOUNT OF NODE 8 →

WITH-PHASE FLOW AMOUNT OF NODE 9 →

WITH-PHASE FLOW AMOUNT OF NODE 10 →

WITH-PHASE FLOW AMOUNT OF NODE 11 →

WITH-PHASE FLOW AMOUNT OF NODE 12 →

WITH-PHASE FLOW AMOUNT OF NODE 13 →

WITH-PHASE FLOW AMOUNT OF NODE 14 →

INFORMATION PROCESSING SYSTEM AND METHOD OF INFORMATION PROCESSING

CROSS-REFERENCE TO RELATED APPLICATION

The present application claims priority from Japanese Application JP2022-153775, filed Sep. 27, 2022, the content of which is hereby incorporated by reference into this application.

BACKGROUND OF THE INVENTION

1. Field of the Invention

The present invention relates to, but not limited to, an information processing system and a method of information processing.

2. Description of the Related Art

Various conventional techniques are known for supply chain analysis. A supply chain is a series of flow starting from the procurement of the raw materials and components of a product to the manufacture, inventory management, delivery, sale, and consumption of the product.

For instance, Japanese Patent No. 7034447 discloses an information processing system that analyzes, in a supply chain, a subnetwork including at least one of upstream and downstream subnetworks of a company of interest, and that displays the analysis result.

Further, Takayuki Mizuno, Takaaki Ohnishi, Tsutomu Watanabe, "Structure of global buyer-supplier networks and its implications for conflict minerals regulations" EPJ Data Science, published on Jan. 16, 2016, (URL:https://doi.org/10.1140/epjds/s13688-016-0063-7) discloses a technique of extracting a company with high relevance through a community breakdown technique.

SUMMARY OF THE INVENTION

The method in Japanese Patent No. 7034447 fails to disclose the similarity between companies. Further, the community breakdown technique in "Structure of global buyer-supplier networks and its implications for conflict minerals regulations" is a technique of determining a binarized index indicating whether companies belong to the same community and thus does not facilitate evaluation on a company belonging to the community's boundary.

Some aspects of the present disclosure can offer an information processing system and a method of information processing that properly determines the similarity between companies in a supply chain network.

One aspect of the present disclosure relates to an information processing system including the following: a supply-chain-network obtaining unit configured to obtain a supply chain network in which a plurality of nodes each corresponding to one of a plurality of companies are connected together with links each representing a trading relationship in which a supply source company of a product is associated with a supply destination company of the product; a sub-network extracting unit configured to extract, from the supply chain network, a subnetwork including at least one of an upstream subnetwork and a downstream subnetwork, the upstream subnetwork including an upstream company that supplies the product to a company corresponding to a processing target node among the plurality of companies, the downstream subnetwork including a downstream company that is supplied with the product from the company corresponding to the processing target node; a vector obtaining unit configured to determine a complex vector representing the processing target node by assigning, to each of the plurality of nodes included in the subnetwork of the processing target node, a complex number having a phase corresponding to the distance to the processing target node, and having an absolute value corresponding to the amount of flow going to or coming from the processing target node; and a similarity calculating unit configured to calculate the similarity between two of the plurality of nodes in accordance with the two complex vectors corresponding to the two nodes.

Another aspect of the present disclosure relates to a method of information processing, including the following: obtaining a supply chain network in which a plurality of nodes each corresponding to one of a plurality of companies are connected together through links each representing a trading relationship in which a supply source company of a product is associated with a supply destination company of the product; extracting, from the supply chain network, a subnetwork including at least one of an upstream subnetwork and a downstream subnetwork, the upstream subnetwork including an upstream company that supplies the product to a company corresponding to a processing target node among the plurality of companies, the downstream subnetwork including a downstream company that is supplied with the product from the company corresponding to the processing target node; determining a complex vector representing the processing target node by assigning, to each of the plurality of nodes included in the subnetwork of the processing target node, a complex number having a phase corresponding to the distance to the processing target node, and having an absolute value corresponding to the amount of flow going to or coming from the processing target node; and calculating the similarity between two of the plurality of nodes in accordance with the two complex vectors corresponding to the two nodes.

BRIEF DESCRIPTION OF THE DRAWINGS

FIG. 6 is a schematic diagram illustrating the supply chain network;

FIG. 13 illustrates an example complex vector corresponding to a given node;

FIG. 15A illustrates an example of the similarity calculation processing;

FIG. 15B illustrates a comparative example where similarity calculation is executed without a phase;

FIG. 27 is a flowchart showing the node adding processing;

FIG. 36 illustrates an eigenvector; and

DETAILED DESCRIPTION OF THE INVENTION

The following describes an embodiment with reference to the drawings. Identical or equivalent constituents will be denoted by the same signs throughout the drawings, and redundant descriptions related to the identical or equivalent constituents, if any, will be omitted as appropriate. It is noted that the embodiment described below shall not limit what are recited in the claims. It is also noted that all configurations that will be described in the embodiment are not necessarily essential components of the present disclosure. As long as the functions that will be described in the present disclosure are carried out, the configurations that will be described in the embodiment may be omitted as appropriate.

1. Example System Configuration

Figure 1:
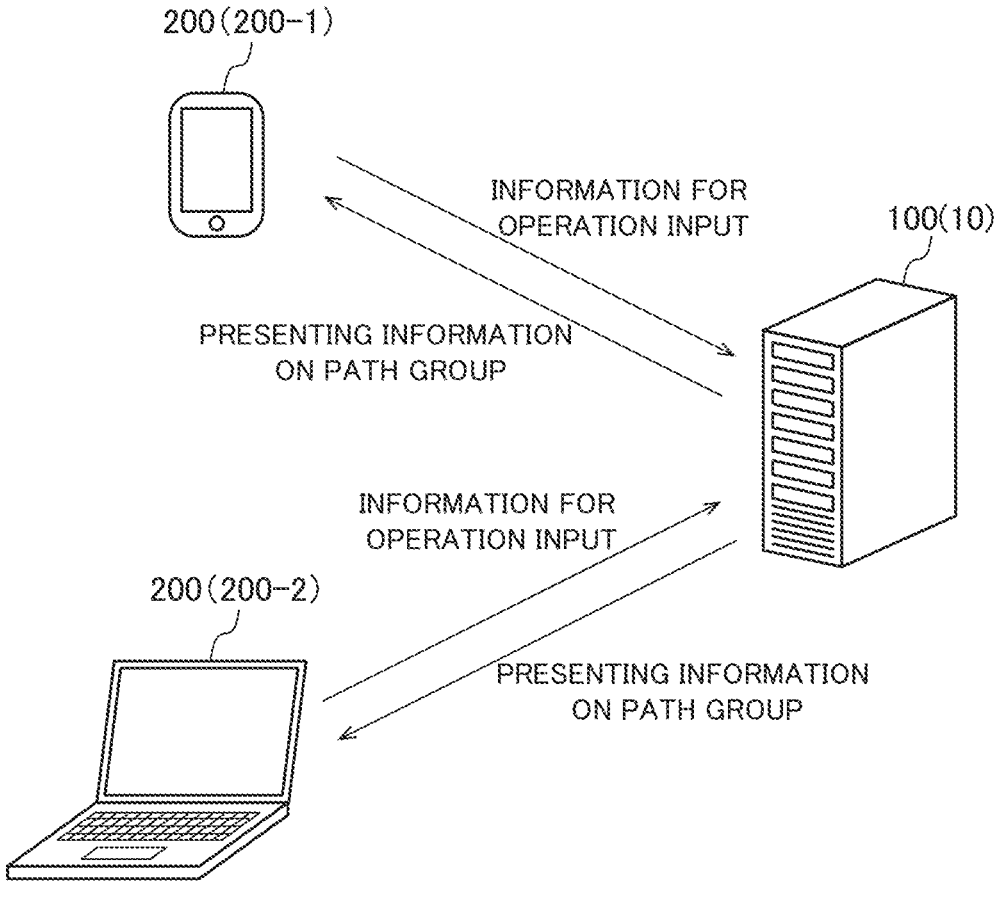
FIG. 1 illustrates an example configuration of a system including an information processing system according to an embodiment.

FIG. 1 is an example configuration of a system including an information processing system 10 according to an embodiment. The system according to this embodiment includes a server system 100, and a terminal device 200. It is noted that the configuration of the system including the information processing system 10 shall not be limited to the configuration in FIG. 1; the system can be modified in various manners such that, for instance, the configuration may be omitted partly, or another configuration may be added. Although FIG. 1 illustrates, by way of example, the terminal device 200 composed of two terminal devices, i.e., a terminal device 200-1 and a terminal device 200-2, the terminal device 200 may be composed of any number of terminal devices. Further, the same applies to FIGS. 2 and 3, which will be described later on, regarding modifications such as omission and addition of constituent elements.

The information processing system 10 in this embodiment corresponds to, for instance, the server system 100. It is noted that the technique in this embodiment is not limited to the foregoing; the information processing system 10 may execute a process, which will be described in the Specification, through distribution processing by the use of the server system 100 and another device. For instance, the information processing system 10 in this embodiment may be implemented through distribution processing by the use of the server system 100 and terminal device 200. The Specification will describe an instance where the information processing system 10 is a server system 100.

The server system 100 may include a single server or include a plurality of servers. For instance, the server system 100 may include a database server and an application server. The database server stores various kinds of data, including a supply chain network 121, which will be described later on. The application server executes processing that will be described later on with reference to, but not limited to, FIGS. 4, 7, 8, 11A, 11B, 16, 23, 27, 33 and 35. It is noted that the plurality of servers herein may be physical servers or may be virtual servers. It is also noted that when virtual servers are used, they may be provided to a single physical server or may be distributed to a plurality of physical servers. As described above, a specific configuration of the server system 100 in this embodiment can be modified in various manners.

The terminal device 200 is a device that is used by a user of the information processing system 10. The terminal device 200 may be a personal computer (PC), a mobile terminal device, such as a smartphone, or any other like device having a function that will be described in the Specification.

The server system 100 is communicably connected to a terminal device 200-1 and a terminal device 200-2 over, for instance, a network. Hereinafter, a plurality of terminal devices will be simply referred to as a terminal device 200 unless these terminal devices have to be distinguished from each other. The network, which is herein a public communication network, such as the Internet, may be a local area network (LAN) or other things.

The information processing system 10 in this embodiment is an open-source intelligence (OSINT) system for, but not limited to, collecting, and analyzing data related to a target by the use of, for instance, open information. The open information herein includes various kinds of information widely accessible and legally available. Examples of the open information may include securities reports, inter-industry relations tables, official announcements of a government, news reports on countries and companies, and supply chain databases. Further, the open information may include various kinds of information that are transmitted and received via a social networking service (SNS). For instance, the SNS may include services that allow texts, images or other things to be posted, and the open information in this embodiment may include these texts or images or include their results obtained through natural language processing, image processing or other processing.

The server system 100 generates nodes including various attributes in accordance with open information. A single node represents a given entity. The entity herein is a company. Attributes provided to a node are various kinds of information, such as the company's name, nationality, business field, industrial classification, trading partners, and trading goods, that are determined based on open information. When a node representing an entity is a company, the node is provided with attributes related to the company including the company's industrial classification. It is noted that the attributes herein may include, but not limited to, sales, the number of employees, shareholders and their capital contribution ratios, and board members. In this embodiment, among the attributes, at least an industrial classification is provided to the node. The industrial classification is a kind of an industry classified by a characteristic of the industry. Industrial classification codes, for instance, may be used as an industrial classification. The industrial classification codes are information with a code, such as "01", assigned to individual industries classified into several fields.

When the attributes of a given node include an attribute including the relationship with another node, the given node and the other node are connected together through a link having a direction. For instance, let a given company provide (sell) a trading product of some sort to another company. In this case, a node corresponding to the other company and a node corresponding to the given company are connected together through a link representing the product's buy-sell relationship (distribution relationship). The link herein is a link having a direction from an influencing entity to an influenced entity, that is, for instance, from a seller to a buyer of a product of some sort. That is, the link represents a trading relationship in which a supply source company of a product is associated with a supply destination company of the product.

In the technique of this embodiment, the server system 100 obtains an entity network, which is a network in which a plurality of nodes representing a plurality of entities (e.g., companies) are connected together through a plurality of links representing trading relationships. The links have directions; hence, the entity network is a directed graph. The server system 100 conducts an analysis based on the entity network and executes processing to present the results of the analysis. For instance, the terminal device 200 is a device that is used by the user of a service provided by an OSINT system. For instance, the user uses the terminal device 200 to send a request to the server system 100, which is the information processing system 10, to conduct an analysis of some sort. The server system 100 conducts an analysis based on the entity network and transmits the results of the analysis to the terminal device 200. The entity network in this embodiment is, in the narrow sense, the supply chain network 121 representing a supply chain. Hereinafter, the entity network in this embodiment will be described as being the supply chain network 121.

Figure 2:
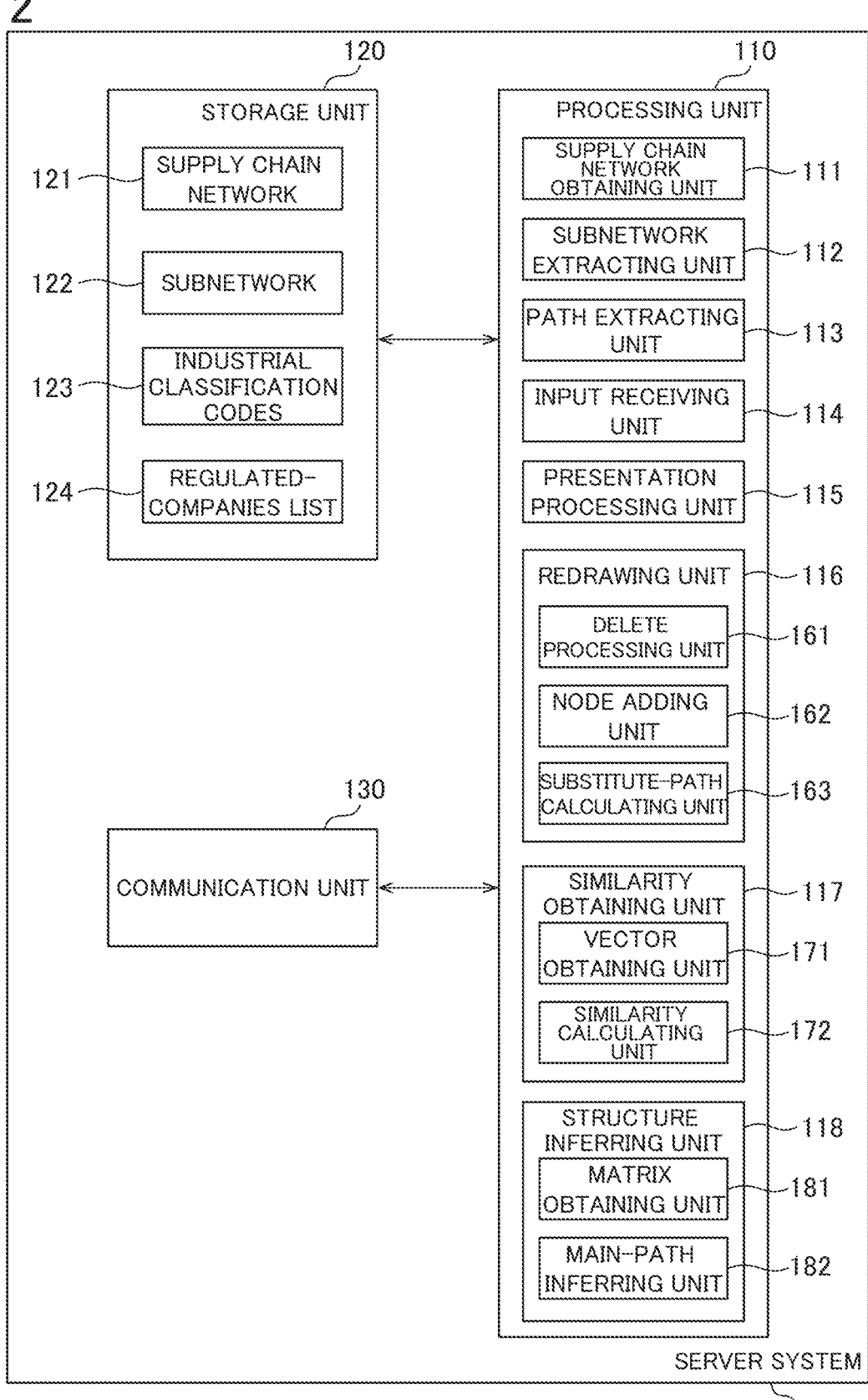
FIG. 2 is a functional block diagram illustrating an example detailed configuration of a server system in FIG. 1.

FIG. 2 is a functional block diagram illustrating an example detailed configuration of the server system 100. The server system 100 includes, as illustrated in FIG. 2 for instance, a processing unit 110, a storage unit 120, and a communication unit 130.

The processing unit 110 in this embodiment is composed of hardware below. The hardware can include at least one of a digital-signal processing circuit and an analog-signal processing circuit. For instance, the hardware can be composed of one or more circuit devices mounted on a circuit board, or one or more circuit elements mounted on the same. Example of one or more circuit devices include integrated circuits (ICs) and field-programmable gate arrays (FPGAs). Examples of one or more circuit elements include resistors and capacitors.

Further, the processing unit 110 may be implemented in the form of a processor below. The server system 100 in this embodiment includes a memory that stores information, and a processor that operates on the basis of the information stored in the memory. Examples of the information include a program and various kinds of data. The program may include a program to cause the server system 100 to execute processing that will be described in the Specification. The processor includes hardware. The processor can include various kinds of processor, such as a central processing unit (CPU), a graphics processing unit (GPU), and a digital signal processor (DSP). The memory may be a semiconductor memory, such as a static random access memory (SRAM), a dynamic random access memory (DRAM), or a flash memory; alternatively, the memory may be a resistor; alternatively, the memory may be a magnetic storage device, such as a hard disk drive (HDD); alternatively, the memory may be an optical storage device, such as an optical disc drive. For instance, the memory holds a computer-readable instruction, and the processor executes this instruction, thus implementing the function of the processing unit 110 as a process. The instruction herein may be a set of instructions constituting the program, or an instruction for instructing a hardware circuit of the processor to operate.

The processing unit 110 includes, for instance, a supply-chain-network obtaining unit 111, a subnetwork extracting unit 112, a path extracting unit 113, an input receiving unit 114, a presentation processing unit 115, a redrawing unit 116, a similarity obtaining unit 117, and a structure inferring unit 118.

The supply-chain-network obtaining unit 111 obtains the supply chain network 121. For instance, the supply-chain-network obtaining unit 111 may generate, to obtain, the supply chain network 121 in accordance with open information. The open information includes trading relationship information in which a supply source company of a product is associated with a supply destination company of the product. The supply-chain-network obtaining unit 111 stores the generated supply chain network 121 in the storage unit 120. It is noted that the supply chain network 121 may be generated by a system different from the information processing system 10 according to this embodiment. The supply-chain-network obtaining unit 111 in this case may execute processing to obtain the generated result from this different system.

As will be described later on with reference to FIGS. 5A to 5C, the supply chain network obtaining unit 111 may obtain, for instance, a network in which a plurality of nodes corresponding to a plurality of companies are connected together, as the supply chain network 121 in accordance with the trading relationships between the companies.

The subnetwork extracting unit 112 executes processing to extract, as the subnetwork 122, a part of the supply chain network 121 obtained by the supply chain network obtaining unit 111. The subnetwork 122 is a directed graph including, for instance, a node group directly or indirectly connected to a node representing a specific company in the supply chain network 121.

The specific company herein is one of a plurality of companies represented by nodes included in the supply chain network 121. The specific company may be, for instance, a company that is a reference for analysis in the information processing system 10. The specific company may be selected by, for instance, the user of the information processing system 10 carrying out a predetermined operation input. The specific company will be hereinafter also referred to as a "first company" in the Specification.

The subnetwork extracting unit 112 extracts the subnetwork 122, which is a portion related to the first company in the supply chain network 121. The subnetwork 122 herein includes at least one of an upstream subnetwork, which includes an upstream company that supplies the first company with a product, and a downstream subnetwork, which includes a downstream company that is supplied with the product from the first company. In the Specification, the term upstream means the start of a link, that is, a provider of a commodity to another company. The term downstream means the end of a link, that is, a receiver of a commodity from another company. The upstream company includes a company that directly provides a commodity to the first company. It is noted that the upstream company in this embodiment may include a company located upstream of another upstream company. That is, the upstream company may include a company connected to the first company via another company. Likewise, the downstream company may include a company that directly receives a commodity from the first company, and a company located downstream of another downstream company.

It is noted that the specific company that is a reference for extracting the subnetwork 122 may be a company that is a target for vectorial representation calculation. In this case, the plurality of companies included in the supply chain network 121 may be selected sequentially as the specific company.

The subnetwork extracting unit 112 may store the extracted subnetwork 122 in the storage unit 120.

The path extracting unit 113 extracts, in the subnetwork 122 extracted by the subnetwork extracting unit 112, a path group including one or more paths. A path herein is a route from one node to another node through one or more links. That is, a path is a route connecting one node and another node together through one or more links.

The path extracting unit 113 in this embodiment extracts a path group including one or more paths connecting a node representing the first company and a node representing a second company together through one or more links. The second company is one of the plurality of companies represented by the nodes included in the supply chain network 121 and is different from the first company. The second company may be designated by, for instance, the user carrying out a predetermined operation input to the input receiving unit 114. Alternatively, as to the second company, in accordance with a designated condition received by the input receiving unit 114, the path extracting unit 113 may automatically determine, as the second company, a company matching the designated condition. The second company may be, for instance, a regulated company whose trading is regulated; more specifically, the second company may be a company having a problem in view of environment, social, and governance (ESG). Alternatively, the second company may be a company corresponding to a chokepoint in the subnetwork 122.

The path extracting unit 113 can extract a path satisfying a specific condition from among the paths connecting the node representing the first company and the node representing the second company through one or more links, and the path extracting unit 113 can determine the extracted path as the path group. The specific condition may be determined as appropriate. The specific condition may be the shortest path for instance. When the specific condition is the shortest path, the path extracting unit 113 extracts a path having the fewest links to travel through, from among the paths connecting the node representing the first company and the node representing the second company through one or more links. The specific condition may be determined based on, for instance, a user's operation input. This embodiment will describe below the specific condition as being the shortest path.

The input receiving unit 114 executes processing to receive an operation input carried out by the user of the information processing system 10. For instance, the input receiving unit 114 can receive such a user's operation input by receiving, from the terminal device 200 via the communication unit 130, an operation signal related to the user's operation input carried out on an operation unit 250 of the terminal device 200. Alternatively, the input receiving unit 114 may receive such a user's operation input carried out on an operation unit (input interface), which is not shown, included in the information processing system 10.

The operation input herein includes an operation to select the first company. The operation input may include an operation to select the second company. The operation input may include an input of a condition for the path extracting unit 113 to determine the second company. Further, the operation input in this embodiment includes an operation input for path redrawing. The operation input for path redrawing will be detailed later on.

The presentation processing unit 115 executes processing to present, to the user, the path group extracted by the path extracting unit 113. The presentation processing unit 115 in this embodiment further executes processing to present, to the user, the path group redrawn by the redrawing unit 116. For instance, the presentation processing unit 115 executes processing to display a display screen. The display screen is a screen that is displayed on, for instance, a display unit 240 of the terminal device 200. For instance, the presentation processing unit 115 executes processing to generate the display screen, and to transmit the display screen to the terminal device 200 via the communication unit 130. Further, the processing shall not be limited to the transmission of a display screen per se; the presentation processing unit 115 may execute processing to transmit information (e.g., markup language) capable of generating a display screen. It is noted that the display screen may be displayed on a device other than the terminal device 200 of the server system 100 or other things. It is also noted that the presentation processing in the presentation processing unit 115 shall not be limited to display processing; the presentation processing may include output processing by the use of sound or other means.

The redrawing unit 116 redraws the path group extracted by the path extracting unit 113. The redrawing unit 116 redraws the path group in accordance with, for instance, the operation input for path redrawing received by the input receiving unit 114. The redrawing unit 116 in this embodiment includes a delete processing unit 161, a node adding unit 162, and a substitute-path calculating unit 163. It is noted that the redrawing unit 116 does not necessarily have to include all of the delete processing unit 161, node adding unit 162 and substitute-path calculating unit 163; the redrawing unit 116 needs to include at least any one of these units.

The delete processing unit 161 executes delete processing to delete a specific node on the path extracted by the path extracting unit 113. The node adding unit 162 executes node adding processing to add the node of a new company to the path group extracted by the path extracting unit 113. The substitute-path calculating unit 163 executes substitute-path calculating processing to calculate a substitute path similar to a path included in the path group extracted by the path extracting unit 113. The deletion processing, the node adding processing, and the substitute-path calculating processing will be detailed later on.

The similarity obtaining unit 117 determines the similarity between a given node included in the supply chain network 121 and another node. The similarity obtaining unit 117 includes a vector obtaining unit 171 and a similarity calculating unit 172. The vector obtaining unit 171 determines the vectorial representation of each node included in the supply chain network 121. How to determine the vectorial representation will be detailed later on with reference to FIGS. 11A to FIG. 14 and other things. The similarity calculating unit 172 executes processing to calculate the similarity between these two nodes in accordance with the vectorial representation. The similarity herein is, for instance, numeric data that increases along with increase in the degree of similarity. The similarity calculating processing will be detailed later on with reference to FIG. 15 and other things.

The structure inferring unit 118 executes processing to analyze the network structure of the supply chain network 121. The structure inferring unit 118 includes a matrix obtaining unit 181 and a main-path inferring unit 182. The matrix obtaining unit 181 determines a complex correlation matrix C in accordance with the similarity obtained by the similarity obtaining unit 117. The main-path inferring unit 182 executes processing to infer the main path in the supply chain network 121 by subjecting the complex correlation matrix C to eigenvalue decomposition. The individual processing will be detailed later on with reference to FIGS. 35 to 37.

The storage unit 120 is the working region of the processing unit 110 and stores various kinds of information. The storage unit 120 can be implemented in the form of various kinds of memory; the memory may be a semiconductor memory, such as an SRAM, a DRAM, a ROM, and a flash memory; alternatively, the memory may be a resistor; alternatively, the memory may be a magnetic storage device, such as a hard disk drive; alternatively, the memory may be an optical storage device, such as an optical disc drive.

The storage unit 120 stores, for instance, the supply chain network 121 obtained by the supply-chain-network obtaining unit 111. The storage unit 120 also stores, for instance, the subnetwork 122 extracted by the subnetwork extracting unit 112. Further, the storage unit 120 may store open information, such as securities reports and inter-industry relations tables. The storage unit 120 may also store, but not limited to, industrial classification codes 123 and a regulated-companies list 124. The industrial classification codes 123 are information with a code, such as "01", assigned to each of industries classified into several fields. The regulated-companies list 124 is information for identifying a company having a problem in view of, for example, the ESG. Other than the foregoing, the storage unit 120 can store various kinds of information on the processing that is executed in this embodiment.

The communication unit 130 is an interface for communication over a network and includes, for instance, an antenna, a radio frequency (RF) circuit, and a baseband circuit. The communication unit 130 may operate under the control of the processing unit 110 or may include a communication controlling processor different from the processing unit 110. The communication unit 130 is an interface for performing communication in accordance with, for instance, the transmission control protocol/Internet protocol (TCP/IP). It is noted that the specific communication scheme can be modified in various manners.

Figure 3:
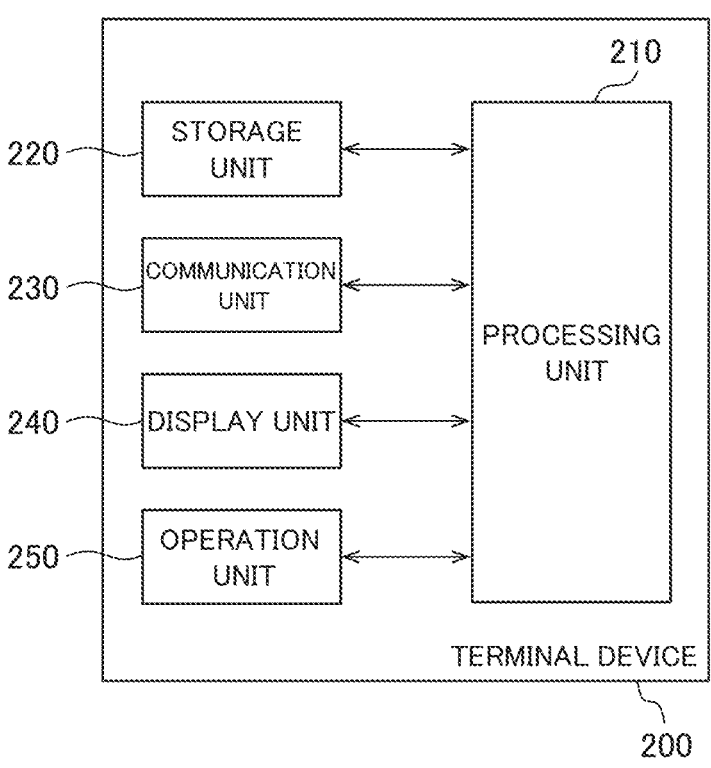
FIG. 3 is a functional block diagram illustrating an example detailed configuration of a terminal device in FIG. 1.

FIG. 3 is a block diagram illustrating an example detailed configuration of the terminal device 200. The terminal device 200 includes a processing unit 210, a storage unit 220, a communication unit 230, the display unit 240, and the operation unit 250.

The processing unit 210 is composed of hardware including at least one of a digital-signal processing circuit and an analog-signal processing circuit. Further, the processing unit 210 may be implemented in the form of a processor. The processor can include various processors, such as a CPU, a GPU, and a DSP. The processor executes an instruction stored in the memory of the terminal device 200, so that the function of the processing unit 210 is implemented in the form of processing.

The storage unit 220 is the working region of the processing unit 210 and is implemented in the form of various memories, such as an SRAM, a DRAM, and a ROM The communication unit 230 is an interface for communication over a network and includes, for instance, an antenna, an RF circuit, and a baseband circuit. The communication unit 230 communicates with the server system 100 over, for instance, a network.

The display unit 240 is an interface that displays various kinds of information. The display unit 240 may be a liquid crystal display, an organic EL display, or a display that operates under any other scheme. The operation unit 250 is an interface that receives a user's operation input. The operation unit 250 may be, for instance, a button provided in the terminal device 200. Further, the display unit 240 and the operation unit 250 may be combined together to constitute a touch panel.

2. Flow of Processing 2.1 Overall Flow

Figure 4:
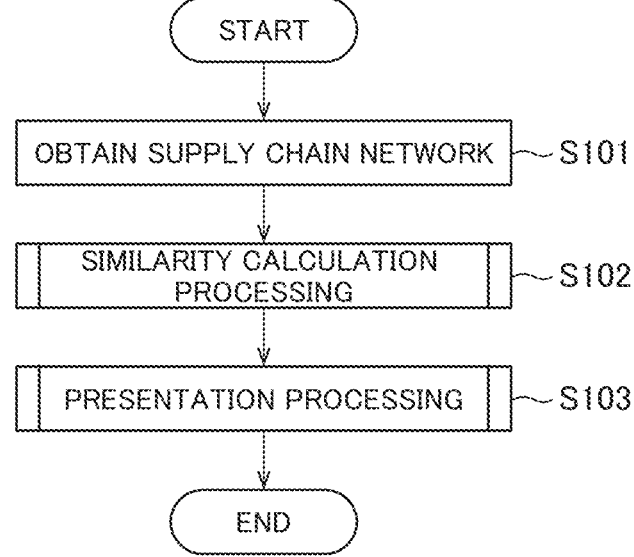
FIG. 4 is a flowchart schematically showing processing that is executed in the information processing system in FIG. 1.

FIG. 4 is a flowchart schematically illustrating processing that is executed in the information processing system 10 in this embodiment.

In the first process step, i.e., Step S101, the supply-chain-network obtaining unit 111 obtains the supply chain network 121. The supply-chain-network obtaining unit 111 stores the supply chain network 121 into the storage unit 120.

In Step S102, the similarity obtaining unit 117 calculates the similarity between the plurality of nodes included in the supply chain network 121 obtained in Step S101. The similarity obtaining unit 117 stores the calculated similarity into the storage unit 120.

In Step S103, the information processing system 10 executes processing to present information based on a user's operation input in the supply chain network 121. The processing in Step S103 includes, but not limited to, receiving an input to select the first company, identifying the second company, presenting a path group connecting the first company and second company together, as will be described later on. Further, this path group presentation may include determining a presentation target path in accordance with the similarity determined in Step S102.

The following details processing in each step.

2.2 Obtainment of Supply Chain Network

Processing to obtain the supply chain network 121, which corresponds to Step S101 in FIG. 4, will be described. The supply-chain-network obtaining unit 111 may generate the supply chain network 121 in accordance with open information. The open information includes information, such as securities reports and press releases.

The supply-chain-network obtaining unit 111 identifies various kinds of information, such as the name, nationality, business field, business partner and trading goods of a company, for each of many companies. The supply-chain-network obtaining unit 111 may also identify the number of employees, shareholders as well as their capital contribution ratio, and board members of each company in accordance with the open information.

The supply-chain-network obtaining unit 111 may also obtain reputation information indicating a reputation of each company in accordance with the open information. For instance, the reputation information is information indicating, but not limited to, whether a target company has a problem or a history of being sanctioned in view of environment, social, and governance (ESG). For instance, the reputation information may be information indicating, but not limited to, that the target company is a company violated export regulations, a company handling conflict minerals, a company involved in slave labor, or a company involved in illegal logging. Further, the open information may be a document issued by, for instance, a government institute, and the reputation information may be information indicating whether the target company is subjected to restriction on trade with a predetermined country or other things. Further, as earlier described, the open information may include information on the SNS; the reputation information herein may be information determined based on the SNS. For instance, the supply-chain-network obtaining unit 111 may obtain the reputation information in accordance with SNS information sent from the official account of, for instance, a company. Further, the SNS information that is used in the technique in this embodiment shall not be limited to information sent from an official account. For instance, on the SNS, when a predetermined number or more of users have sent out the name of a given company along with a word, such as "conflict minerals", "slave labor", or "illegal logging", the given company may be associated with negative reputation information.

Figures 5A, 5B, 5C:
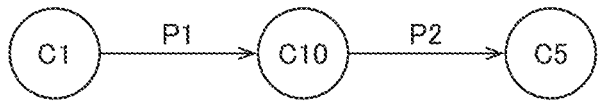
FIG. 5A illustrates an example structure of data that is obtained in accordance with open information.
FIG. 5B illustrates an example structure of data that is obtained in accordance with the open information.
FIG. 5C illustrates an example of part of a supply chain network that is obtained in accordance with the open information.

FIGS. 5A and 5B illustrate example structures of data that is obtained based on the open information. As illustrated in FIG. 5A, the supply-chain-network obtaining unit 111 obtains information in which each of the companies included in the open information is associated with a company name, an industrial classification, a reputation, and a nationality.

The company name is, for instance, text data indicating the name of a target company. The industrial classification is information indicating the business field of the target company. The reputation is, as described above, information indicating whether the target company has a problem in view of ESG. The nationality is information indicating a country to which the target company belongs.

It is noted that although the industrial classification is shown in the form of text in FIG. 5A, the information indicating the industrial classification may be denoted by an industrial classification code. For the Japan Standard Industrial Classification for instance, a code "231" is assigned to the primary smelting and refining of non-ferrous metals, and a code "2813" is assigned to the semiconductor devices. It is noted that the industrial classification shall not be limited to the Japan Standard Industrial Classification. For instance, the industrial classification may be another classification, such as the International Standard Industry Classification or the North American Industry Classification System (NA-ICS). Further, for the industrial classification code, various codes can be used in conformance with the industrial classification. For convenience in description, the industrial classification will be hereinafter text indicating a classification name. It is noted that a classification name in the processing below can be substituted for an industrial classification code. Further, the storage unit 120 may include the industrial classification code 123, as illustrated in FIG. 2. The industrial classification code 123 is information in which, for instance, a classification name and a classification code in the Japan Standard Industrial Classification are associated with each other. The processing unit 110 may execute conversion processing between the classification name and classification code in accordance with the industrial classification code 123.

Further, as illustrated in FIG. 5B, the supply-chain-network obtaining unit 111 obtains information indicating a company-to-company transaction in accordance with the open information. For instance, the trading relationship information included in the open information is the information illustrated in FIG. 5B, or information capable of identifying the information illustrated in FIG. 5B. The information indicating the company-to-company transaction is information in which, for instance, information identifying a sales source company, information identifying a sales destination company, and information identifying a product to be traded are associated with one another.

In accordance with these items of information, the supply-chain-network obtaining unit 111 generates the supply chain network 121 in the form of a directed graph in which the companies are represented by nodes and their trading relationship is represented by links.

FIG. 5C illustrates part of the supply chain network 121 generated based the trading relationship shown in FIG. 5B. FIG. 5B shows a relationship in which a company C1 sells a product P1 to a company C10. The supply-chain-network obtaining unit 111 in this case provides a link directed from C1 to C10 between a node representing the company C1 and a node representing the company C10. As illustrated in FIG. 5A, the node representing the company C1 is associated with the company name "C1", and further with information on items, as an industrial classification, a reputation, and a nationality. The same applies to the node representing the company C10. Further, the link directed from C1 to C10 is associated with P1, which denotes a traded product. It is noted that the supply-chain-network obtaining unit 111 may obtain information, such as a trading volume and a trading price, in accordance with the open information, and that these information items may be associated with a link.

FIG. 5B also shows a relationship in which the company C10 sells a product P2 to a company C5. The supply-chain-network obtaining unit 111 in this case provides a link directed from C10 to C5, between the node representing the company C10 and a node representing the company C5. Each of the nodes is associated with the information illustrated in FIG. 5A, and each of the links is associated with the information on a trading product and other things.

It is noted that as earlier described, a provider (a seller) of a product of some sort is referred to as "upstream" in the supply chain network 121, which is a directed graph, and a receiver (a buyer) of a product of some sort is referred to as "downstream" in the same. It is noted that the same definition of upstream and downstream is also applied to the subnetwork 122, which will be described later on.

The supply chain network 121 herein is, in the narrow sense, a network including nodes corresponding to all the companies included in the open information that is to be processed. Thus, the supply chain network 121 is a network including so many nodes, and the number of nodes may be approximately several thousand or more. It is noted that the configuration of the supply chain network 121 may be modified in various manners; an example is deleting some of the companies included in the open information.

Figure 6:
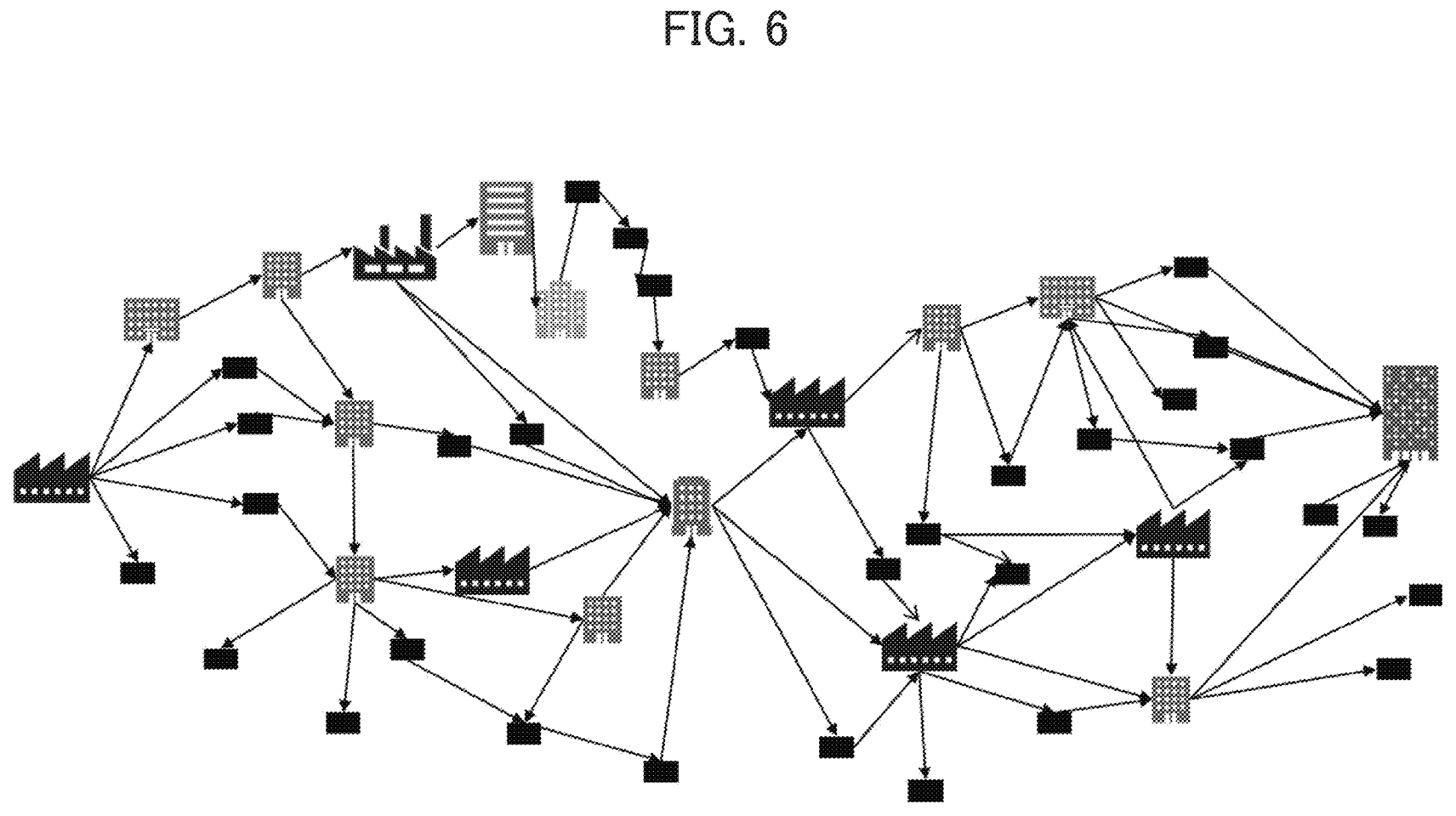

FIG. 6 is a schematic diagram illustrating the supply chain network 121. As illustrated in FIG. 6, the supply chain network 121 is a directed graph in which a plurality of nodes are connected together through links representing trading relationships. It is noted that for easy illustration, the nodes in FIG. 6 are depicted in different shapes, depending on whether the nodes represent manufacturing plants, distribution hubs or other things. As earlier described, the information obtained includes, but not limited to, the names, industrial classifications of the companies corresponding to the respective nodes; hence, the display mode of the supply chain network 121 can be changed depending on, for instance, the industrial classifications. It is noted that the technique in this embodiment does not necessarily require such node shape control.

It is noted that FIGS. 5A and 5B illustrate example data structures related to the supply chain network; a specific data structure shall not be limited to these examples. For instance, although FIGS. 5A and 5B illustrate an instance where table data, such as a relational database, is used, data of another structure may be used. Further, even in the use of table data, the number of tables shall not be limited to two; the tables may be managed in the form of either one combined table, or three or more divided tables. Furthermore, some of the items illustrated in FIGS. 5A and 5B may be omitted, or another item may be added. For instance, the supply-chain-network obtaining unit 111 may obtain information indicating company names, industrial classification codes, and buy-sell directions and may omit other information.

2.3 Similarity Calculation Processing

Figure 7:
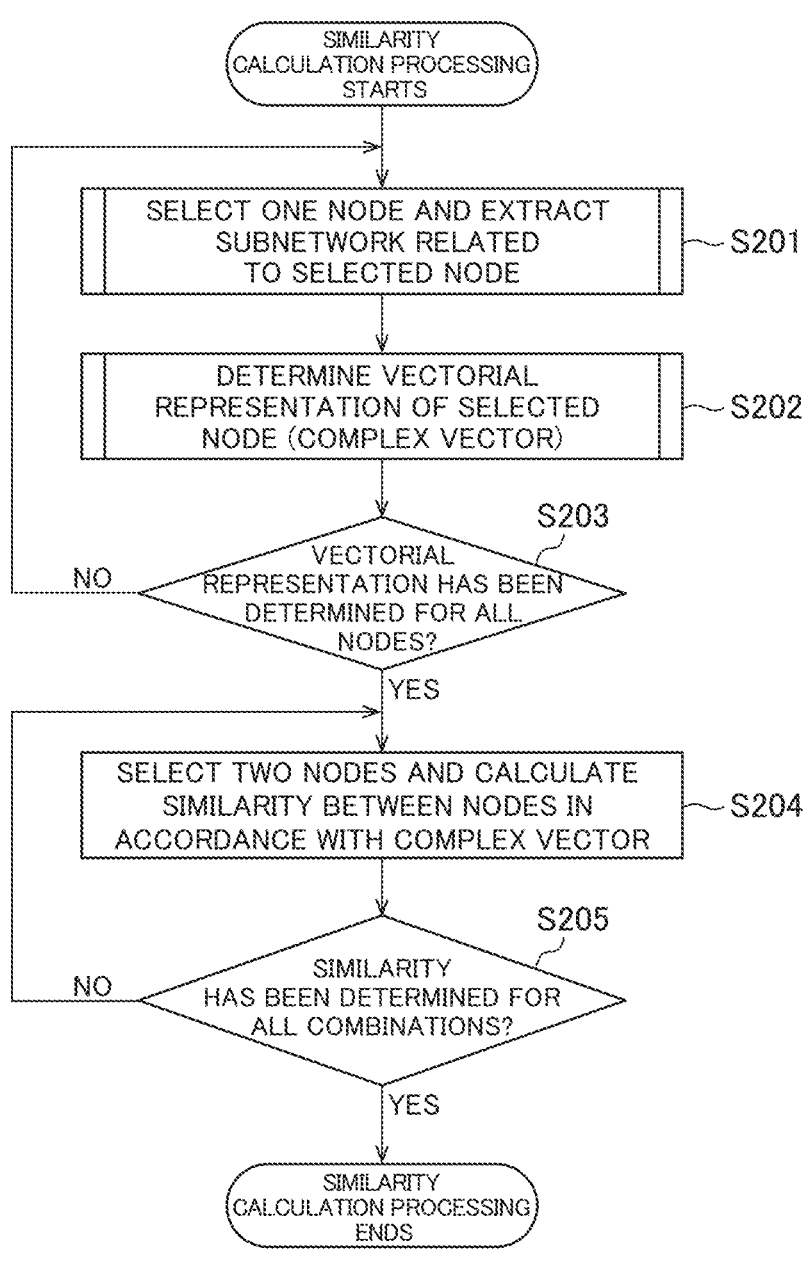
FIG. 7 is a flowchart showing similarity calculation processing.

FIG. 7 is a flowchart showing the similarity calculation processing in Step S102 in FIG. 4. Upon the start of this processing, firstly in Step S201, the subnetwork extracting unit 112 selects one of the nodes included in the supply chain network 121 as a processing target node and extracts the subnetwork 122 related to this node (hereinafter, referred to as a selected node).

In Step S202, the vector obtaining unit 171 determines the vectorial representation of the selected node in accordance with the subnetwork 122 extracted in Step S201. A vector herein is, as will be described later on with reference to FIG. 13, a complex vector composed of elements each of which is a complex number having a size and a phase.

In Step S203, the vector obtaining unit 171 determines whether the vectorial representations of all the nodes included in the supply chain network 121 have been required. It is noted that requiring the vectorial representations of all the nodes in the supply chain network 121 is not essential in this embodiment; processing on some of the nodes that are not targets for similarity calculation may be omitted.

If there is a node whose vectorial representation has not yet been calculated (if NO in Step S203), the processing goes back to Step S201 and continues. For instance, the subnetwork extracting unit 112 selects a not-yet-calculated node as the selected node and determines the vectorial representation of the selected node.

If the vectorial representations of all the nodes have been calculated (if YES in Step S203), the similarity calculating unit 172 in Step S204 selects two nodes that are to be subjected to similarity calculation and calculates the similarity between the two nodes in accordance with two complex vectors corresponding to the two nodes.

In Step S205, the similarity calculating unit 172 determines whether the similarity has been calculated for all node combinations. Let the supply chain network 121 include n (n is an integer equal to or greater than two) nodes for instance; accordingly, there are $\{n \times (n-1)\}/2$ combinations for selecting two from among these nodes. If the similarity has been calculated for $\{n \times (n-1)\}/2$ combinations, the similarity calculating unit 172 may determine that the similarity has been calculated for all the node combinations.

If there is a remaining combination where the similarity has not yet been calculated (if NO in Step S205), the processing goes back to Step S204 and continues. If the similarity has been calculated for all the node combinations (if YES in Step S205), the similarity calculation processing ends. It is noted that the similarity calculating unit 172 may calculate the similarity for only combinations that have to undergo similarity calculation, rather than for all the $\{n \times (n-1)\}/2$ combinations; the specific processing can be modified in various manners. The following details the individual process steps.

2.3.1 Subnetwork Extraction

Figure 8:
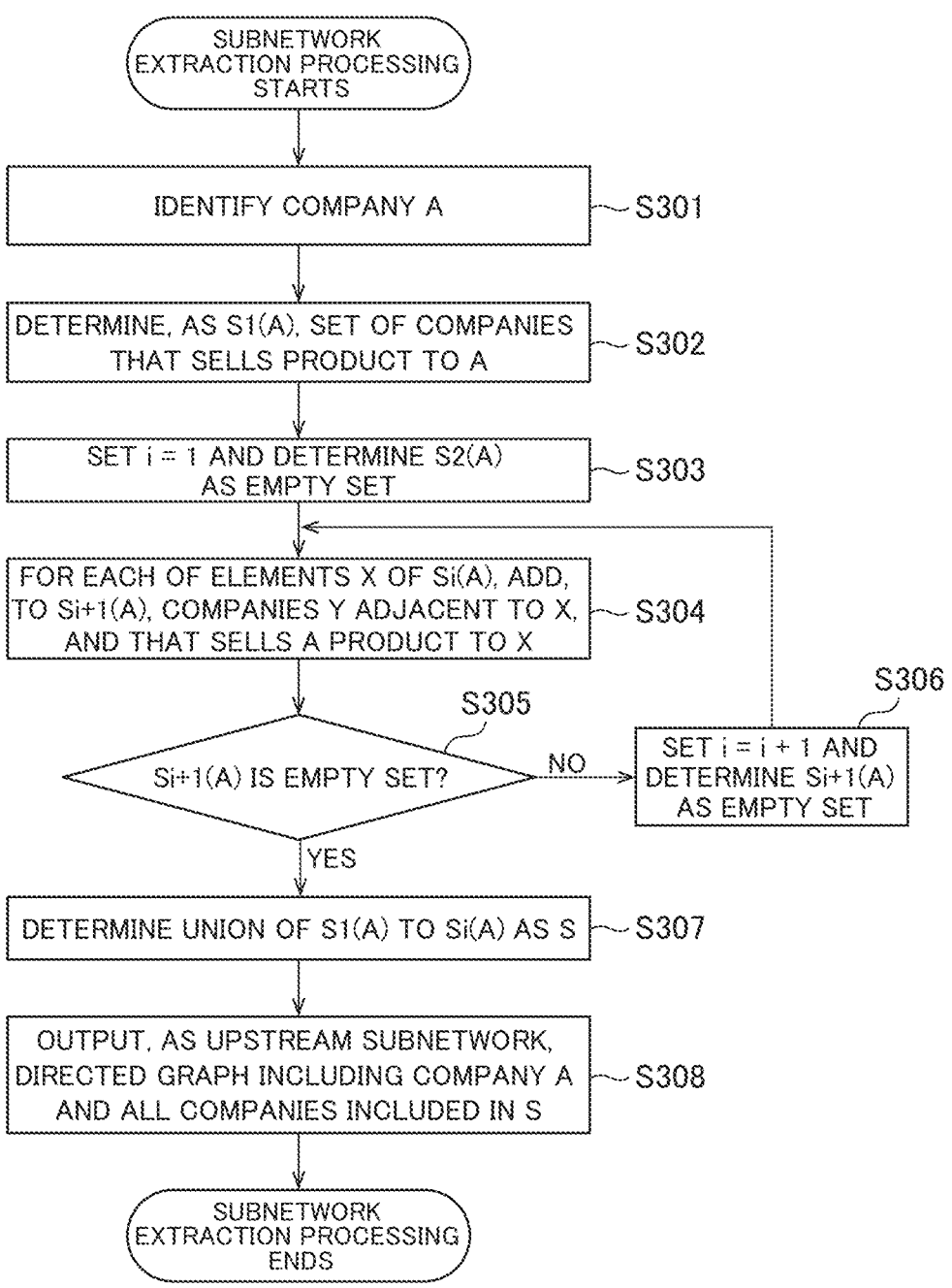
FIG. 8 is a flowchart showing processing to extract an upstream subnetwork.

FIG. 8 is a flowchart showing the subnetwork extraction processing corresponding to Step S201 in FIG. 7.

In Step S301, the subnetwork extracting unit 112 determines a specific company that is a reference for the extraction of the subnetwork 122. For instance, the specific company herein may be the selected node selected in Step S201 in FIG. 7. For instance, the plurality of nodes included in the supply chain network 121 are selected sequentially as the selected node, as shown in Steps S201 through S203 in FIG. 7. The specific company will be hereinafter referred to as a company A.

In Step S302, the subnetwork extracting unit 112 selects all companies X adjacent to the company A, corresponding to the selected node, and that sells something to the company A, and the subnetwork extracting unit 112 determines a set of the selected companies X as S1(A).

Figure 9A:
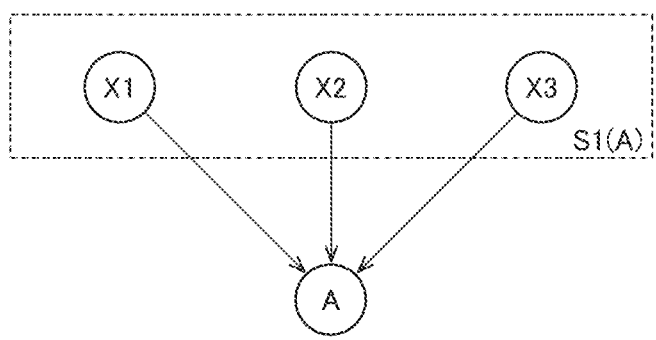
FIG. 9A illustrates an example of part of a subnetwork.

FIG. 9A illustrates example S1(A). For instance, FIG. 9A illustrates the supply chain network 121 with a part including the company A extracted. In the example in FIG. 9A, a node representing a company X1 is directly connected to a node representing the company A through a link directed from X1 to A. That is, X1, which is a company adjacent to the company A, and that sells something to the company A, is determined as an element of S1(A). Likewise, X2 and X3, which are also companies adjacent to the company A and selling something to the company A, are determined as elements of S1(A). S1(A) in this case is a set of three elements: X1, X2, and X3.

In Step S303, the subnetwork extracting unit 112 initializes a search variable i to one and determines Si+1(A) as an empty set. Here, i is initialized to one, and Si+1(A) is thus S2(A). Accordingly, the subnetwork extracting unit 112 herein determines S2(A) as an empty set.

In Step S304, for each of the elements X of Si(A), the subnetwork extracting unit 112 adds, to Si+1(A), all companies Y adjacent to the element X, and that sells a product to the element X. When the processing in Step S304 is executed on a given company A for the first time, i=1 is established. Accordingly, in this case, for each of the elements X of S1(A), the subnetwork extracting unit 112 adds, to S2(A), all the companies Y adjacent to the element X, and that sells a product to the element X.

Figure 9B:
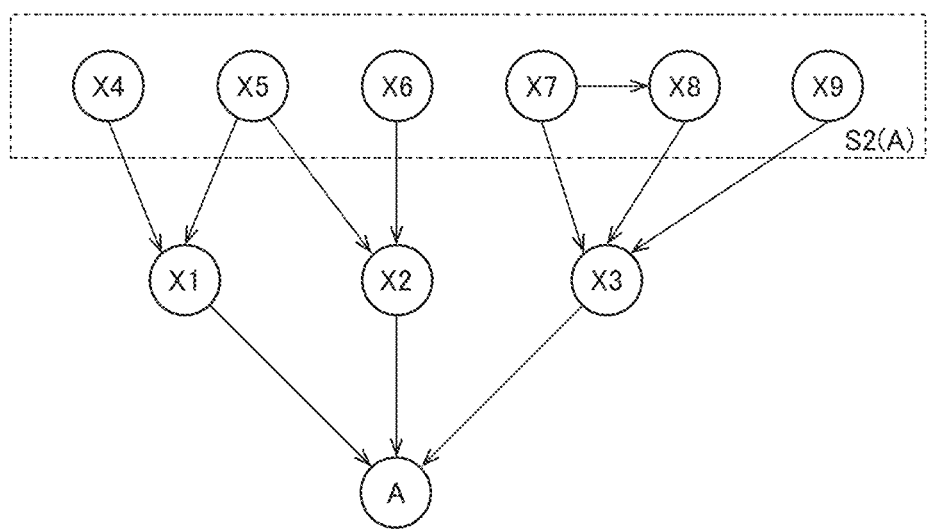
FIG. 9B illustrates an example of part of the subnetwork.

FIG. 9B illustrates example S2(A). S1(A) in this example is a set of three elements: X1, X2, and X3, as earlier described with reference to FIG. 9A. The subnetwork extracting unit 112 firstly identifies a company Y adjacent to X1, and that sells a product to X1. Here, two elements: X4 and X5 satisfy this condition and are thus added to S2(A). The subnetwork extracting unit 112 next identifies a company Y adjacent to X2, and that sells a product to X2. Here, two elements: X5 and X6 satisfy this condition. Since X5 has already been added to S2(A), X6 is added to S2(A). The subnetwork extracting unit 112 next identifies a company Y adjacent to X3, and that sells a product to X3. Here, three elements: X7, X8, and X9 satisfy this condition and are thus added to S2(A). As a result, a set of six elements: X4, X5, X6, X7, X8, and X9 is generated as S2(A) in Step S304, as illustrated in FIG. 8B for instance.

In Step S305, the subnetwork extracting unit 112 determines whether Si+1(A) is an empty set. In the example in FIG. 9B, S2(A), which contains six elements, is determined as not being an empty set (NO in Step S305). In this case, the subnetwork extracting unit 112 in Step S306 increments the variable i to initialize Si+1(A) to an empty set. The processing then goes back to Step S304. For instance, the subnetwork extracting unit 112 determines S2(A) as illustrated in FIG. 9B and then initializes S3(A) to an empty set in Step S306, followed by going back to the processing in Step S304.

In this case, in Step S304, the subnetwork extracting unit 112 identifies a company Y adjacent to each of the elements X, and that sells a product to the element X, and the subnetwork extracting unit 112 adds the company Y to S3(A). For instance, the subnetwork extracting unit 112 identifies a company adjacent to X4, and that sells a product to X4, and the subnetwork extracting unit 112 adds the identified company to S3(A). The same applies to X5 to X9; the subnetwork extracting unit 112 adds, to S3(A), a company adjacent to each of the company, and that sells a product to the company.

If S3(A) is not an empty set, the determination result in Step S305 is NO, and thus, the processing goes back to Step S304 and executes the processing to determine S4(A). The succeeding processing is executed in a similar manner; until Si+1(A) becomes an empty set, the processing from Steps S204 through S206 is repeated.

That Si+1(A) is an empty set in Step S305 means that there is no element found that satisfies the condition through the processing in Step S304. That is, none of the companies X, which are the elements of Si(A), has any more upstream company.

Hence, in this case (if YES in Step S305), the subnetwork extracting unit 112 in Step S307 determines a union of S1(A), S2(A), . . . , and Si(A) as S.

In Step S308, the subnetwork extracting unit 112 outputs, as a subnetwork, a directed graph including a node corresponding to the company A, and nodes corresponding to all the companies included in S. The subnetwork, which is herein a subnetwork representing upstream companies with reference to the company A corresponding to the selected node, is also referred to as an upstream subnetwork.

Figure 10:
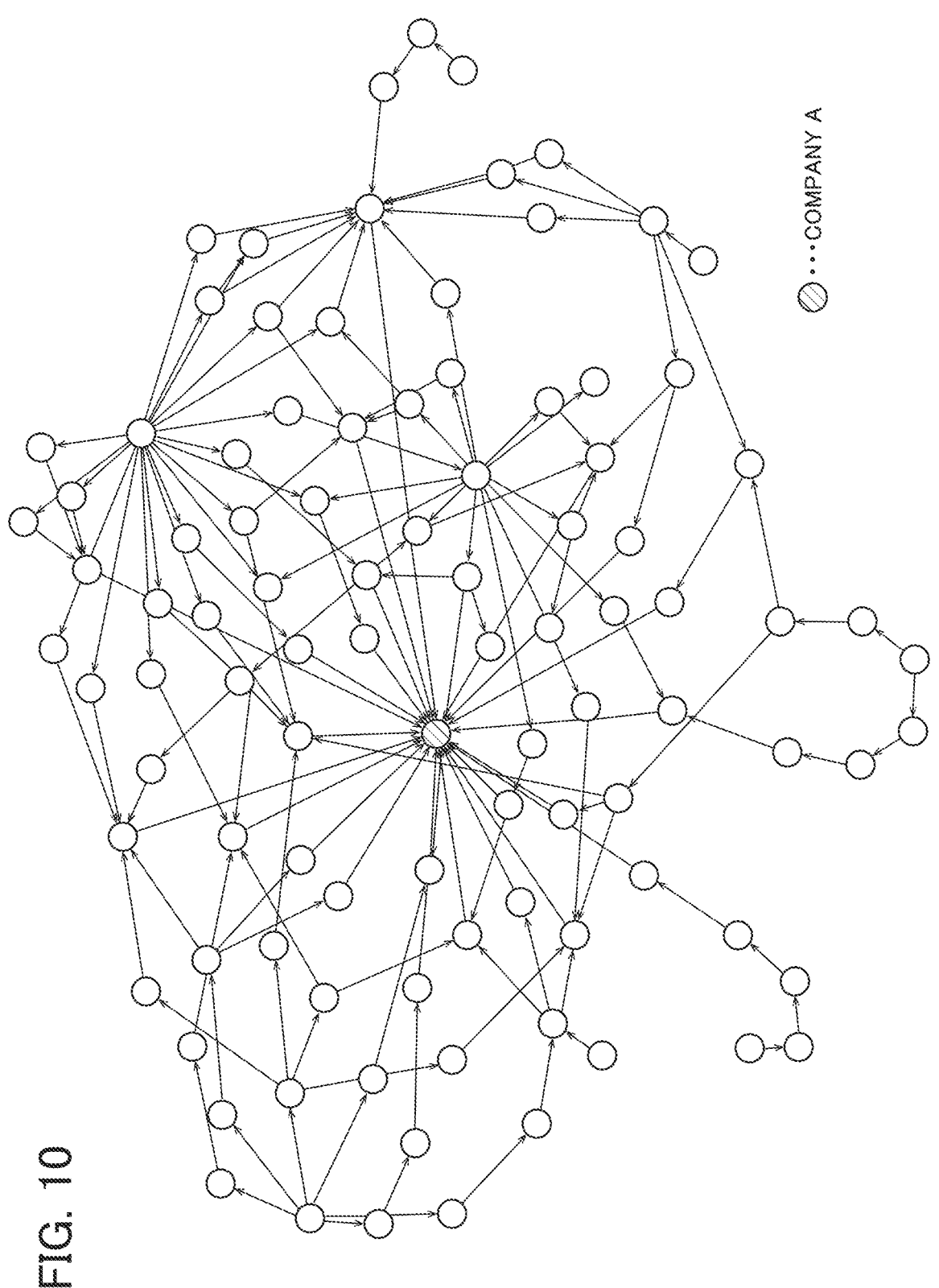
FIG. 10 illustrates an example subnetwork.

FIG. 10 illustrates an example upstream subnetwork. As illustrated in FIG. 10, the upstream subnetwork is a directed graph composed of nodes representing companies directly or indirectly connected to the company A. Doing so enables a portion related to a desired company to be extracted appropriately in the supply chain network 121. Herein, a company that is to be subjected to vectorial representation calculation is selected as the company A. The upstream subnetwork, which is information that enables identification of a company included in the supply chain of the company A, and identification of a specific connection relationship between each of the companies and the company A, is useful information for representing a feature of the company A by the use of a complex vector.

It is noted that in determining Si+1(A) in Step S304, the subnetwork extracting unit 112 may identify the company Y in accordance with a condition, "the company Y is not included in a union of {A}, S1(A), . . . , and Si(A)" in addition to the condition, "the company Y is adjacent to and sells something to the element X of Si(A)".

For instance, consider a case in which three companies Xa, Xb, and Xc exhibit a cycle of Xa←Xb←Xc←Xa, where Xa is an element of Si−2(A), where Xb is an element of Si−1(A), where Xc is an element of Si(A). The link "Xa←Xb" indicates that Xb is adjacent to and sells something to Xa. In this case, even though Xa is already an element of Si−2(A), Xa can be an element of Si+1(A) because it is adjacent to and sells something to Xc. That is, when the cycle is also reflected, the processing executed by the subnetwork extracting unit 112 possibly becomes complicated. On that point, when the above condition "the company Y is not included in a union of {A}, S1(A), . . . , and Si(A)" is added, Xa is excluded from the elements of Si+1(A), thus enabling the processing to be simplified.

Further, in Step S305 in FIG. 8, the subnetwork extracting unit 112 may determine whether i≥k is satisfied, in addition to whether Si+1(A) is an empty set. Herein, k is a value for determining the number of stages that are to be targets for extracting the subnetwork 122. Although k is a value of, for instance, about three, a different value may be set. When at least one of a first condition, i.e., Si+1(A) is an empty set, and a second condition, i.e., i≥k, is satisfied, the subnetwork extracting unit 112 may determine NO in Step S305 and end a further search. Doing so can limit the number of upstream stages in the subnetwork 122 for determining a vectorial representation to k stages. Consequently, a company distant from the company corresponding to the selected node can be excluded from the processing, thereby enabling load reduction in the processing. To be more specific, the number of elements whose values stands at zero in vectorial representation, which will be described later on, can be increased, thereby enabling load reduction in the similarity calculation.

It is noted that the foregoing has described an upstream subnetwork including upstream companies with reference to the company A. However, a subnetwork shall not be limited to an upstream subnetwork; the subnetwork may include a downstream subnetwork. For a downstream subnetwork, the processing, which is similar to that in FIG. 8 with the exception of a change in search direction, will not be described.

For instance, the subnetwork extracting unit 112 extracts the subnetwork 122 of a selected node in a range including k upstream stages and k downstream stages of the selected node and outputs the extracted subnetwork 122 to the vector obtaining unit 171.

2.3.2 Vectorial Representation

The processing to calculate the vectorial representation in Step 202 in FIG. 7 will be described. In the technique in this embodiment, the vector obtaining unit 171 determines a complex vector representing a processing target node (selected node) by assigning, to each of the nodes included in the subnetwork 122 of the processing target node, a complex number having a phase corresponding to the distance to the processing target node, and having an absolute value corresponding to the amount of flow going to or coming from the processing target node. It is noted that the amount of flow in this embodiment is the amount of something that flows through a directed graph. The graph in this embodiment is a directed graph directed from an upstream company to a node upstream of a selected node ns be denoted as x; accordingly, the with-phase flow amount of the upstream node x is denoted as $F^+(\Delta\theta, x)$. The vector obtaining unit 171 initializes $F^+(\Delta\theta, x)$ to a value zero, for all upstream nodes x included in the supply chain network 121 and located upstream of the selected node ns. The vector obtaining unit 171 also sets $F^+(\Delta\theta, ns)$, which is the with-phase flow amount of the selected node ns, at a value one. Further, let a node set that is m stages upstream of the selected node be set as $N_m^+$. A node that is zero stage away from the selected node ns is the selected node itself and is thus denoted as $N_0^+=\{ns\}$. The vector obtaining unit 171 also initializes m to a value one.

In Step S402, the vector obtaining unit 171 determines whether at least one of m>k and $N_m^+=\phi$ is satisfied. For instance, k herein is similar to the value k described in the processing to extract the subnetwork 122 and is a numeric value indicating the upper-limit number of stages in a search range. Further, $\phi$ denotes an empty set.

If m≤k and $N_m^+\neq\phi$ are satisfied (if NO in Step S402), the vector obtaining unit 171 in Step S403 updates $F^+(\Delta\theta, x)$ using Expression (1) below, for all the nodes x included in $N_m^+$.

[Expression 1]

$$F^+(\Delta\theta, x) = F^+(\Delta\theta, x) + e^{i\Delta\theta} \times \left\{ \sum_{\text{all nodes } y \text{ connected to } x \text{ in } N_{m-1}^+} \{\text{ratio of distribution to link connecting } x \text{ and } y \times F^+(\Delta\theta, y)\} \right\} \quad (1)$$

downstream company, and the amount of flow in this embodiment indicates the level of influence of the upstream company that is exerted on the downstream company. As will be described later on with reference to FIG. 12A, the amount of flow in this embodiment may be information determined based on the connection relationship between nodes in a directed graph (the supply chain network 121, the subnetwork 122). Alternatively, the amount of flow may be information reflecting, for instance, a specific quantity of a product (including materials, raw materials, a manufacturing apparatus, and other things) that is supplied from the upstream company to the downstream company.

The technique in this embodiment enables the amount of flow in a directed graph, which is herein the supply chain network 121 (in the narrow sense, the subnetwork 122), to be represented by the use of an absolute value and also enables the distance between the nodes to be represented by the use of a phase. This enables a vectorial representation reflecting accurately the structure of the subnetwork 122 (local graph) including the selected node. To be more specific, as the vectorial representation of a node in a supply chain, information can be used that reflects in detail information including which of the upstream companies and which of the downstream companies the node is connected to.

Figure 11A:
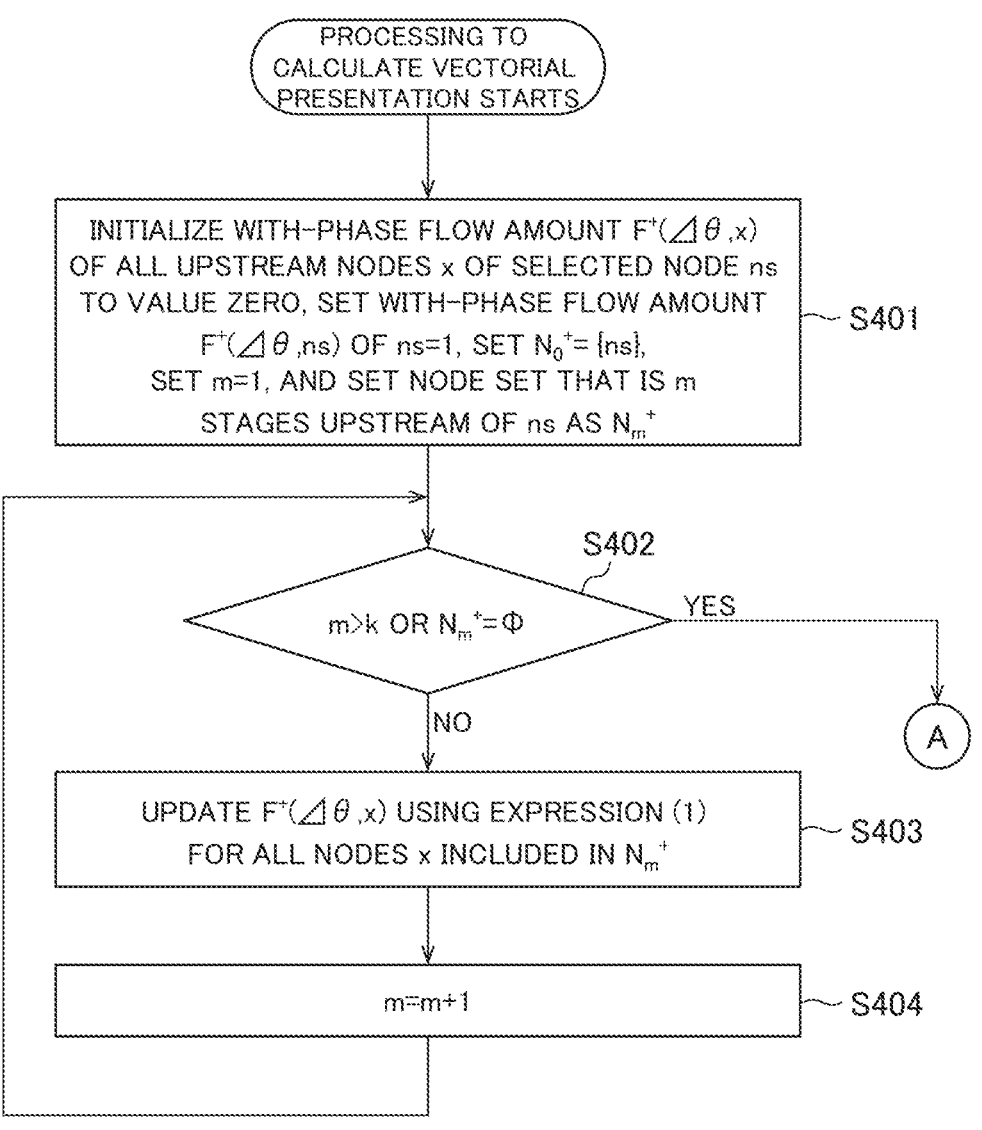
FIG. 11A is a flowchart showing processing to determine the vectorial representation of a node.
Figure 11B:
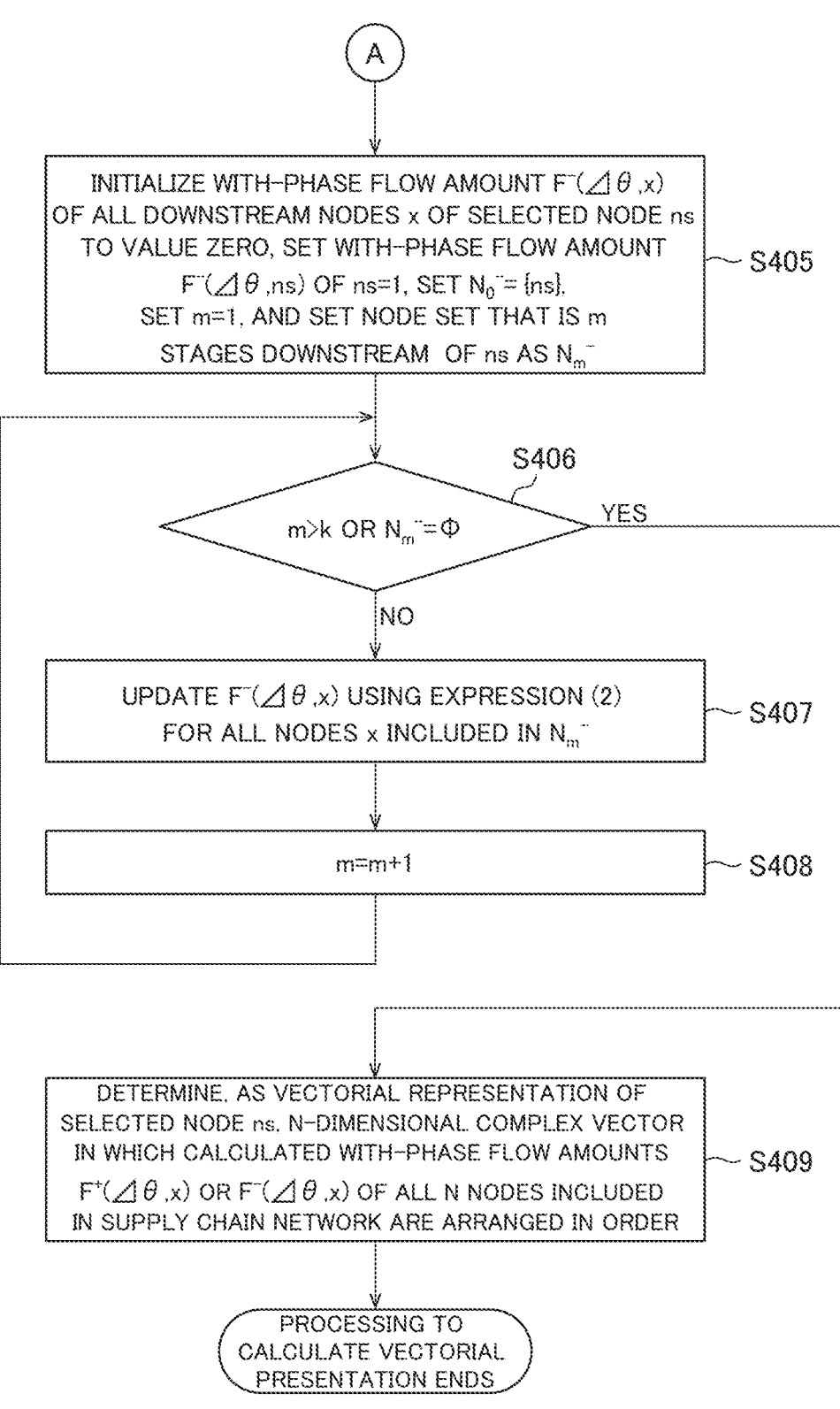
FIG. 11B is a flowchart showing processing to determine the vectorial representation of the node.
Figure 12A:
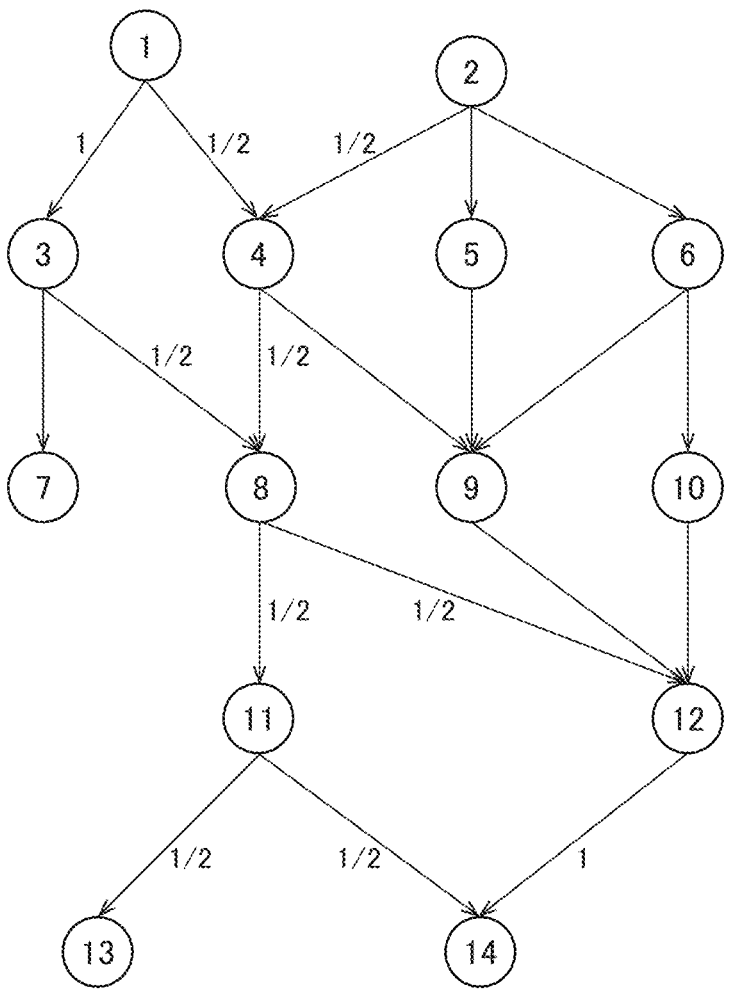
FIG. 12A illustrates flow amount in the subnetwork.
Figure 12B:
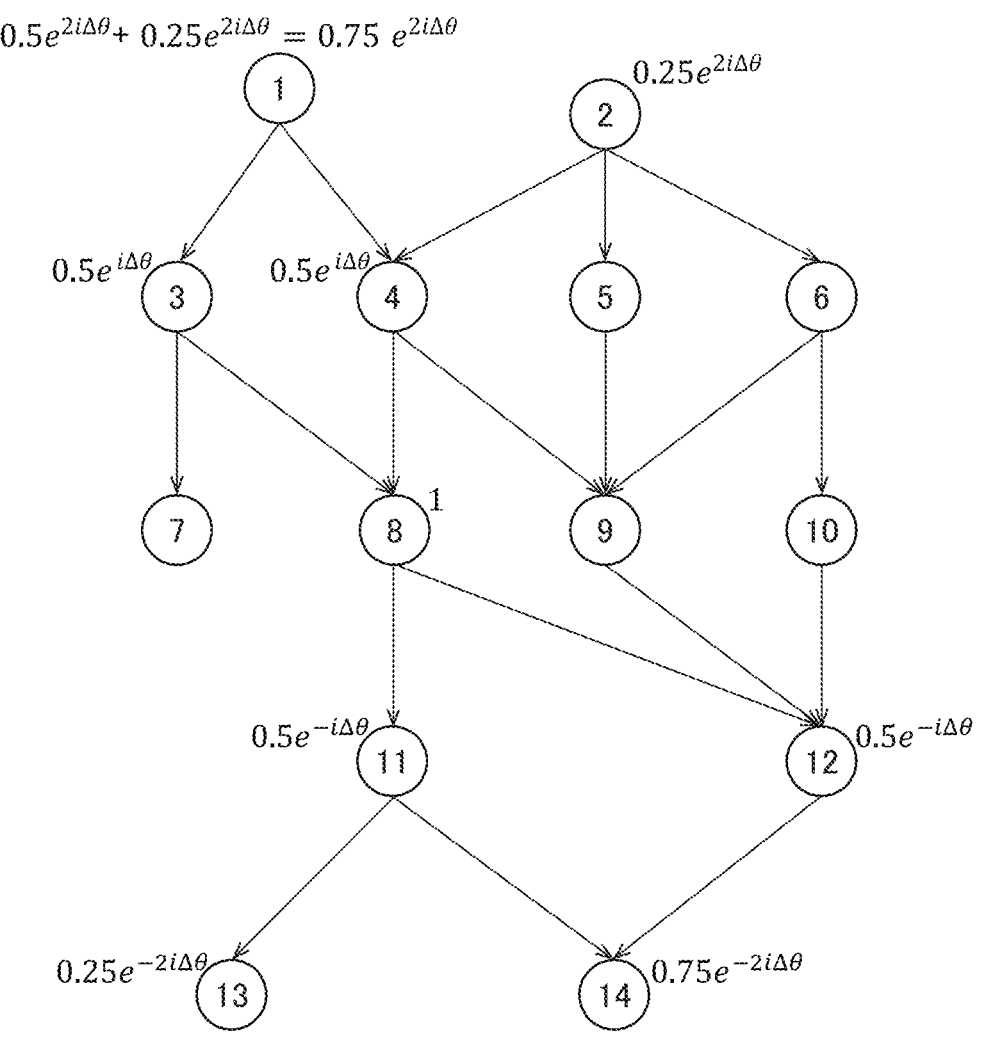
FIG. 12B illustrates with-phase flow amount in the subnetwork.

FIGS. 11A and 11B are flowcharts showing the processing to determine the vectorial representation of the selected node corresponding to Step S202 in FIG. 7. In the first process step, i.e., Step S401, the vector obtaining unit 171 executes initialization on an upstream node. In the following, let a Specific examples will be described with reference to FIGS. 12A and 12B. FIGS. 12A and 12B illustrate an instance where the supply chain network 121 has fourteen nodes n in total. Herein, let a node 8 be selected as a selected node. It is noted that the supply chain network 121 herein, which is small in scale and is identical to the subnetwork 122 at the three upstream stages and three downstream stages of the node 8, will not be distinguished from the subnetwork 122 in the following description.

FIG. 12A illustrates the amount of flow in the supply chain network 121 with a focus on the node 8. In this case, nodes that are one stage upstream of the node 8 are a node 3 and a node 4. That is, there are two links for flow from anode one stage upstream of the node 8 into the node 8: one is a link connecting the nodes 3 and 8 together, and the other is a link connecting the nodes 4 and 8 together. Accordingly, when the amount of flow into the node 8 is set at a value one, the amount of flow is distributed to the two links at a given ratio.

For an equal distribution ratio for instance, the amount of flow from the node 3 into the node 8 stands at ½, and the amount of flow from the node 4 into the node 8 stands at ½. As a matter of course, when there are N (N is an integer equal to or greater than two) links for flow from a node one stage upstream of the node 8 into the node 8, the amount of flow corresponding to each link stands at 1/N. The following describes an instance where the ratio of distribution stands at an equal ratio. It is noted that when a specific product trading volume or other things is associated with a link, the ratio of distribution may be set based on this trading volume.

Once the ratio of distribution is determined, the calculation of Expression (1) above is performed specifically. For determining $F^+(\Delta\theta, 3)$ for instance, $F^+(\Delta\theta, 3)$ in the first term on the right-hand side before update is an initial value per se and thus stands at a value zero. Further, $N_0^+$ is only the node 8, and thus, the "all nodes y connected to x in $N_{m-1}^+$" is the node 8. Further, the ratio of distribution of the link connecting the nodes 3 and 8 together stands at ½, as earlier described. Further, $F^+(\Delta\theta, y)$ denotes the with-phase flow amount of the selected node, i.e., the node 8, and thus stands at a value one as set in Step S401. Accordingly, $F^+(\Delta\theta, 3)$ is updated as indicated below. Likewise, $F^+(\Delta\theta, 4)$ is updated as indicated below.

$$F^+(\Delta\theta,3)=0+e^{i\Delta\theta}\times(\frac{1}{2})\times1=0.5e^{i\Delta\theta}$$

$$F^+(\Delta\theta,4)=0+e^{i\Delta\theta}\times(\frac{1}{2})\times1=0.5e^{i\Delta\theta}$$

FIG. 12B illustrates an instance of the supply chain network 121 similar to that in FIG. 12A and illustrates the with-phase flow amount of each node with the node 8 selected as a selected node. As earlier described, the with-phase flow amounts of the nodes 3 and 4 both stand at $0.5e^{i\Delta\theta}$.

In Step S404, the vector obtaining unit 171 next increments m and goes back to Step S402 to execute the processing. For instance, m=2 is set in the processing in Step S402 in the second time, and thus, a determination on whether 2>k is satisfied, and a determination on whether $N_2^+$ is an empty set are made.

In k=3 for instance, 2>k is not satisfied. Further, in the examples in FIGS. 12A and 12B, there are nodes that are two stages upstream of the node 8: one is a node 1, which is one stage upstream of and adjacent to the node 3 and one stage upstream of and adjacent to the node 4; and the other is a node 2, which is one stage upstream of adjacent to the node 4. That is, $N_2^+$ is not an empty set, but a set of the nodes 1 and 2. Thus, the vector obtaining unit 171 in these examples determines NO in Step S402 and executes the processing in Step S403.

In this case, the nodes 1 and 2 included in $N_2^+$ undergo update of their with-phase flow amounts. As illustrated in FIG. 12A, a node that is one stage upstream of the node 3 is only the node 1. That is, there is only one link for flow from a node that is one stage upstream of the node 3 into the node 3: the link connecting the nodes 1 and 3 together. Thus, the flow amount of the node 3 is a flow amount resulting, in its entirety, from the node 1, and its ratio of distribution stands at a value one.

Further, there are two nodes that are one stage upstream of the node 4: the nodes 1 and 2. That is, there are two links for flow from a node that is one stage upstream of the node 4 into the node 4: one is a link connecting the nodes 1 and 4 together, and the other is a link connecting the nodes 2 and 4 together. Thus, the flow amount of the node 4, which is a flow amount resulting from the node 1 by half and resulting from the node 2 by the remaining half, has a distribution ratio of ½ for each half.

Once the ratio of distribution is determined, the calculation of Expression (1) above is performed specifically. For determining $F^+(\Delta\theta, 1)$ for instance, $F^+(\Delta\theta, 1)$ in the first term on the right-hand side before update is an initial value per se and thus stands at a value zero. Further, $N_1^+$ is the nodes 3 and 4, both of which are connected to the node 1; thus, the "all nodes y connected to x in $N_{m-1}^+$" is two nodes: the nodes 3 and 4. Further, the ratio of distribution of the link connecting the nodes 1 and 3 together stands at a value one, and the with-phase flow amount $F^+(\Delta\theta, 3)$ of the node 3 stands, as earlier described, at $0.5e^{i\Delta\theta}$. Further, the ratio of distribution of the link connecting the nodes 1 and 4 together stands at ½, and the with-phase flow amount $F^+(\Delta\theta, 4)$ of the node 4 stands, as earlier described, at $0.5e^{i\Delta\theta}$. Accordingly, $F^+(\Delta\theta, 1)$ is updated as indicated below.

$$F^+(\Delta\theta, 1) = 0 + e^{i\Delta\theta}\times\{1\times0.5e^{i\Delta\theta} + 1/2\times0.5e^{i\Delta\theta}\}$$

$$= 0.75e^{2i\Delta\theta}$$

Further, for determining $F^+(\Delta\theta, 2)$, $F^+(\Delta\theta, 2)$ in the first term on the right-hand side before update is an initial value per se and thus stands at a value zero. Further, $N_1^+$ is the nodes 3 and 4, between which only the node 4 is connected to the node 2; thus, the "all nodes y connected to x in $N_{m-1}^+$" is a single node: the node 4. Further, the ratio of distribution of the link connecting the nodes 2 and 4 together stands at ½, and the with-phase flow amount $F^+(\Delta\theta, 4)$ of the node 4 stands, as earlier described, at $0.5e^{i\Delta\theta}$. Accordingly, $F^+(\Delta\theta, 2)$ is updated as indicated below.

$$F^+(\Delta\theta,2)=0+e^{i\Delta\theta}\times\{\frac{1}{2}\times0.5e^{i\Delta\theta}\}=0.25e^{2i\Delta\theta}$$

As can be seen from the foregoing description, $e^{i\Delta\theta}$ undergoes multiplication every time the number of stages counted from the selected node increases, and thus, the phase is shifted by $\Delta\theta$ every time. That is, in the technique in this embodiment, a node that is m stages upstream of the selected node has a phase of $m\Delta\theta$.

In Step S404, the vector obtaining unit 171 next increments m and goes back to Step S402 to execute the processing. For instance, m=3 is set in the processing in Step S402 in the third time, and thus, a determination on whether 3>k is satisfied, and a determination on whether $N_3^+$ is an empty set are made.

In the examples of the supply chain network 121 in FIGS. 12A and 12B, there is no node that is upstream of the node 1 and is upstream of the node 2, and thus, $N_3^+$ is an empty set. The vector obtaining unit 171 thus determines YES in Step S402 and proceeds to the processing on the downstream nodes shown in FIG. 11B. If $N_3^+$ is not an empty set, and if k≥3 is satisfied, the vector obtaining unit 171 determines NO in Step S402; accordingly, each of the nodes included in $N_3^+$ undergoes update of its with-phase flow amount. That is, in the technique in this embodiment, the processing to update the with-phase flow amount is repeated toward upstream stages one by one until at least one of the following conditions is satisfied: one is that k upstream stages have undergone the processing; and the other is that there is no more upstream node.

Upon completing the processing on the upstream nodes, the vector obtaining unit 171 in Step S405 in FIG. 11B executes initialization on downstream nodes. In the following, let a node downstream of the selected node ns be denoted as x; accordingly, the with-phase flow amount of the downstream node x is denoted as $F^-(\Delta\theta, x)$. The vector obtaining unit 171 initializes $F^-(\Delta\theta, x)$ to a value zero, for all downstream nodes x included in the supply chain network 121 and located downstream of the selected node ns. The vector obtaining unit 171 also sets $F^-(\Delta\theta, ns)$, which is the with-phase flow amount of the selected node ns, at a value one. Further, let a node set that is m stages downstream of the selected node be denoted as $N_m^-$. A node that is zero stage away from the selected node ns is the selected node itself and is thus denoted as $N_0^-=\{ns\}$. The vector obtaining unit 171 also initializes m to a value one.

In Step S406, the vector obtaining unit 171 determines whether at least one of m>k and $N_m^- = \phi$ is satisfied. That is, like the processing on the upstream nodes, the processing is repeated on the downstream nodes until at least one of the following condition is satisfied: that k stages have undergone the processing, and there is no more downstream node.

If k stages have not yet undergone the processing, and if there is a downstream node (if NO in Step S406), the vector obtaining unit 171 updates $F^-(\Delta\theta, x)$ using Expression (2) below, for all the nodes x included in $N_m^-$.

[Expression 2]

$$F^-(\Delta\theta, x) = F^-(\Delta\theta, x) + e^{-i\Delta\theta} \times$$
$$\left\{ \sum_{\text{all nodes } y \text{ connected to } x \text{ in } N_{m-1}^-} \{\text{ratio of distribution to link connecting } x \text{ and } y \times F^-(\Delta\theta, y)\} \right\}$$

(2)

In the example in FIG. 12A, nodes that are one stage downstream of the selected node, i.e., the node 8, are a node 11 and a node 12. That is, there are two links for flow from the node 8 into a node that is one stage downstream of the node 8: one is a link connecting the nodes 8 and 11 together, and the other is a link connecting the nodes 8 and 12 together. Accordingly, when the amount of flow from the node 8 is set at a value one, the amount of flow is distributed to the two links at a given ratio. For an equal distribution ratio, the amount of flow from the node 8 to the node 11 stands at ½, and the amount of flow from the node 8 to the node 12 stands at ½.

Once the ratio of distribution is determined, the calculation of Expression (2) above is performed specifically. For determining $F^-(\Delta\theta, 11)$ for instance, $F^-(\Delta\theta, 11)$ in the first term on the right-hand side before update is an initial value per se and thus stands at a value zero. Further, $N_0^-$ is only the node 8, and thus, the "all nodes y connected to x in $N_{m-1}^-$" is the node 8. Further, the ratio of distribution of the link connecting the nodes 8 and 11 together stands at ½, as earlier described. Further, $F^-(\Delta\theta, y)$ denotes the with-phase flow amount of the selected node, i.e., the node 8, and thus stands at a value one as set in Step S405. Accordingly, $F^-(\Delta\theta, 11)$ is updated as indicated below. Likewise, $F^-(\Delta\theta, 12)$ is updated as indicated below.

$$F^-(\Delta\theta, 11) = 0 + e^{-i\Delta\theta} \times (\tfrac{1}{2}) \times 1 = 0.5 e^{-i\Delta\theta}$$

$$F^-(\Delta\theta, 12) = 0 + e^{-i\Delta\theta} \times (\tfrac{1}{2}) \times 1 = 0.5 e^{-i\Delta\theta}$$

In Step S408, the vector obtaining unit 171 next increments m and goes back to Step S406 to execute the processing. For instance, m=2 is set in the processing in Step S406 in the second time, and thus, a determination on whether 2>k is satisfied, and a determination on whether $N_2^-$ is an empty set are made.

In the examples in FIGS. 12A and 12B, the nodes 13 and 14 included in $N_2^-$ undergo the processing to update $F^-(\Delta\theta, 13)$ and $F^-(\Delta\theta, 14)$. The detailed processing, which is similar to the example described earlier, will not be described. It is noted that $e^{-i\Delta\theta}$ undergoes multiplication every time the number of stages counted from the selected node increases, and thus, the phase is shifted by $-\Delta\theta$ every time. That is, in the technique in this embodiment, a node that is m stages downstream of the selected node has a phase of $-m\Delta\theta$.

If at least one of the following conditions: one is that k downstream stages have undergone the processing, and the other is that there is no more downstream node (if YES in Step S406), the vector obtaining unit 171 in Step S409 determines the vectorial representation of the selected node in accordance with the with-phase flow amount determined for each of the nodes.

To be specific, the vector obtaining unit 171 determines, as the vectorial representation of the selected node, an n-dimensional complex vector in which the with-phase flow amounts of all n nodes included in the supply chain network 121 are arranged in a predetermined order.

FIG. 13 illustrates a vectorial representation in the examples described earlier with reference to FIGS. 12A and 12B. As earlier described, the supply chain network 121 herein includes 14 nodes, and the determined vector is a 14-dimensional complex vector. For instance, the 14-dimensional complex vector is a vector in which the with-phase flow amounts of the nodes 1 to 14 are arranged in the stated order. It is noted that the order of the plurality of nodes included in the supply chain network 121 is non-limiting; various modifications can be devised.

As earlier described, the nodes 1 to 4 and nodes 11 to 14, which are connected to the selected node, i.e., the node 8, undergo update of their with-phase flow amounts. Thus, the first to fourth elements and the eleventh to fourteenth elements are complex numbers that are not zero. In contrast, the nodes 5 to 7 and nodes 9 to 10 are not update targets, and thus, their with-phase flow amounts remain a value zero, which is an initial value. Thus, the fifth to seventh elements and the ninth to tenth elements stand at a value zero. The eighth element, which is the with-phase flow amount of the node 8 itself, stand at a value one.

The technique in this embodiment enables a vectorial representation reflecting the number of stages counted from the selected node to be used as well as the amount of flow per se. In the example in FIG. 13, since the first element of the complex vector has a phase of $2\Delta\theta$, this complex vector can hold information indicating that the node 1 is two stages upstream of the selected node. Likewise, since the third element has a phase of $\Delta\theta$, the complex vector can hold information indicating that the node 3 is one stage upstream of the selected node. Using the complex vector holding these information items in the similarity calculation processing and other processing reflects information including the number of stages to the processing, thereby enabling improvement in processing accuracy.

It is noted that in the processing on up to k upstream and downstream stages, the phases of complex numbers constituting elements are $\Delta\theta$, $2\Delta\theta$, $3\Delta\theta$, . . . , and $k\Delta\theta$ in the upstream stages and are $-\Delta\theta$, $-2\Delta\theta$, $-3\Delta\theta$, . . . , and $-k\Delta\theta$ in the downstream stages. To clarify the relationship between a phase and the number of stages, these phases do not desirably overlap each other. For instance, when k=3 is satisfied, setting $\Delta\theta = \pi/2$ involves an overlap, such as $e^{2i\Delta\theta} = e^{-2i\Delta\theta} = -1$, thus making it difficult to distinguish, for instance, that a node is two stages upstream from that another node is two stages downstream. Accordingly, the value $\Delta\theta$ in this embodiment may be based on k. For instance, $\Delta\theta$ is a positive real number satisfying $(k+1)\times\Delta\theta=\pi$.

Figure 14:
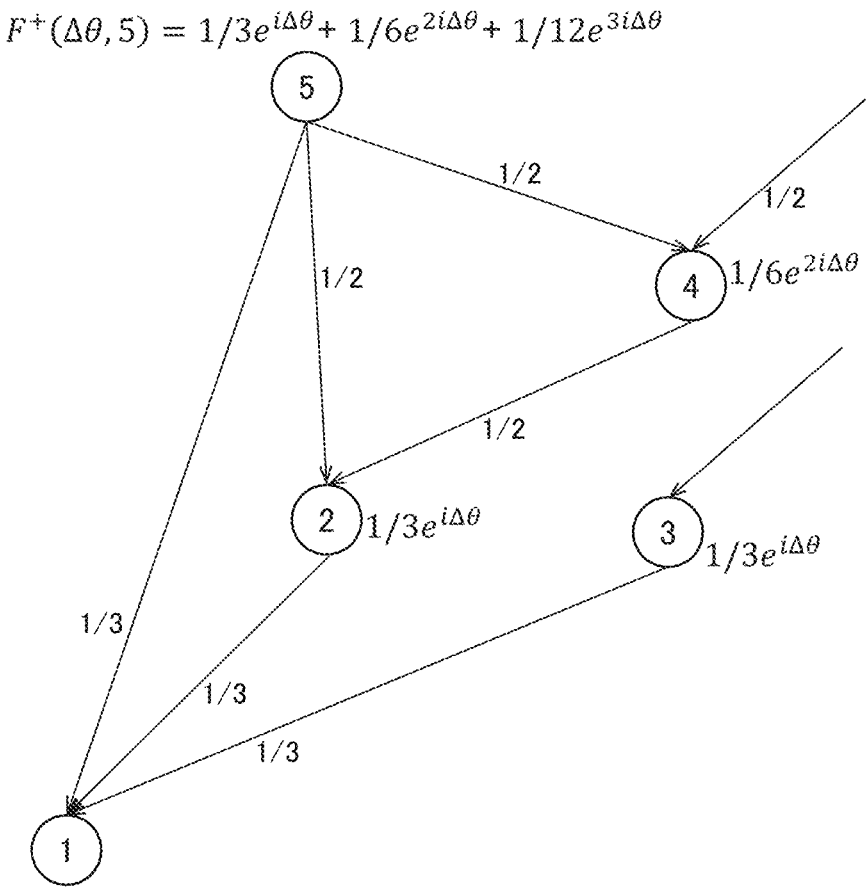
FIG. 14 illustrates the with-phase flow amount in the subnetwork.

FIG. 14 illustrates part of the supply chain network 121 of different structure. FIG. 14 shows an instance where the with-phase flow amounts of the nodes 2 to 5 and other nodes are to be determined with the node 1 selected as a selected node.

The node 5 herein, which is directly connected to the node 1, is a node included in $N_1^+$. To be specific, the with-phase flow amount $F^+(\Delta\theta, 5)$ of the node 5 is updated as indicated below through processing targeted on $N_1^+$.

$$F^+(\Delta\theta,5)=0+e^{i\Delta\theta}\times(1/3)\times1=(1/3)e^{i\Delta\theta}$$

The node 5, which is one stage upstream of the node 2 included in $N_1^+$, is also a node included in $N_2^+$. To be specific, the with-phase flow amount $F^+(\Delta\theta, 5)$ of the node 5 is updated as indicated below through processing targeted on $N_2^+$. It is noted that the with-phase flow amount $F^+(\Delta\theta, 2)$ of the node 2 is $(1/3)e^{i\Delta\theta}$.

$$F^+(\Delta\theta, 5) = (1/3)e^{i\Delta\theta} + e^{i\Delta\theta}\times(1/2)\times(1/3)e^{i\Delta\theta}$$
$$= (1/3)e^{i\Delta\theta} + (1/6)e^{2i\Delta\theta}$$

The node 5, which is one stage upstream of the node 4 included in $N_2^+$, is furthermore a node included in $N_3^+$. To be specific, the with-phase flow amount $F^+(\Delta\theta, 5)$ of the node 5 is updated as indicated below through processing targeted on $N_3^+$. It is noted that the with-phase flow amount $F^+(\Delta\theta, 4)$ of the node 4 is $(1/6)e^{2i\Delta\theta}$.

$$F^+(\Delta\theta, 5) = (1/3)e^{i\Delta\theta} + (1/6)e^{2i\Delta\theta} + e^{i\Delta\theta}\times(1/2)\times(1/6)e^{2i\Delta\theta}$$
$$= (1/3)e^{i\Delta\theta} + (1/6)e^{2i\Delta\theta} + (1/12)e^{3i\Delta\theta}$$

As described above, the technique in this embodiment can represent, using the with-phase flow amount of a target node, a network structure in which there are multiple paths having different distances (the number of stages) measured from a selected node to the target node. In the foregoing example for instance, $F^+(\Delta\theta, 5)$ includes three phase terms: $\Delta\theta$, $2\Delta\theta$, and $3\Delta\theta$; thus, the structure of the subnetwork 122 illustrated in FIG. 14 is reflected appropriately to the vectorial representation.

2.3.3 Similarity Calculation

The processing to calculate the similarity in Step 204 in FIG. 7 will be described. It is noted that the vectorial representation of each of the nodes is determined by subjecting a corresponding one of the nodes included in the supply chain network 121 to the processing in Step S202.

The similarity calculating unit 172 in this embodiment may determine the Hermitian inner product of two complex vectors: a first complex vector and a second complex vector, and the norm product of the first complex vector and second complex vector, and the similarity calculating unit 172 may calculate the similarity in accordance with the real part of the ratio between the Hermitian inner product and norm product.

For instance, among n nodes included in the supply chain network 121, let the vectorial representation of the node i be denoted as $x_i$, and let the vectorial representation of the node j be denoted as $x_j$. The alphabets i and j denote integers satisfying $1\leq i\leq n$, $1\leq j\leq n$, and $i\neq j$. Further, $x_i$ and $x_j$ each denote an n-dimensional complex vector, as earlier described.

The similarity calculating unit 172 in this case may determine the similarity, S, between the node i and node j on the basis of Expression (3) below. In Expression (3) below, $x_j^*$ denotes a complex conjugate vector with conjugate complex numbers taken from each element of $x_j$. That is, the numerator on the right-hand side denotes the Hermitian inner product of $x_i$ and $x_j$. Further, $|x_i|$ and $|x_j|$ respectively denote the sizes (norms) of $x_i$ and $x_j$. R{ } denotes a real part.

[Expression 3]

$$S = R\left\{\frac{x_i \cdot x_j^*}{|x_i||x_j|}\right\} \tag{3}$$

It is noted that when $x_i$ and $x_j$ are equal, the similarity S determined through Expression (3) above stands at a value one. It is also noted that for a real vector, Expression (3) above coincides with cosine similarity that is used widely. In other words, the technique in this embodiment can calculate the similarity between nodes with a complex vector representation by extending the cosine similarity to a complex number.

Here, the difference between the technique in this embodiment and a conventional technique will be described. In an embedding technique (vectorization technique) that is used widely, a node undergoes real-number representation of the strength of its relationship with another node in a supply chain network, and a real vectorial representation is made using the represented real number. For instance, a node undergoes vectorial representation using only a weight indicating the contribution to another node or the contribution from another node. For instance, a vectorial representation is determined with only the flow amount illustrated in FIG. 12A being reflected.

FIG. 15A illustrates two complex vector representations determined through the technique in this embodiment, and FIG. 15B illustrates two real vectorial representations determined with a phase not being reflected. It is noted that each vector illustrated in FIGS. 15A and 15B is a vector of convenience established for describing influence on the similarity resulting from the presence or absence of a phase, and that a specific network configuration is different from the examples in FIGS. 12A and 12B.

Herein, a 14-dimensional vector is provided. As illustrated in FIG. 15A, a comparison in the vector's seventh and eighth elements made between the vectors shows a difference in that one of the vectors has an absolute value of (0,1), whereas the other vector has an absolute value of (1,0), and this comparison also shows that the first to sixth elements and the ninth to fourteenth elements have their absolute values common between the two vectors. The same holds true for the comparative example in FIG. 15B.

In the technique in this embodiment, each element of a vectorial representation is a complex number and has a phase corresponding to the number of stages counted from a selected node. Referring to the vector on the left side of FIG. 15A, the following points are represented: that the selected node is the node 8, that the nodes 1 and 2 are two stages upstream of the selected node, and that the nodes 3 and 4 are one stage upstream of the selected node. In addition, the following points are represented: that the nodes 11 and 12 are one stage downstream of the selected node, and that the nodes 13 and 14 are two stages downstream of the selected node.

In contrast to the foregoing, referring to the vector on the right side of FIG. 15A, the selected node is the node 7, the nodes 1 and 2 are one stage upstream of the selected node, and the nodes 3 and 4 are two stages upstream of the selected node. In addition, the nodes 11 and 12 are two stages downstream of the selected node, and the nodes 13 and 14 are one stage downstream of the selected node.

That is, in this example, the connection relationship (the relationship in the number of stages) with the nodes 1 to 4 and nodes 11 to 14 is considerably different between the nodes 8 and 7, and hence, the similarity between the nodes 8 and 7 conceivably should be low. On that point, the complex vector representations illustrated in FIG. 15A reflects this connection relationship difference; hence, when the similarity S between the nodes 7 and 8 is calculated using Expression (3) above, the similarity stands at a value close to zero. It is noted that a specific value of the similarity S varies depending on the setting of $\Delta\theta$.

In the example illustrated in FIG. 15B by contrast, the phase is not reflected; hence, even if the relationship in the number of stages in the nodes 1 to 4 and nodes 11 to 14 is considerably different between the nodes 8 and 7 as earlier described with reference to FIG. 15A, this difference is not reflected to the vectorial representations. To be specific, the two real vectorial representations coincide expect the seventh and eighth elements, as illustrated in FIG. 15B. As a result, the similarity calculated using Expression (3) above or typical cosine similarity stands at a large value close to one.

As such, as can be seen from the comparison between FIGS. 15A and 15B, the technique in this embodiment can reflect information on a lost network structure to a vectorial representation in view of only weight, by using a complex vector representation having a phase corresponding to the number of stages. Consequently, the accuracy of similarity calculation can be enhanced when compared with an instance without a phase. In the technique in this embodiment, the similarity determined in the foregoing manner may be used in various kinds of processing. For instance, the similarity may be used in the presentation processing, as will be described below.

2.4 Presentation Processing

Figure 16:
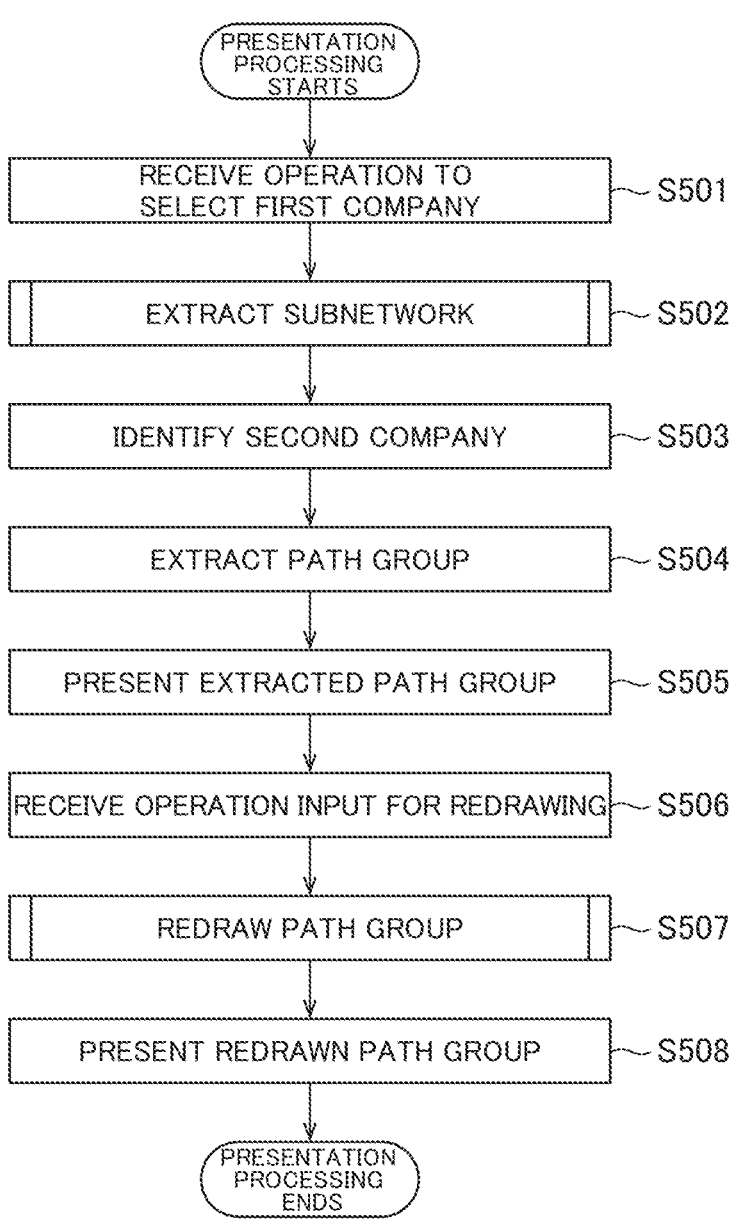
FIG. 16 is a flowchart showing presentation processing.

FIG. 16 is a flowchart showing an example of the presentation processing in Step S103 in FIG. 4. In the first process step, i.e., Step S501, the input receiving unit 114 receives an operation input carried out by the user. The operation input herein is an operation to select the first company. The operation input carried out by the user may be executed on, for instance, the operation unit 250 of the terminal device 200. The input receiving unit 114 in this case obtains, via the communication unit 130 for instance, an operation signal indicating the operation input executed on the terminal device 200. Alternatively, the server system 100 may include a not-shown operation unit, and the input receiving unit 114 may receive the operation input executed on the operation unit. Other than the foregoing, various modifications can be devised in specific aspects of receiving the operation input.

In Step S502, the subnetwork extracting unit 112 extracts the subnetwork 122.

In Step S503, the path extracting unit 113 identifies the second company. For instance, the path extracting unit 113 can identify the second company in accordance with a user operation to select the second company, received by the input receiving unit 114. In accordance with a designated condition received by the input receiving unit 114, the path extracting unit 113 may determine a company matching the designated condition as the second company.

In Step S504, the path extracting unit 113 extracts a path group including one or more paths connecting a node representing the first company and a node representing the second company together through one or more links. The path extracting unit 113 at this time extracts a path group including the shortest path, which is a specific condition.

In Step S505, the presentation processing unit 115 executes processing to present the extracted path group. For instance, the presentation processing unit 115 executes processing to generate a display screen including the extracted path group, and to transmit the display screen to the terminal device 200 via the communication unit 130. The terminal device 200 displays the received display screen onto the display unit 240. The user can check the extracted path group by referring to the screen displayed on the display unit 240.

When the user desires to redraw the path group displayed on the display unit 240, the user carries out a redrawing operation input on, for instance, the operation unit 250 of the terminal device 200.

In Step S506, the input receiving unit 114 receives a redrawing operation input carried out by the user. For instance, the input receiving unit 114 receives the redrawing operation input by obtaining, via the communication unit 130, an operation signal indicating the operation input executed on the operation unit 250 of the terminal device 200.

In Step S507, the redrawing unit 116 redraws the path group in accordance with the redrawing operation input received by the input receiving unit 114. To be specific, the redrawing unit 116 executes the delete processing, the node adding processing, or the substitute-path calculating processing in accordance with the redrawing operation input.

In Step S508, the presentation processing unit 115 executes processing to present the redrawn path group. For instance, the presentation processing unit 115 executes processing to generate a display screen including the redrawn path group, and to transmit the display screen to the terminal device 200 via the communication unit 130. The terminal device 200 displays the received display screen onto the display unit 240. The user can check the redrawn path group by referring to the screen displayed on the display unit 240. The following details processing in each step.

2.4.1 Subnetwork Extraction

The processing to extract the subnetwork 122 in Step S502 in FIG. 16 will be described. In supply-chain-related analysis, it is important to focus on a predetermined first company, and to analyze a network related to the first company. However, the supply chain network 121, which is a network obtained based on, for instance, the open information, includes many nodes and links. The supply chain network 121 hence possibly includes nodes and links unrelated to the first company.

In this embodiment, the input receiving unit 114 receives a user operation to select the first company, as shown in Step S501 in FIG. 16. In this processing, for instance, the user who intends to perform the analysis may input a specific company name. Alternatively, the input receiving unit 114 may execute processing to present candidates for the first company, by receiving information on, but not limited to, an industrial classification and a product, and performing search processing using these information items as search keys. The user selects the first company from among the presented candidates, and the input receiving unit 114 receives an input of this selection.

In accordance with the operation input received by the input receiving unit 114, the subnetwork extracting unit 112 executes processing to extract the subnetwork 122 related to the first company from the supply chain network 121.

The specific processing is similar to the example earlier described with reference FIG. 8, with the exceptions that the first company is identified based on the selection input received by the input receiving unit 114, and that the first company serves as the company A. For instance, upon obtainment of the company name of the first company, the subnetwork extracting unit 112 executes processing to identify the first company in accordance with processing to compare the company name of the first company with a company name associated with each of the nodes of the supply chain network 121.

To be specific, with the first company as the company A, the subnetwork extracting unit 112 determines a subnetwork upstream of the first company by repeating processing to add, to a company $Si+1(A)$, a company that sells something to each of the companies included in $Si(A)$ until $Si+1(A)$ is an empty set. This upstream subnetwork is a directed graph composed of nodes representing companies directly or indirectly connected to the first company. Doing so enables appropriate extraction of a portion related to the first company in the supply chain network 121. The upstream subnetwork, which is information with which a company included in the supply chain of the first company, and a specific connection relationship between each company and the first company can be identified, is useful information for analyzing the supply chain of the first company.

Likewise, with the first company as the company A, the subnetwork extracting unit 112 determines a subnetwork downstream of the first company by repeating processing to add, to a company $S'i+1(A)$, a company that buys something from each of the companies included in $S'i(A)$ until $S'i+1(A)$ is an empty set.

It is noted that a value k' indicating a search range may be set in extracting the subnetwork 122 of the first company. Doing so can limit the search range, thus enables reduction in processing load. However, in the similarity calculation processing, a node falling outside the search range as a result of a relatively small value k, if any, is less likely to cause a problem, because a network structure near the selected node needs to be presented as a complex vector. By contrast, whether the first company has a relation with an inappropriate company is a considerable problem in extracting the subnetwork 122 of the first company in which the user is interested; hence, it is desirable to find out all such inappropriate companies even when the distance between the first company and an inappropriate company is large. Accordingly, k<k' may be satisfied in the comparison between k and k'. Alternatively, in extracting the subnetwork 122 of the first company, k' does not have to be set, and the search may be continued until $Si+1(A)$ is an empty set.

2.4.2 Path Group Extraction

The processing to extract a path group corresponding to Step S504 in FIG. 16 will be described. The path extracting unit 113 extracts a path group including one or more paths connecting a node representing the first company and a node representing the second company together through one or more links.

For instance, let the subnetwork 122 extracted by the subnetwork extracting unit 112 be an upstream subnetwork. In this case, a company upstream of the first company is selected as the second company. The path extracting unit 113 extracts, from the subnetwork 122 illustrated in FIG. 9 for instance, a path extending from the node representing the second company to the node representing the first company, and connecting them together through one or more links.

In this embodiment, the path extracting unit 113 at this time extracts a path group including the shortest path, which is a specific condition. For instance, the path extracting unit 113 firstly extracts all paths connecting the node representing the second company and the node representing the first company together through one or more links. For each of the extracted paths, the path extracting unit 113 calculates the number of links included in the path. The path extracting unit 113 extracts one or more of the paths having the fewest links and determines the extracted path or paths as a path group. In the foregoing manner, the path extracting unit 113 can extract a path group including one of more paths. The extracted path group is displayed onto, for instance, the display unit 240 in the processing in Step S505.

Figure 17:
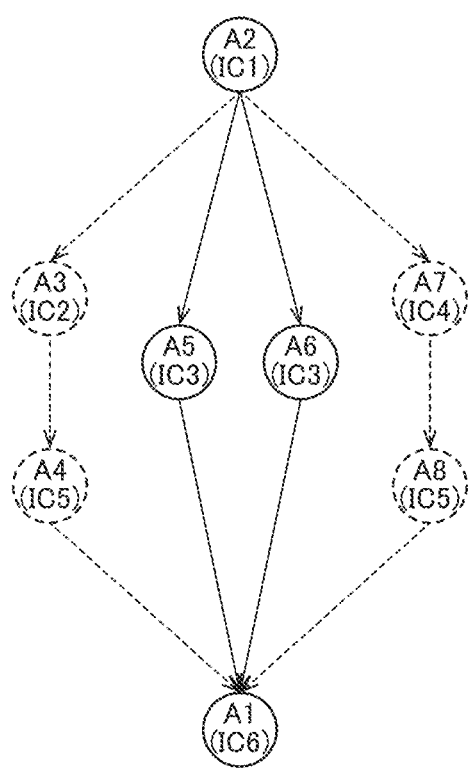
FIG. 17 is a schematic diagram illustrating path group extraction.

FIG. 17 is a schematic diagram illustrating path group extraction. FIG. 17 illustrates companies represented by their respective nodes. For instance, the node "A1" represents a company A1. Further, in FIG. 17, the nodes are provided with their respective industrial classifications in parentheses. For instance, when the node representing the company A1 is provided with an industrial classification IC6, "(IC6)" is assigned to the node. The same notational system is applied to the other drawings depicting nodes. It is noted that some of the drawings omits the notation of an industrial classification.

FIG. 17 illustrates all the paths from a node representing a second company A2 to the node representing the first company A1 connected together through one or more links in a subnetwork upstream of the first company A1. That is, in this example, there are four paths in total from the node representing the first company A1 to the node representing the second company A2. To be specific, a first path is a path tracking the nodes A2, A3, A4, and A1 in the stated order. A second path is a path tracking the nodes A2, A5, and A1 in the stated order. A third path is a path tracking the nodes A2, A6, and A1 in the stated order. A fourth path is a path tracking the nodes A2, A7, A8, and A1 in the stated order. It is noted that the Specification hereinafter describes "the node representing the company A" also as a "node A".

The path extracting unit 113 extracts a path satisfying a specific condition, i.e., the shortest path, from among these four paths. The shortest path can be determined based on the number of links that each path has. For instance, the first path has three links, the second path has two links, the third path has two links, and the fourth path has three links. Thus, paths having the fewest links are the second path and the third path, each of which has two links. As such, the path extracting unit 113 in this example extracts the second path and the third path as a path group.

The path group extracted in the foregoing manner is displayed onto, for instance, the display unit 240 in the processing in Step S505. In this example, only the second path, tracking the nodes A2, A5, and A1 in the stated order, and the third path, tracking the nodes A2, A6, and A1 in the stated order, are displayed onto the display unit 240.

It is noted that for paths that is to be extracted and displayed onto the display unit 240, their links and nodes are denoted by solid lines in FIG. 17. It is also noted that for paths included in the subnetwork 122, but that is not to be extracted because, for instance, the paths do not satisfy the specific condition, and is thus not to be displayed onto the display unit 240, their links and nodes are denoted by broken lines. In the drawings hereinafter, the links and nodes that are to be displayed are distinguished, in a similar manner, from the links and nodes that are not to be displayed.

It is also noted that although the foregoing has described an instance where the shortest path is determined based on the number of links, the shortest path may be determined based on the number of nodes included in each path.

2.4.3 Delete Processing

Delete processing included in the path-group redrawing processing corresponding to Step S507 in FIG. 16 will be described. Upon the input receiving unit 114 receiving an operation input for executing the delete processing, the delete processing unit 161 of the redrawing unit 116 executes the delete processing.

The operation input for executing the delete processing is, for instance, an operation input to delete a specific node included in the path group extracted by the path extracting unit 113. For instance, let the path group illustrated in FIG. 17 be extracted by the path extracting unit 113. In this case, only the second path, tracking the nodes A2, A5, and A1 in the stated order, and the third path, tracking the nodes A2, A6, and A1 in the stated order, are displayed on the display unit 240, as earlier described. When the user desires to delete a specific node from the nodes displayed on the display unit 240, the user carries out an operation input to delete the specific node. Such an operation input to delete a specific node corresponds to the operation input for executing the delete processing in this embodiment. When the user thinks that, for instance, a node representing a specific company cannot possibly be actually found among the nodes presented in the supply chain, the user carries out the operation input to delete the node representing the specific company.

Figure 18:
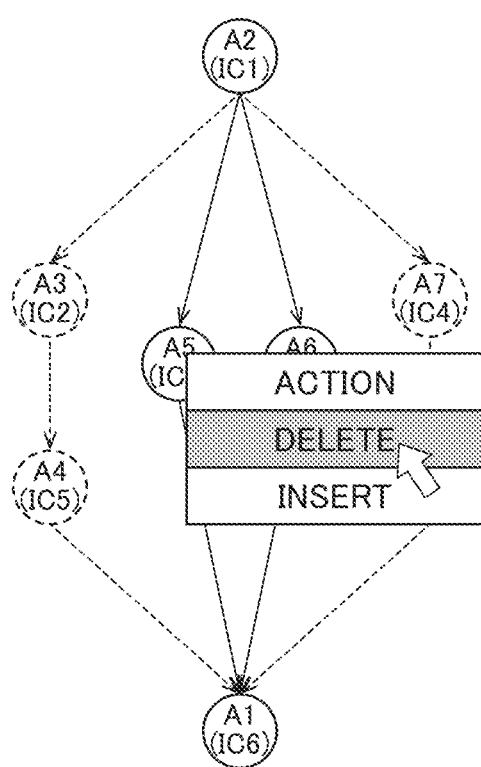
FIG. 18 a schematic diagram illustrating an operation input to delete a specific node.

FIG. 18 a schematic diagram illustrating an operation input to delete a specific node. The user herein, by way of example, desires to delete a node representing the company A5. The user in this case carries out an input for executing predetermined processing on the node A5. For instance, the user moves the cursor on the node A5 displayed on the display unit 240 and clicks the mouse there. Accordingly, a command for deleting the node A5 is displayed, as illustrated in FIG. 18 for instance. Upon a user' operation input to select the command for deleting the node A5, the input receiving unit 114 receives the operation input.

Upon the input receiving unit 114 receiving the operation input to delete the specific node (herein, the node A5), the delete processing unit 161 of the redrawing unit 116 executes the delete processing. To be specific, the delete processing unit 161 redraws a path group including, in the subnetwork, a path connecting the node representing the first company A1 and the node representing the second company A2 together through one or more links, and not passing through the specific node. Like the path extracting unit 113, the delete processing unit 161 at this time may perform the redrawing by extracting a path satisfying a specific condition. That is, the delete processing unit 161 in this example may perform the redrawing by extracting the shortest path, which is the specific condition.

Figure 19:
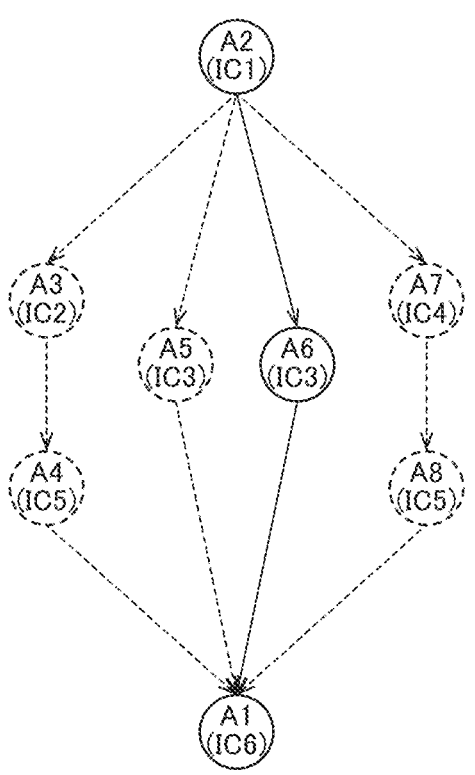
FIG. 19 is a schematic diagram illustrating a result of redrawing in delete processing.

FIG. 19 is a schematic diagram illustrating a result of the redrawing in the delete processing. In this example, the shortest path connecting the node A1 and the node A2 together through links, and not passing through the node A5 is the third path, tracking the nodes A2, A6, and A1 in the stated order. Thus, as illustrated in FIG. 19, the delete processing unit 161 redraws the third path, tracking the nodes A2, A6, and A1 in the stated order. The second path, tracking the nodes A2, A5, and A1 in the stated order, is not extracted in the redrawing. The delete processing unit 161 causes the display unit 240 to display the redrawn path (Step S508 in FIG. 16). In this case, only the third path, tracking the nodes A2, A6, and A1 in the stated order, is displayed onto the display unit 240, as illustrated in FIG. 19.

Figure 20:
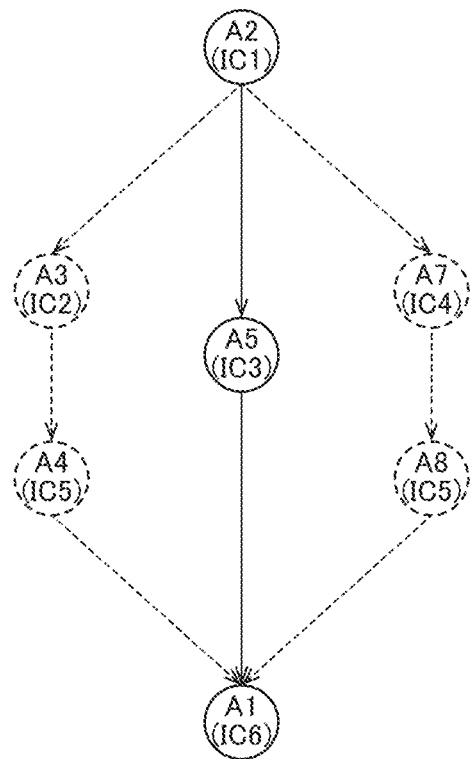
FIG. 20 is a schematic diagram illustrating another example of the delete processing.

FIG. 20 is a schematic diagram illustrating another example of the delete processing. FIG. 20 specifically illustrates another example of the subnetwork 122 extracted by the subnetwork extracting unit 112, and of a path group extracted by the path extracting unit 113. The example illustrated in FIG. 20 is the same as the example illustrated in FIG. 17 with the exception that there is no node A6. That is, in the example illustrated in FIG. 20, the subnetwork 122 includes the following: the first path, tracking the nodes A2, A3, A4, and A1 in the stated order; the second path, tracking the nodes A2, A5, and A1 in the stated order; and the fourth path, tracking the nodes A2, A7, A8, and A1 in the stated order. Only the second path, which is the shortest of these three paths, is extracted as a path group and displayed on the display unit 240.

Figures 21, 22:
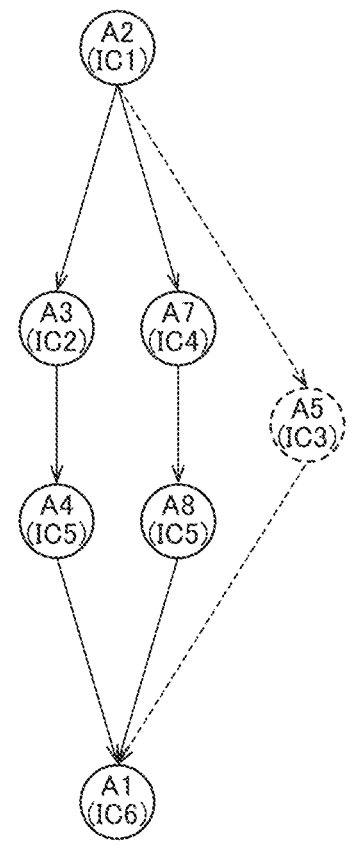
FIG. 21 is a schematic diagram illustrating a result of redrawing in the other example of the delete processing.
FIG. 22 illustrates an example input screen for designating an industrial classification that is to be deleted.

Let the user carry out an operation input to delete the node A5 in this condition. Upon the input receiving unit 114 receiving the operation input to delete the node A5, the delete processing unit 161 redraws a path group including, in the subnetwork, a path connecting the node representing the first company A1 and the node representing the second company A2 together through one or more links, and not passing through the node A5. In the example in FIG. 20, paths not passing through the node A5 are the first path and the fourth path. Thus, the delete processing unit 161 redraws the first path, tracking the nodes A2, A3, A4, and A1 in the stated order, and the fourth path, tracking the nodes A2, A7, A8, and A1 in the stated order, as illustrated in FIG. 21 for instance. The redrawn path group including the first path and fourth path is displayed onto the display unit 240.

It is noted that the first path and the fourth path are each composed of three links. However, when either the first path or the fourth path includes four or more links, only the path whichever having fewer links, i.e., the shortest path, may be redrawn.

The operation input to execute the delete processing may be performed by, for instance, designating an industrial classification. FIG. 22 illustrates an example input screen for designating an industrial classification that is to be deleted. As earlier described, each node is provided with the industrial classification of a company represented by the node. The industrial classifications herein are denoted as IC1, IC2, IC3, IC4, . . . , as illustrated in FIG. 22. For instance, as presented in parentheses, the node A1 is provided with an industrial classification IC6, the node A2 is provided with an industrial classification IC1, the node A3 is provided with an industrial classification IC2, the nodes A4 and A8 are provided with an industrial classification IC5, the nodes A5 and A6 are provided with an industrial classification IC3, and the node A7 is provided with an industrial classification IC4.

When the user desires to delete a node that is included in the path group displayed on the display unit 240, and that is provided with a specific industrial classification, the user carries out an operation input to delete the node provided with the specific industrial classification. Such an operation input to delete a node provided with a specific node corresponds to the operation input to execute the delete processing in this embodiment. When the user thinks that, for instance, a company represented by a node that is included in the nodes presented in the supply chain, and that is provided with a specific industrial classification cannot possibly be found in the supply chain of the actual trading, the user carries out the operation input to delete the node provided with the specific industrial classification.

The user herein, by way of example, desires to delete a node provided with the industrial classification IC3. The user in this case carries out an operation input to display a screen for inputting the industrial classification that is to be deleted. In response to this operation input, radio buttons illustrated in FIG. 22, for instance, are onto the display unit 240. The user carries out, using a radio button, an operation input to select the industrial classification IC3, which is to be deleted. Upon the user's operation input to select the industrial classification that is to be deleted, the input receiving unit 114 receives this operation input. Upon receipt of the operation input, the delete processing unit 161 executes the delete processing. It is noted that the selection of an industrial classification that is to be deleted does not necessarily have to be made using a radio button. The selection of an industrial classification that is to be deleted may be input by any other means.

Figure 23:
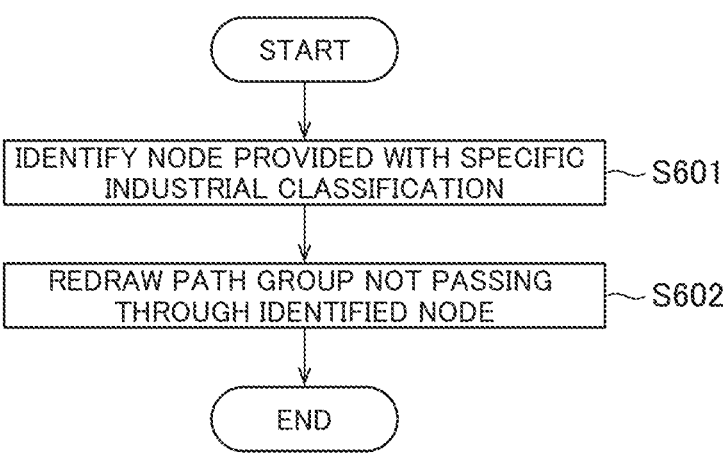
FIG. 23 is a flowchart showing the delete processing executed when a node that is to be deleted is identified with an industrial classification.

FIG. 23 is a flowchart showing the delete processing executed when a node that is to be deleted is identified with an industrial classification.

In the first process step, i.e., Step S601, the delete processing unit 161 identifies a node included in the subnetwork 122 and provided with the specific industrial classification IC3 selected by the user. For instance, in the example illustrated in FIG. 17, the delete processing unit 161 identifies the nodes A5 and A6, provided with the specific industrial classification IC3.

Figure 24:
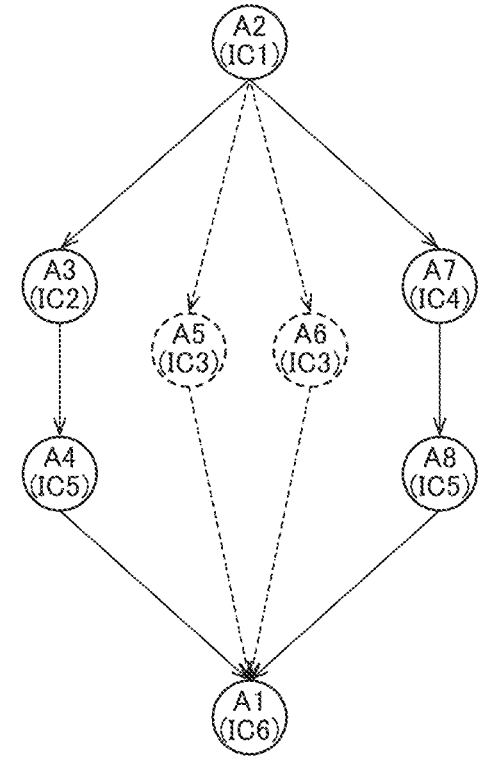
FIG. 24 is a schematic diagram illustrating a result of redrawing in the delete processing executed when a node that is to be deleted is identified with the industrial classification.

In Step S602, the delete processing unit 161 then redraws a path group not passing through the nodes identified in Step S601, that is, a path group not passing through either the node A5 or the node A6. FIG. 17 illustrates an instance where in the subnetwork 122, a path group including the first path, tracking the nodes A2, A3, A4, and A1 in the stated order, and the fourth path, tracking the nodes A2, A7, A8, and A1 in the stated order, is redrawn as the path group not passing through either of the node A5 and node A6. Accordingly, the path group including the first path and the fourth path is redrawn, as illustrated in FIG. 24 for instance. The redrawn path group including the first path and the fourth path is displayed onto the display unit 240.

It is noted that the first path and the fourth path are each composed of three links. However, when either the first path or the fourth path is composed of four or more links, only the path whichever having fewer links, that is, the shortest path, may be redrawn.

Through such delete processing as described, a path group not passing through a specific node is redrawn. The redrawn path group does not present the specific node. Thus, the server system 100 can redraw a path group so as not to present the node of a company that the user does not desire to present in the path group. For instance, the server system 100 can delete a company not constituting the actual supply chain from the path group in accordance with a user's operation input. This can generate a path group reflecting the actual supply chain more accurately and can display the path group onto the display unit 240.

It is noted that the foregoing has described an instance where the shortest path in a path group is redrawn in response to a delete of any of the nodes. However, the processing in this embodiment is not limited to this instance; a path group after deletion may be displayed based on the similarity determined through the foregoing technique.

For instance, in response to an operation input to delete any of the nodes included in the path group, the redrawing unit 116 may redraw a path group including a substitute node with the similarity to a delete target node standing at a predetermined threshold or greater. Accordingly, a path group including a node with high similarity to a deleted node undergoes redrawing. This enables a path group having a characteristic (e.g., network structure) close to that before deletion to be redrawn even when the delete processing is executed.

For instance, the delete processing unit 161 determines, as substitute candidate paths, nodes except a delete target node included in a path group connecting the node corresponding to the first company and the node corresponding to the second company together. The delete processing unit 161 then determines the similarity to the delete target node for each of the substitute candidate paths and determines the substitute candidate path having the highest similarity as a substitute node.

In the example in FIG. 17, in response to the operation input to delete the node A5, the delete processing unit 161 selects the nodes A3 to A4 and nodes A6 to A8 as substitute candidate paths and obtains the similarity between each substitute candidate path and the node A5. It is noted that the similarity between the nodes may be calculated in advance, as earlier described with reference to FIGS. 4 and 7. Alternatively, only the vectorial representation of each node may be determined in advance, and this similarity calculation may be executed in the redrawing. It is also noted that the calculation of the vectorial representation of each node and the similarity calculation may be executed sequentially in the redrawing.

The delete processing unit 161 then selects the node having the highest similarity to the node A5 as a substitute node and determines a path group including the substitute node as a redrawing target. For instance, when the node A3 or the node A4 is a substitute node, the first path, tracking the nodes A2, A3, A4, and A1 in the stated order, is redrawn. Further, when the node A6 is a substitute node, the third path, tracking the nodes A2, A6, and A1 in the stated order, is redrawn. Further, when the node A7 or the node A8 is a substitute node, the fourth path, tracking the nodes A2, A7, A8, and A1 in the stated order, is redrawn. It is noted that a predetermined number of nodes rather than a single substitute node may be selected as substitute nodes, or that all nodes with their similarity standing at a predetermined threshold or greater may be selected as substitute nodes. It is also noted that the number of paths that are to be redrawn is not limited to one; a path group including a plurality of paths may be redrawn.

2.4.4 Node Adding Processing

The node adding processing included in the path-group redrawing processing corresponding to Step S507 in FIG. 16 will be described. The node adding unit 162 of the redrawing unit 116 executes the node adding processing upon the input receiving unit 114 receiving an operation input for executing the node adding processing. The operation input for executing the node adding processing is to add an additional node to a path group by, for instance, connecting, through a link, the node of a company not included in the path group extracted by the path extracting unit 113 to any one of the nodes included in the path group.

The redrawing unit 116 in this embodiment may redraw the path group including the additional node by extracting candidate nodes (node Z, which will be described later on) that are to be possibly connected to the additional node (node Y, which will be described later on) through the link, and by connecting any one of the candidate nodes selected based on the similarity to the additional node through the link. Doing so enables a path group including an additional node to be redrawn by using an appropriate node based on with the similarity.

To be specific, in accordance with the similarity between each of the candidate nodes and another node included in the supply chain network 122, the redrawing unit 116 may calculate an index indicating the likelihood that a virtual local graph GV(Z) (described later on), which is formed when the additional node is connected to the candidate node, appears in the supply chain network 122. The redrawing unit 116 then determines a node that is to be connected to the additional node from among the candidate nodes in accordance with the index. The similarity in this embodiment is determined using a complex vector representation, and the complex vector representation, which, as earlier described, includes a phase corresponding to the number of stages counted from the selected node, is information reflecting a specific network structure. That is, using the similarity based on the complex vector representation can make an appropriate comparison between the virtual local graph GV(Z) and an already existing graph structure, thereby enabling a local graph GV(Z) that is more likely to appear in the supply chain network 121 to be added. The following describes the node adding processing specifically.

Figure 25:
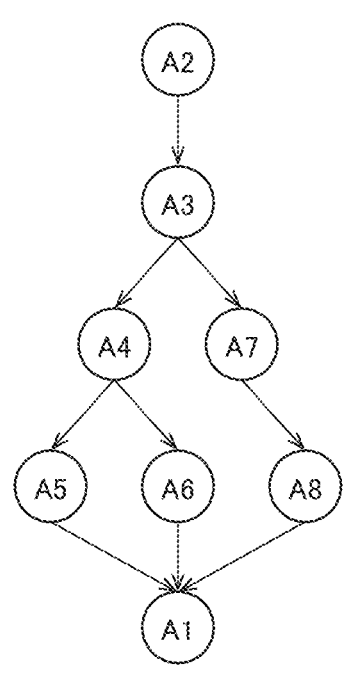
FIG. 25 is a schematic diagram illustrating node adding processing.

FIG. 25 is a schematic diagram illustrating the node adding processing. FIG. 25 illustrates a path group extracted by the path extracting unit 113. In the example illustrated in FIG. 25, there is only a path group extracted as the shortest path from the node A2 to the node A1, and there is no path included in the subnetwork 122 but being not the shortest path. To be specific, FIG. 25 illustrates the following: a fifth path tracking the nodes A2, A3, A4, A5 and A1 in the stated order; a sixth path tracking the nodes A2, A3, A4, A6, and A1 in the stated order; and a seventh path tracking the nodes A2, A3, A7, A8, and A1 in the stated order.

As to this path group, the user desires to add a node representing the company Y to the path group. The user also knows that the company Y provides (sells) a trading product to the company A1. The user in this case carries out an operation input to add the node representing the company Y to the path group. Such an operation input to add a new node corresponds to the operation input to execute the node adding processing in this embodiment. For instance, when the user cannot find, in the path group, a company that directly trades with the user's company, the user carries out an operation input to add a node representing this trading company. To be specific, one possible case is where the company Y is not found in the original database.

Figure 26:
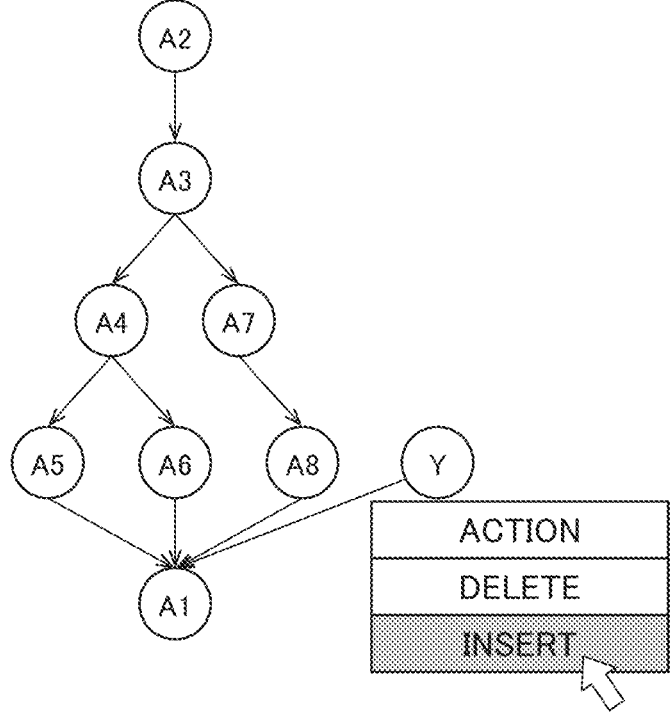
FIG. 26 is a schematic diagram illustrating an operation input to add a new node.

FIG. 26 is a schematic diagram illustrating an operation input to add a new node. The user herein, by way of example, desires to add the node representing the company Y. The user in this case carries out an input to add an additional node Y indicating the company Y to the path group. For instance, the user moves the cursor to a position in which no node is present in the path group displayed on the display unit 240 and clicks the mouse there. Accordingly, a command for adding an additional node is displayed, as illustrated in FIG. 26 for instance. Upon a user's operation input to select the command for adding the additional node, the input receiving unit 114 receives the operation input. The input receiving unit 114 at this time may receive an input of an industrial classification that is to be provided to the additional node.

Further, the user carries out an operation input to select a node that is to be connected to the additional node Y through a link from among the nodes included in the path group.

Herein, the user carries out an operation input to connect the additional node Y to the node A1 through a link, as illustrated in FIG. 26.

Upon the input receiving unit 114 receiving the operation input to add the additional node (herein, the node Y), the node adding unit 162 of the redrawing unit 116 executes the node adding processing. To be specific, the node adding unit 162 redraws the path group including the additional node by connecting any one of the candidate nodes, which are candidates for a node that is to be possibly connected to the additional node through the link, to the additional node through the link. The node adding unit 162 extracts drawing candidate nodes from the candidate nodes in accordance with, for instance, the similarity and causes the display unit 240 to display information on the drawing candidate nodes. For instance, the node adding unit 162 causes the display unit 240 to display company names represented by the extracted drawing candidate nodes. The node adding unit 162 connects, to the additional node through the link, the node of a company selected by a user's operation input from among the companies represented by the drawing candidate nodes displayed on the display unit 240.

FIG. 27 is a flowchart showing the node adding processing. That is, FIG. 27 is a flowchart showing an example of the node adding processing included in the path-group redrawing processing corresponding to Step S507 in FIG. 16. The process shown in FIG. 27 is executed upon the input receiving unit 114 receiving the operation input to add the node Y.

In the flow in FIG. 27, the node adding unit 162 of the redrawing unit 116 calculates the likelihood that the virtual local graph GV(Z), which is formed in the supply chain network 121 when the additional node is connected to a single node included in the supply chain network 121, appears in the supply chain network 121.

This appearance likelihood is determined based on the similarity calculated with a complex vector representation. As earlier described, the complex vector representation in this embodiment has elements each of which is a complex number including a phase corresponding to the number of stages counted from a selected node, and thus, the complex vector representation contains information on a specific network structure. Hence, for a calculation of the similarity between each node included in the supply chain network 121 and a processing target node, a network structure, i.e., the local graph GV(Z), similar to that of the processing target node conceivably appears in the supply chain network 121 frequently when there is a large number of nodes with their similarity standing at a predetermined value or greater. Conversely, a network structure similar to that of the processing target node is less likely to appear in the supply chain network 121 when there is a small number of nodes with their similarity standing at the predetermined value or greater.

For instance, the node adding unit 162 calculates, through Step S701 and Step S702, the likelihood that the virtual local graph GV(Z) appears in the supply chain network 121.

To be specific, in the first process step, i.e., Step S701, the node adding unit 162 identifies all candidates for the node (candidate nodes) Z, which serves as an endpoint upstream of and adjacent to the additional node Y when the additional node Y is inserted. The candidate nodes herein may be all the nodes included in the supply chain network 121, or nodes satisfying a specific condition. The specific condition can be determined as appropriate; possible examples include a node provided with a specific industrial classification, and a node representing a company located at a specific address. The specific condition may be input by, for instance, the user.

In Step S701, the node adding unit 162 also determines the vectorial representation of each candidate node Z. The vectorial representation herein is information indicating the virtual local graph GV(Z). The virtual local graph GV(Z) is a graph composed of the additional node Y, the node A1 selected when connected to the additional node Y, and a local graph G(Z) with respect to the candidate node Z. The local graph G(Z) is part of a network in which the candidate node Z serves as an endpoint in the supply chain network 121, and the local graph G(Z) is composed of the candidate node Z serving as an endpoint, and nodes spaced away by up to a distance d. Here, d is an integer that is determined as appropriate, and that is equal to or greater than one; for an upstream node, d is counted upstream from the candidate node Z, and for a downstream node, d is counted downstream from the candidate node Z. The distance d herein may be the same as or different from the value k described earlier with reference to FIGS. 11A and 11B. The virtual local graph GV(Z) is a virtual local graph in which the local graph G(Z), the additional node Y, and the node A1 selected when connected to the additional node Y are connected together through links.

Figure 28A:
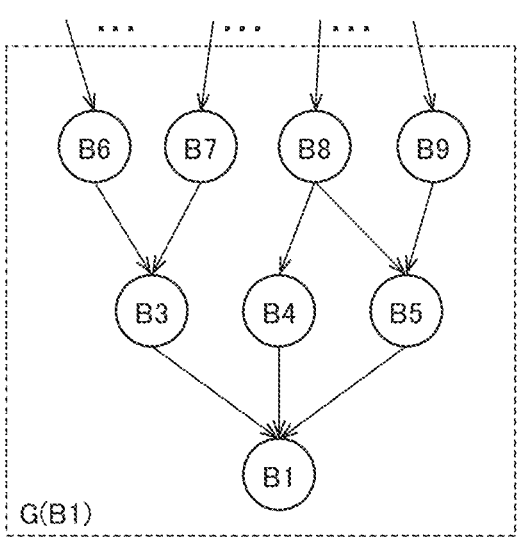
FIG. 28A is an example local graph.
Figure 28B:
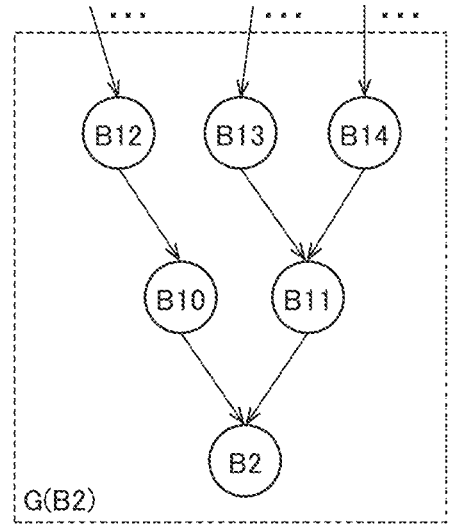
FIG. 28B is an example local graph.

FIGS. 28A and 28B illustrate example local graphs. To be specific, FIG. 28A is a graph illustrating an example of a local graph G(B1) composed of a node B1 serving as an endpoint, and nodes upstream away by up to the distance d. FIG. 28B is a graph illustrating an example of a local graph G(B2) composed of a node B2 serving as an endpoint, and nodes upstream away by up to the distance d. These drawings herein both illustrate a local graph where the distance d satisfies d=2. The local graphs G(B1) and G(B2) are each a local graph included in the supply chain network 121. FIG. 28A illustrates only a local graph having the node B1 serving as an endpoint, and FIG. 28B illustrates only a local graph having the node B2 serving as an endpoint; however, the candidate nodes are not limited to the nodes B1 and B2.

Figure 29A:
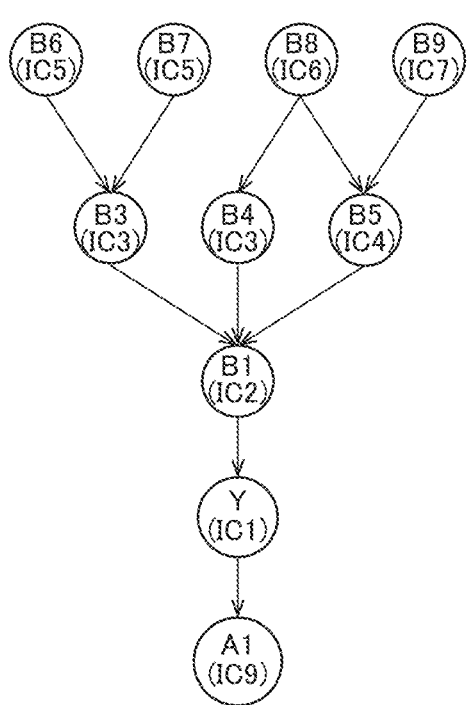
FIG. 29A is an example virtual local graph.
Figure 29B:
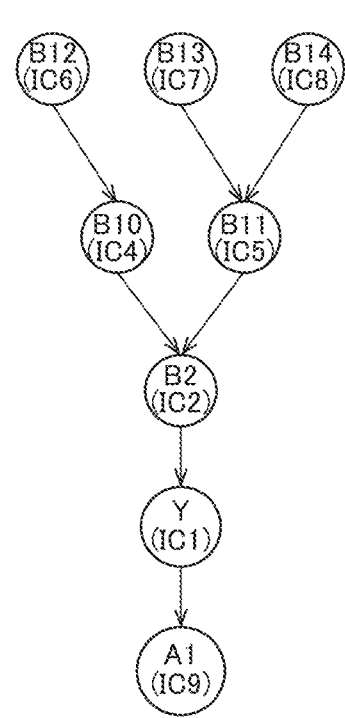
FIG. 29B is an example virtual local graph.

FIGS. 29A and 29B illustrate examples of the virtual local graph GV(Z). To be specific, FIG. 29A is a virtual local graph GV(B1) in which the local graph G(B1) illustrated in FIG. 28A, the additional node Y, and the node A1 selected when connected to the additional node Y are connected together through links. FIG. 29B is a virtual local graph GV(B2) in which the local graph G(B2) illustrated in FIG. 28B, the additional node Y, and the node A1 selected when connected to the additional node Y are connected together through links. As illustrated in FIGS. 29A and 29B, in these virtual local graphs, a candidate node B1 or B2 and the additional node Y are connected together through a link, and the additional node Y and the node A1 are connected together through a link.

For instance, the subnetwork extracting unit 112 may determine a local graph G composed of nodes upstream of the candidate node Z by up to d stages, further add the node Y directly downstream of the candidate node Z and extract the subnetwork 122 having the node A1 added directly downstream of the node Y. The vector obtaining unit 171 subjects this subnetwork 122 to the processes illustrated in FIGS. 11A and 11B, to thus determine the vectorial representation of the candidate node Z. The vectorial representation of the candidate node Z herein corresponds to the virtual local graph GV(Z) processed into a vector.

It is noted that the subnetwork extracting unit 112 may extract the subnetwork 122 by determining a local graph G' composed of nodes upstream of the candidate node Z by up to d stages, and nodes downstream of the candidate node Z by up to d stages, and then adding the node Y and node A1 to the local graph G'. That is, a specific configuration of the virtual local graph GV(Z) and its vectorial representation can be modified in various manners.

In Step S702, the node adding unit 162 calculates an appearance likelihood p. The node adding unit 162 herein calculates the appearance likelihood p in accordance with the similarity between the vectorial representation of the candidate node Z corresponding to the virtual local graph and the vectorial representation of each node included in the supply chain network 121.

To be specific, the node adding unit 162 calculates, for all the candidate nodes Z selected in Step S701, "the number p of nodes included in the supply chain network 121 and having a similarity of $\delta$ or higher to the candidate nodes Z", as "the appearance likelihood p of the virtual local graph GV(Z) in the supply chain network 121". The threshold $\delta$ herein, which is a predetermined criterion, may be determined based on, but not limited to, a method of calculating the appearance likelihood. For p nodes determined as having a similarity of $\delta$ or higher to the node Z, the node adding unit 162 adds a 3-tuple $\{Z, p, s\}$ to a list P(Y), where s denotes the average similarity of the similarities of the individual nodes. It is noted that the list P(Y) is initialized as an empty set in advance.

The virtual local graph GV(Z) tends to appear in the supply chain network 121 more frequently as the appearance likelihood pin the supply chain network 121 calculated in Step S702 increases, and thus, the virtual local graph GV(Z) can be said to be a local graph that can probably appear in the supply chain network 121. Although in S702, the appearance likelihood p in the supply chain network 121 is defined as the number p of nodes having a similarity of $\delta$ or higher to the candidate node Z, the virtual local graphs GV(Z) may be ordered by using another calculable index.

Further, a comparison in likelihood between the two virtual local graphs GV(Z1) and GV(Z2) with their appearance likelihoods p being equal to each other may be made by comparing average values of the similarities, or comparing maximum values of the similarities. There are various techniques to compare the likelihoods of the two virtual local graphs, and techniques to compare the likelihoods are not limited to the techniques described here.

It is noted that nodes that are targets for the calculation of the similarity to the candidate node Z may be all the nodes included in the supply chain network 121, or some of the nodes. For instance, FIGS. 29A and 29B illustrate, by way of example, that the industrial classification of the node Y is IC1, and that the industrial classification of the node A1 is IC9. Accordingly, the node adding unit 162 may determine, from among the nodes included in the supply chain network 121, a node connected to a node whose industrial classification is IC1 one stage downstream, and connected to a node whose industrial classification is IC9 one stage downstream of this IC1 node, as a target for the calculation of the similarity to the candidate node Z. Other than the foregoing, a node that is a target for the calculation of the similarity to the candidate node Z can be determined through various methods.

The node adding unit 162 determines one or more candidate nodes selected based on the appearance likelihood p as drawing candidate nodes. For instance, the node adding unit 162 may redraw a path group including a node selected by the user from among a plurality of drawing candidate nodes.

To be specific, in Step S703, the node adding unit 162 determines whether the list P(Y) is an empty set. That is, the node adding unit 162 determines whether the list P(Y) records at least one 3-tuple {Z, p, s} consisting of a company, an appearance likelihood, and an average similarity.

If the list P(Y) is an empty set, that is, if the list P(Y) records no 3-tuple consisting of a company, an appearance likelihood, and an average similarity (if YES in Step S703), the node adding unit 162 changes the threshold value δ in Step S704. The threshold value δ is changed in such a manner that the list P(Y) is not an empty set. Thus, here for instance, the threshold value δ is changed so as to become small. The range of change in the threshold value δ may be determined as appropriate in accordance with a condition, such as a method of similarity calculation. Upon changing the threshold value δ in Step S704, the node adding unit 162 executes the foregoing processing in Step S702.

If the list P(Y) is not an empty set, that is, if the list P(Y) records at least one 3-tuple consisting of a company, an appearance likelihood, and an average similarity (if NO in Step S703), the node adding unit 162 determines a node corresponding to the company Z included in the list P(Y) as a drawing candidate node. In Step S705, the node adding unit 162 causes the display unit 240 to display either the company Z or the company Z provided with additional information, such as the average similarity s, in the 3-tuple {Z, p, s} included in the list P(Y). The node adding unit 162 at this time causes the display unit 240 to display the companies Z or the companies Z provided with additional information, such as the average similarity s, in descending order of the appearance likelihood p. When a plurality of companies have the same appearance likelihood p, the node adding unit 162 causes the display unit 240 to display the companies in descending order of the average similarity s. That is, the node adding unit 162 causes the display unit 240 to display the companies Z of drawing candidate nodes that are to be connected to the additional node Y through a link.

Figure 30:
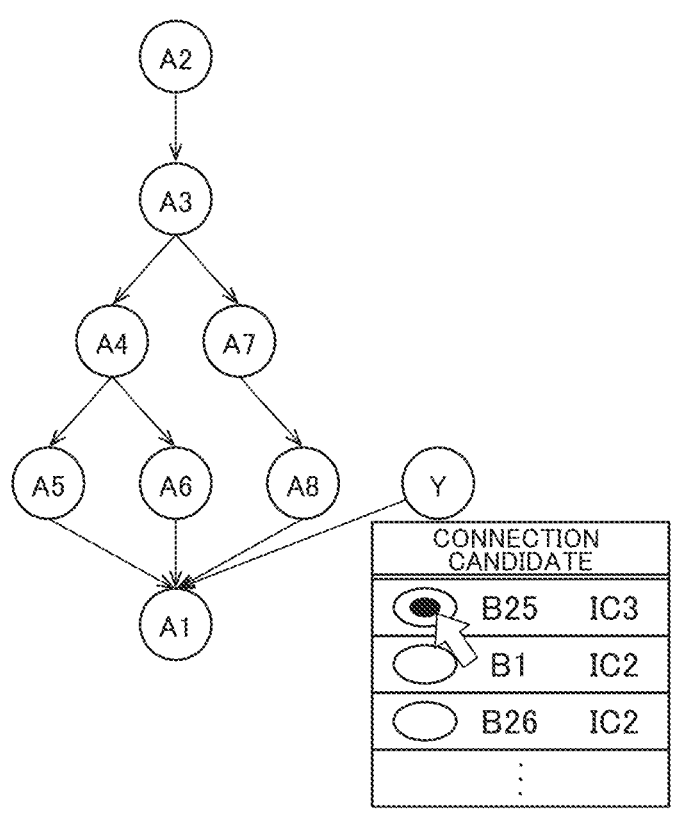
FIG. 30 illustrates an example display of companies represented by nodes connected to an additional node through links.

FIG. 30 illustrates an example display of companies represented by drawing candidate nodes. As illustrated in FIG. 30, the companies represented by the drawing candidate nodes may be displayed in the form of, for example, radio buttons. The companies represented by the drawing candidate nodes may be displayed in, for instance, descending order of the appearance likelihood p, and the companies, when having the same the appearance likelihood p, may be displayed in descending order of the average similarity s. Further, as illustrated in FIG. 30, industrial classifications provided to the drawing candidate nodes may be displayed together with the companies represented by the drawing candidate nodes. Further, instead of the appearance likelihood p, the node adding unit 162 may use, as an index, the proportion of the appearance likelihood p to the number of all nodes, to display the companies Z in descending order of the index. Further, the node adding unit 162 causes the display unit 240 to display additional information, such as the average similarity s, together with or instead of the companies Z.

The user carries out, using a radio button, an operation input to select a company whose node is to be connected to the additional node Y through a link. Herein, let the company B25 be selected. Upon the user's operation input for selection, the input receiving unit 114 receives this operation input. It is noted that the selection of a company whose node is to be connected to the additional node Y through a link does not necessarily have to be made using a radio button. The selection of a company whose node is to be connected to the additional node Y through a link may be made using any other means.

Upon the input receiving unit 114 receiving of the operation input, the node adding unit 162 in Step S706 connects a node representing the selected company B25 and the additional node Y together through a link.

In Step S707, the node adding unit 162 then redraws a path group including the additional node Y. To be specific, the node adding unit 162 extracts a path group including a path connecting, through links, the node A2 through the selected node B25 and additional node Y to the node A1. The node adding unit 162 at this time may extract a path connecting the node A2 to the node B25 through links, in accordance with the supply chain network 121. The node adding unit 162 may extract a path from the node A2 to the node B25 satisfying a specific condition. For instance, the node adding unit 162 may extract the shortest path from the node A2 to the node B25.

Figure 31:
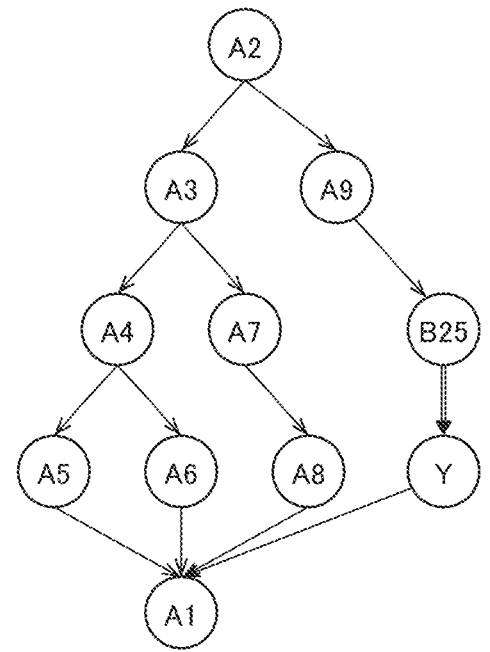
FIG. 31 is a schematic diagram illustrating a result of redrawing in the node adding processing.

FIG. 31 is a schematic diagram illustrating a result of redrawing in the node adding processing. As illustrated in FIG. 31, the node A2 to the node B25 are connected through links as an extracted path. In the example illustrated in FIG. 31, the supply chain network 121, which is configured such that the node A2 is connected to the node B25 by way of the node A9 through links, includes the nodes A2, A9 and B25 connected together in the stated order through the links. Further, in response to a user's selection of the node B25, and the selected node B25 is connected to the additional node Y through a link. Furthermore, in response to a user's input operation to connect the additional node Y to the node A1 through a link, the additional node Y is connected to the node A1 through the link. In the foregoing manner, the node adding unit 162 can generate the result of the redrawing, as illustrated in FIG. 31 for instance.

The path group redrawn in Step S708 is displayed onto the display unit 240 in accordance with the processing executed by the presentation processing unit 115 (Step S508 in FIG. 16).

It is noted that the presentation processing unit 115 may present a link connecting the additional node Y and the node of the company selected in Step S706 in FIG. 27 together, in a manner different from those in the other links. Herein, the node of the company selected in Step S706 in FIG. 27 is the node B25. Thus, the presentation processing unit 115 may present the link connecting the additional node Y and the node B25 together in a manner different from those in the other links, as illustrated in FIG. 31 for instance. The link may be presented in any manner where the user can recognize the link. In FIG. 31, the link connecting the node B25 and the additional node Y together is denoted by a double-line arrow, unlike the other links. It is noted that the link connecting the node B25 and the additional node Y together may be presented in any manner.

The node adding processing allows the user to redraw a path group including a node not included in the supply chain network 121. Consequently, when the user has, for instance, information on an inter-company trading relationship that is not available from the open information, this trading relationship information can be reflected on the path group.

Further, in the node adding processing, drawing candidate nodes selected from among candidate nodes in accordance with the similarity are displayed, and the user selects a node that is to be connected to the additional node from among the companies represented by the displayed drawing candidate nodes. That is, a node that is to be connected to the additional node is determined in view of the structure of the subnetwork 122, which is the virtual local graph GV(Z), including each node. Hence, the redrawing offers a path that highly likely indicates an actual trading relationship. This allows the user to know in what supply chain the company represented by the additional node is located. It is noted that the technique in this embodiment is not limited to the foregoing; the node adding unit 162 may select a single node from among the candidate nodes in accordance with the similarity and redraw a path group including the path connecting this selected node and the additional node together. That is, the operation input described with reference to FIG. 30 may be omitted.

It is noted that the foregoing has described an instance where the user connects the additional node Y to the node A1, which is positioned the most downstream in the path group. However, the user does not necessarily have to connect the additional node Y to the node positioned the most downstream in the path group. The additional node Y needs to be connected to any one of the nodes included in the path group.

2.4.5 Substitute-Path Calculating Processing

The substitute-path calculating processing included in the path-group redrawing processing corresponding to Step S507 in FIG. 16 will be described. The substitute-path calculating unit 163 of the redrawing unit 116 executes the substitute-path calculating processing upon the input receiving unit 114 receiving an operation input for executing the substitute-path calculating processing.

The operation input for executing the substitute-path calculating processing is, for instance, an operation input to calculate a substitute path for a target path connecting together upstream and downstream nodes included in a path group extracted by the path extracting unit 113. The operation input for executing the substitute-path calculating processing will be detailed with reference to FIG. 32.

Figure 32:
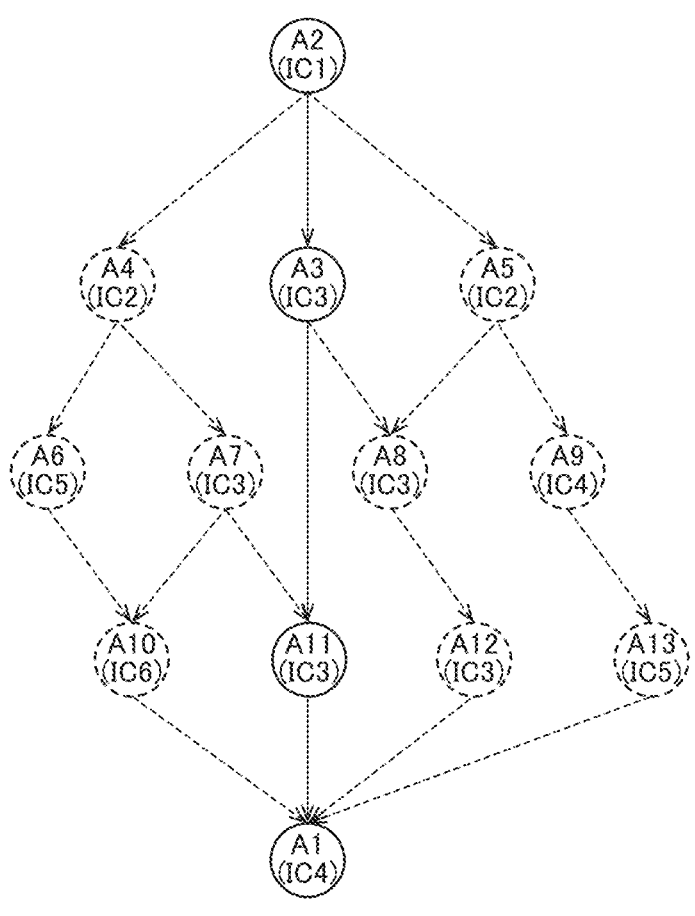
FIG. 32 is a schematic diagram illustrating substitute-path calculating processing.

FIG. 32 is a schematic diagram illustrating the substitute-path calculating processing. FIG. 32 illustrates 13 nodes: the node A1 to the node A13; a path group extracted by the path extracting unit 113 and displayed on the display unit 240 includes only a path composed of the nodes and links denoted by the solid lines. That is, in the example in FIG. 32, the path group extracted by the path extracting unit 113 and displayed on the display unit 240 includes only a path tracking the nodes A2, A3, A11, and A1 in the stated order. The nodes and links denoted by the broken lines are included in the subnetwork 122, but do not form, for example, the shortest path as a specific condition and are hence not extracted by the path extracting unit 113.

The operation input for executing the substitute-path calculating processing includes designation of a target path. The target path is a path that is included in a path group extracted by the path extracting unit 113, and that is to be replaced with the substitute path. This target path designation is executed by, for instance, designating the nodes included in the target path sequentially. For instance, in the example illustrated in FIG. 32, designating the nodes A2, A3, A11, and A1 in the stated order offers a path tracking the nodes A2, A3, A11, and A1 in the stated order as the target path. It is noted that this node designation may be executed through, for instance, a click of a mouse or a touch on a touch panel.

The target path does not necessarily have to include the most upstream node and/or the most downstream node in the path group extracted by the path extracting unit 113. The target path may be only part of a path (partial path) included in the path group extracted by the path extracting unit 113. In the example in FIG. 32, the most upstream node is the node A2, and the most downstream node is the node A1. As such, the target path in the example in FIG. 32 does not necessarily have to include the node A2 and/or the node A1.

For instance, the target path may be a partial path including only the node A3 and node A11.

The most upstream node in the target path is referred to as an "upstream node" in the Specification. On the other hand, the most downstream node in the target path is referred to as an "downstream node" in the Specification. Let a path tracking the nodes A2, A3, A11, and A1 in the stated order be designated as the target path; accordingly, the upstream node is the node A2, and the downstream node is the node A1. On the other hand, let a partial path tracking the nodes A3 and A11 in the stated order be designated as the target path; accordingly, the upstream node is the node A3, and the downstream node is the node A11.

The operation input for executing the substitute-path calculating processing may include an operation input to start the substitute-path calculating processing, in addition to the foregoing target path designation. The operation input for starting the substitute-path calculating processing is executed upon completion of the target path designation. The operation input for starting the substitute-path calculating processing may be carried out through, for instance, an operation using a specific key of the operation unit 250, or an operation using a specific button displayed on the display unit 240.

The operation input for executing the substitute-path calculating processing is received by the input receiving unit 114. The substitute-path calculating unit 163 of the redrawing unit 116 executes the substitute-path calculating processing upon the input receiving unit 114 receiving the operation input for executing the substitute-path calculating processing. To be specific, the substitute-path calculating unit 163 redraws the path group by replacing the designated target path with a substitute path. The substitute path herein is a path connecting the upstream node and the downstream node together through one or more links in the subnetwork 122, and being different from the target path. The substitute-path calculating unit 163 may redrew the path group by replacing the designated target path with one or more substitute paths.

Figure 33:
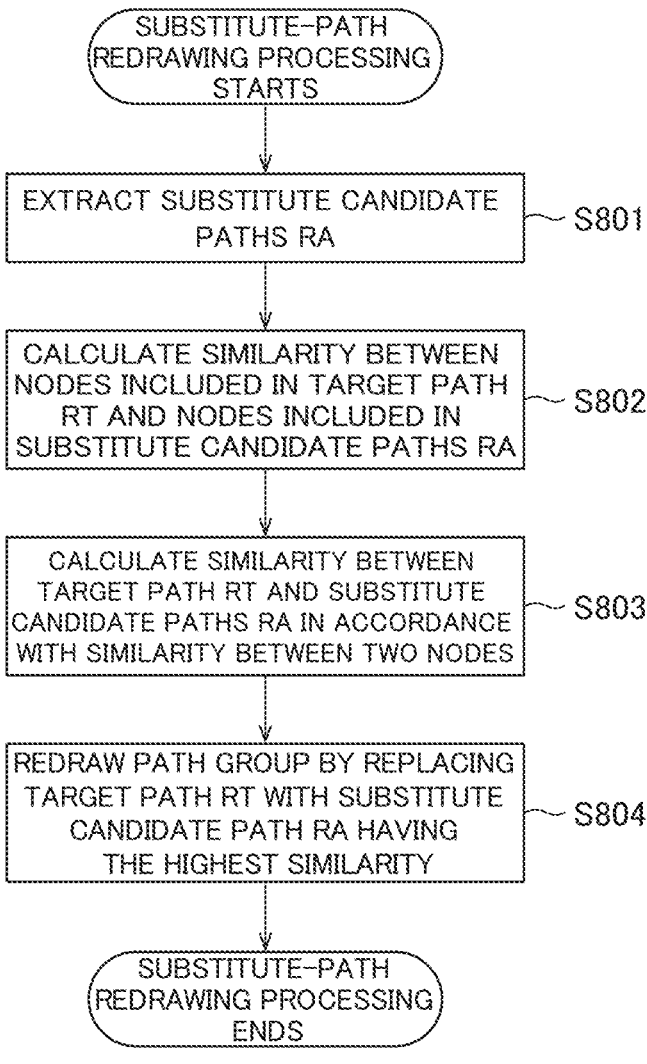
FIG. 33 is a flowchart showing the substitute-path calculating processing.

FIG. 33 is a flowchart showing the substitute-path calculating processing. A specific example of the substitute-path calculating processing will be described with reference to FIG. 33. Here in the example illustrated in FIG. 32, a path tracking the nodes A2, A3, A11, and A1 in the stated order is designated as the target path.

In the first process step, i.e., Step S801, the substitute-path calculating unit 163 extracts substitute candidate paths RA. The substitute candidate paths RA are candidates for the substitute path. The substitute candidate paths RA are each a path included in the subnetwork 122 except a target path RT, and connecting the upstream node and the downstream node together. The substitute-path calculating unit 163 extracts, for instance, all the paths included in the subnetwork 122 except the target path RT, and connecting the upstream node and the downstream node together. The substitute-path calculating unit 163 may extract only some of the paths included in the subnetwork 122 except the target path RT, connecting the upstream node and the downstream node together, and satisfying a specific condition. The specific condition may be the shortest path for instance.

In the example illustrated in FIG. 32, the upstream node is the node A2, and the downstream node is the node A1; thus, the substitute-path calculating unit 163 extracts the substitute candidate paths RA, except the target path RT, connecting the node A2 and the node A1 together. The substitute-path calculating unit 163 herein extracts only the substitute candidate paths RA being the shortest paths, which is the specific condition. In the example illustrated in FIG. 32, the shortest paths, except the target path RT, connecting the node A2 and the node A1 together are the following: a first substitute candidate path tracking the nodes A2, A4, A6, A10, and A1 in the stated order; a second substitute candidate path tracking the nodes A2, A4, A7, A10, and A1 in the stated order; a third substitute candidate path tracking the nodes A2, A5, A8, A12, and A1 in the stated order; and a fourth substitute candidate path tracking the nodes A2, A5, A9, A13, and A1 in the stated order. Thus, the substitute-path calculating unit 163 extracts these four substitute candidate paths RA.

In Step S802, the substitute-path calculating unit 163 obtains the similarity between the nodes included in the target path RT and the nodes included in the substitute candidate paths RA. In the example illustrated in FIG. 32, since there are 13 nodes: the node A1 to A13, the substitute-path calculating unit 163 may obtain $(13 \times 12)/2 = 72$ different similarities.

In Step S803, the substitute-path calculating unit 163 calculates the similarity between the target path RT and the substitute candidate paths RA in accordance with the similarity between the two nodes obtained in Step S802. For instance, since the upstream node (A2) and the downstream node (A1) are common between the target path RT and the substitute candidate paths RA, a comparison may be made between their intermediate nodes. For instance, the target path RT has two intermediate nodes: A3 and A11, and the first substitute candidate path has three intermediate nodes: A4, A7, and A10. The substitute-path calculating unit 163 thus calculates the similarity between the target path RT and the first substitute candidate path in accordance with the similarities between A3 and A4, between A3 and A7, between A3 and A10, between A11 and A4, between A11 and A7, and between A11 and A10. For instance, the substitute-path calculating unit 163 may calculate the maximum value or average value of the foregoing six similarities as the similarity between the paths. Alternatively, the substitute-path calculating unit 163 may determine a first maximum value from the three similarities between A3 and A4, between A3 and A7, and between A3 and A10, as well as a second maximum value from the three similarities between A11 and A4, between A11 and A7, and between A11 and A10 and calculate the average value of the first maximum value and second maximum value as the similarity between the paths. Alternatively, the substitute-path calculating unit 163 may determine nodes that are targets for the similarity calculation, in view of the distance from the upstream node, and the number of stages counted from the downstream node. For instance, the node A3, which is one stage downstream of the upstream node, may undergo calculation of the similarity to the node A4, which is also one stage downstream of the upstream node. Other than the foregoing, the technique of calculating the similarity between the paths in accordance with the similarity between the nodes can be modified in various manners. The same applies to instances where the second substitute candidate path to the fourth substitute candidate path are targeted.

The substitute-path calculating unit 163 may determine, as the substitute path, a path similar to the target path RT from among the extracted substitute candidate paths RA. The substitute path calculating unit 163 may then redraw the path group by replacing the target path RT with the substitute path.

In Step S804, the substitute-path calculating unit 163 redraws the path group by replacing the target path RT with the substitute candidate path RA having the highest similarity. Let the similarity between the target path RT and third substitute candidate path be the highest for instance. In this case, the substitute-path calculating unit 163 redraws the path group by replacing the target path RT with the third substitute candidate path.

Figure 34:
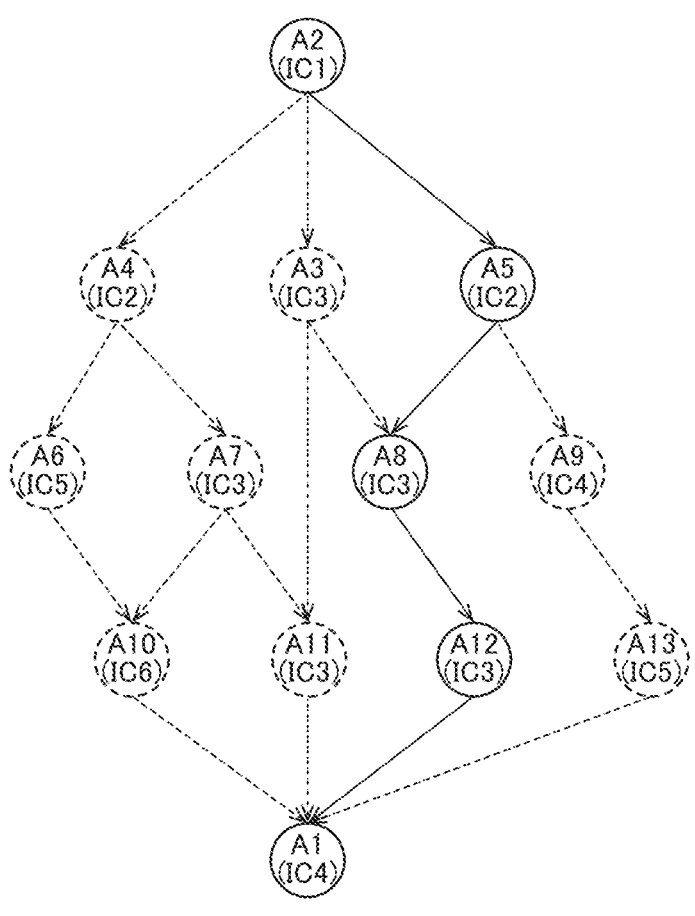
FIG. 34 is a schematic diagram illustrating a result of redrawing in the substitute-path calculating processing.

FIG. 34 is a schematic diagram illustrating a result of the redrawing in the substitute-path calculating processing. As illustrated in FIG. 34, as the result of the substitute-path calculating processing, the target path RT is replaced with the third substitute candidate path, tracking the nodes A2, A5, A8, A12, and A1 in the stated order.

The path group redrawn in Step 804 is displayed onto the display unit 240 in accordance with the processing executed by the presentation processing unit 115 (Step S508 in FIG. 16). At this time, only the replaced third substitute candidate path may be displayed onto the display unit 240. That is, only the nodes and links denoted by the solid lines in FIG. 34 may be displayed. The target path RT does not have to be displayed onto the display unit 240.

It is noted that the foregoing has described an example where the substitute-path calculating unit 163 determines a path similar to the target path RT from among the extracted substitute candidate paths RA as the substitute path and replaces the target path RT with the substitute path. However, the substitute-path calculating unit 163 does not necessarily have to determine a single substitute path. For instance, the substitute-path calculating unit 163 may replace all the substitute candidate paths RA extracted in Step S801 with the target path RT. In this case, a plurality of substitute paths are redrawn and displayed onto the display unit 240.

The substitute-path calculating processing allows the user to know a substitute path for the target path RT. Accordingly, when, for instance, a company represented by a specific node in the target path is excluded from the supply chain for some reason, the user can know a substitute supply chain. Further, when, as described in this embodiment, a substitute path similar to the target path RT is calculated and displayed onto the display unit 240, the user can know a supply chain similar to the target path RT. Hence, assuming a case where, for instance, a specific path is not available, the user can easily find out a path that is to be substituted for the specific path.

2.4.6 Presentation Processing

The presentation processing unit 115 executes presentation processing to present a path group extracted by the path extracting unit 113. The presentation processing unit 115 may present a path group redrawn by the redrawing unit 116. The presentation processing unit 115 can present various kinds of information on the path group. For instance, the presentation processing unit 115 can present information on the names of companies represented by the nodes included in the path group, and information on the industrial classifications provided to the respective nodes. The presentation processing unit 115 may present, in a comparable manner, a path group before redrawn by the redrawing unit 116 and a path group after redrawn by the redrawing unit 116. For instance, the presentation processing unit 115 may present the path group before redrawn by the redrawing unit 116 and the path group after redrawn by the redrawing unit 116 side by side.

As described above, the information processing system 10 according to the present disclosure is configured such that the redrawing unit 116 can redraw a path extracted by the path extracting unit 113. In the example described in the embodiment, the redrawing unit 116 can redraw the extracted path by executing the delete processing, the node adding processing, or the substitute-path calculating processing in accordance with a user's operation input. Thus, the information processing system 10 can perform more than information display; in response to a user's operation input, the information processing system 10 can display information required by the user.

It is noted that the embodiment has described an instance where the subnetwork 122 extracted by the subnetwork extracting unit 112 is an upstream subnetwork. However, even when the subnetwork 122 is a downstream subnetwork, the information processing system 10 can redraw a path extracted by the path extracting unit 113 by executing processing corresponding to the foregoing processing.

3. Inference of Network Structure

The foregoing has described an instance where similarity calculated using complex vector representations is used in processing, such as node deletion, node addition, and substitute-path calculation. However, the processing in this embodiment is not limited to the foregoing; the similarity may be used in inferring a main path, or inferring the structure of the supply chain network 121.

Figure 35:
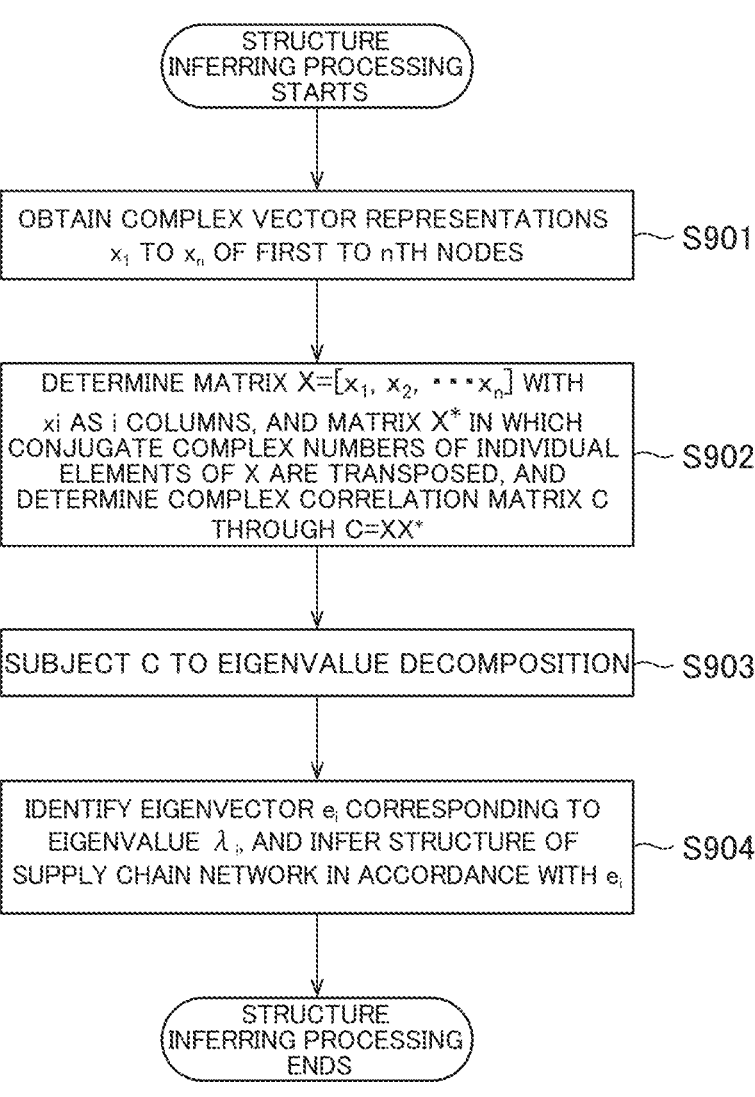
FIG. 35 is a flowchart showing structure inferring processing.

FIG. 35 is flowchart showing structure inferring processing. In the first process step, i.e., Step S901, the matrix obtaining unit 181 obtains the complex vector representation of each of the first to $n^{th}$ nodes included in the supply chain network 121. Hereinafter, a complex vector corresponding to the ith (i is an integer satisfying $1 \leq i \leq n$) node will be referred to as $x_i$. For instance, the vector obtaining unit 117 executes the processing shown in FIGS. 11A and 11B by using the individual first to $n^{th}$ nodes as selected nodes, to thus determine complex vectors $x_i$ to $x_n$, and the vector obtaining unit 117 stores the determined complex vectors $x_1$ to $x_n$ into the storage unit 120. The complex vectors $x_1$ to $x_n$ are each an n-dimensional complex vector. Then, the matrix obtaining unit 181 reads the complex vectors $x_1$ to $x_n$ from the storage unit 120, to thus execute the processing in Step S901.

In Step S902, the matrix obtaining unit 181 obtains a matrix $X=[x_1, x_2, \ldots, x_n]$ in which $x_1$ to $x_n$ are arranged in predetermined order. The matrix obtaining unit 181 also determines a matrix (complex conjugate transposition) $X^*$ in which conjugate complex numbers of the individual elements of the matrix X are transposed. It is noted that the order of arrangement of n nodes included in the supply chain network 121 is the same as the order of determining the complex vector representations.

The matrix obtaining unit 181 then determines the complex correlation matrix C through $C=XX^*$. Each component of C corresponds to the Hermitian inner product of two complex vectors and is thus information corresponding to the similarity expressed by Expression (3) above. Thus, C can be used as the complex correlation matrix C indicating the inter-node correlation between the first to $n^{th}$ nodes in the supply chain network 121.

The main-path inferring unit 182 then executes processing to infer the main path in the supply chain network 121 by subjecting the complex correlation matrix C to eigenvalue decomposition. To be specific, the main-path inferring unit 182 in Step 903 subjects the complex correlation matrix C to eigenvalue decomposition. To be specific, the main-path inferring unit 182 subjects, through $C=VAV^{-1}$, the complex correlation matrix C to decomposition into a matrix V with an eigenvector as a column vector, and into a diagonal matrix A with an eigenvalue as a diagonal component. Hereinafter, n eigenvalues will be denoted as $\lambda_1$ to $\lambda_n$, and n eigenvectors corresponding to the respective eigenvalues will be denoted as $e_1$ to $e_n$.

The main-path inferring unit 182 infers the main path in the supply chain network 121 in accordance with the eigenvector corresponding to the eigenvalue obtained through the eigenvalue decomposition. To be specific, in Step S904, the main-path inferring unit 182 infers an eigenvector $e_i$ in accordance with the result of the eigenvalue decomposition and infers a path identified by $e_i$ as the main path.

FIG. 36 illustrates an ith eigenvector $e_i$ obtained by subjecting the complex correlation matrix C to the eigenvalue decomposition when, for instance, n=14 is satisfied. As illustrated in FIG. 36, the eigenvector $e_i$ according to this embodiment is a complex vector whose elements are each a complex number. In the example illustrated in FIG. 36, the first, third, eighth, twelfth, and fourteenth elements of $e_i$ are non-zero elements, and the other elements are zero elements.

The main-path inferring unit 182 in this case determines that a path passing through the nodes 1, 3, 8, 12, and 14, corresponding to the non-zero elements, is a main path representing the feature of the supply chain network 121 according to this embodiment well.

The main-path inferring unit 182 according to this embodiment may determine an eigenvector having complex numbers as elements and infer a main path whose order is determined based on the phases of the elements included in the eigenvector. For instance, when the vectorial representation of each node is a real vector, the complex correlation matrix C is a matrix having real numbers as components, and thus, the eigenvector is also a real vector. In this case, it may be possible to identify the nodes included in the main path, but it is impossible to identify their order. For instance, even though that the nodes 1, 3, 8, 12, and 14 are included in the main path is successfully identified, the order of these five nodes remains unclear. In the technique in this embodiment by contrast, each element of the eigenvector $e_i$ is a complex number, as illustrated in FIG. 36, and thus contains phase information. In the technique in this embodiment, the phase of a complex number is information indicating the number of stages counted from a selected node. Thus, the main-path inferring unit 182, which not only can identify the nodes included in the main path, but also can identify their specific order, can obtain information that is more suitable for the analysis of the supply chain network 121.

The example in FIG. 36 shows that the node 8 whose phase stands at zero corresponds to the selected node, that the node 3 is one stage upstream of the node 8, and that the node 1 is two stages upstream of the node 8. Likewise, the example shows that the node 12 is one stage downstream of the node 8, and that the node 14 is two stages downstream of the node 8. Thus, in accordance with the eigenvector $e_i$ illustrated in FIG. 36, the main-path inferring unit 182 determines that a path where the node 1, the node 3, the node 8, the node 12, and the node 14 are arranged in the stated order is the main path.

Figure 37:
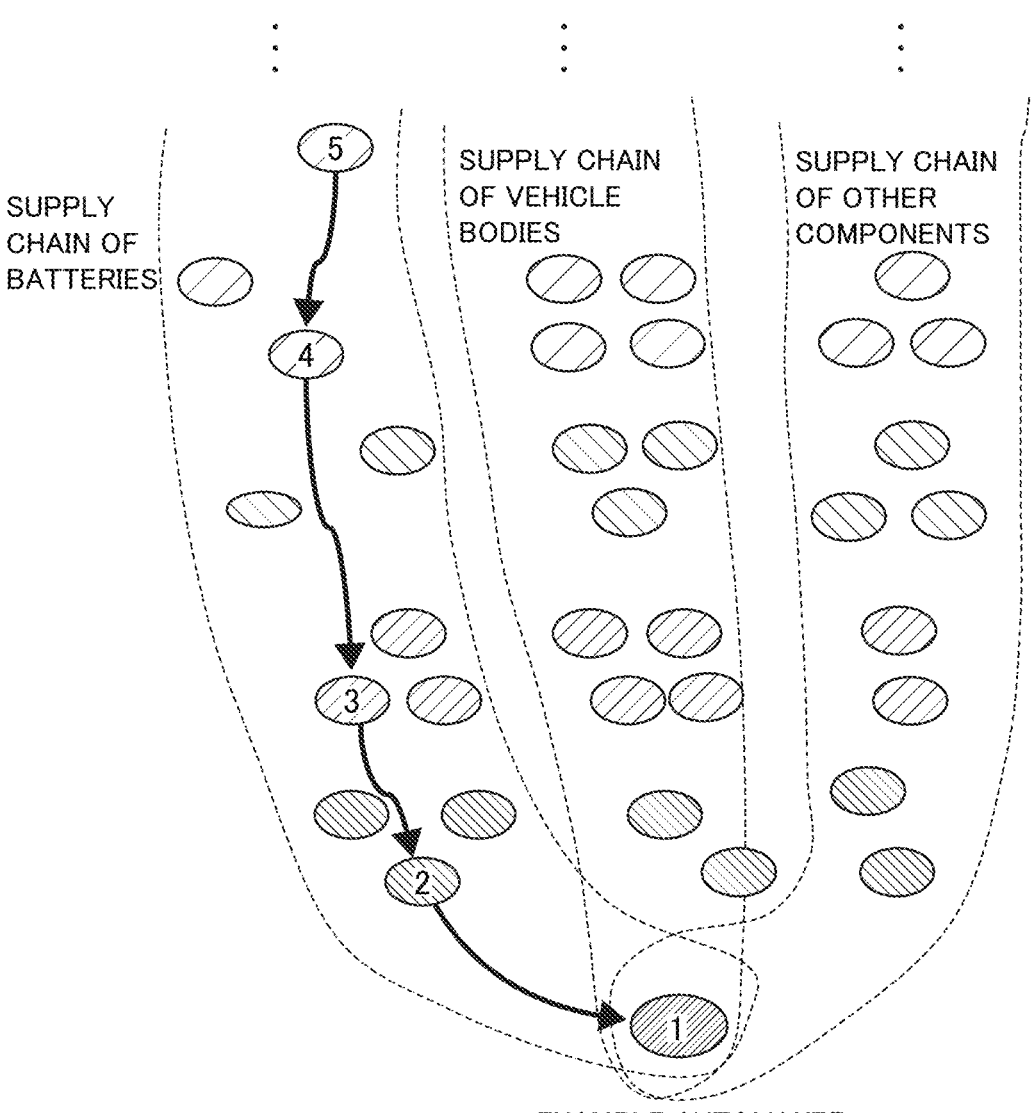
FIG. 37 is a schematic diagram illustrating a specific example of structure inference.

In addition, the main-path inferring unit 182 may infer the structure of the supply chain network 121 in accordance with the inferred main path. FIG. 37 is a schematic diagram illustrating structure inferring processing on the supply chain network 121 in this embodiment. For instance, let the node 1 corresponding to an automaker be positioned in a given location in the supply chain network 121, and let a path including this node 1 be determined as the main path.

The automaker herein buys various components that are used for motor vehicles from companies corresponding to its upstream nodes. For instance, the automaker buys batteries, vehicle bodies, and other components and manufactures motor vehicles including them. In this case, the paths directed from the upstream nodes to the node 1 can be roughly classified into, but not limited to, a path related to the supply chain of the batteries, a path related to the supply chain of the vehicle bodies, and a path related to the supply chain of the other components.

For instance, for a manufacturer that manufactures a given end product, a plurality of eigenvectors obtained by subjecting the complex correlation matrix C to the eigenvalue decomposition may be classified in accordance with components or raw materials necessary for manufacturing this end product. For instance, in response to identification of a plurality of paths including the end product manufacturer as paths represented by the eigenvectors, the main-path inferring unit 182 may infer a supply chain for supplying a first component, and a supply chain for supplying a second component different from the first component in accordance with these paths. In the wider sense, the main-path inferring unit 182 may execute structure inferring processing to identify a plurality of main paths each belonging to one of different industries in accordance with a plurality of inferred main paths. The supply chain network 121 including a manufacturer, like an automaker, that is supplied with a plurality of components and materials to manufacture an end product tends to be a complicated structure with numerous nodes. On that point, the technique in this embodiment can classify the supply chain network 121 for each component and each industry and can thus decompose a supply chain structure in such a manner as to be easily understood by the user. Furthermore, companies serving as a leading role in the supply of a certain component and of a certain material can be identified as well, by comparing the absolute values of elements corresponding to the nodes.

Furthermore, in this embodiment, the order of the nodes within a main path and the distance between the nodes within the main path can be identified as well, as described with reference to, for instance, the nodes 1 to 5 in FIG. 37. For instance, the main-path inferring unit 182 may infer whether a company is located upstream or downstream in a supply chain in accordance with this inter-node distance.

For instance, the main-path inferring unit 182 may determine whether a company included in a main path is a company involved in a commodity that is close to an end product, or a company involved in a commodity that is close to a component or a raw material. In the example in FIG. 37, the node 5, which is distant from the node 1, is determined to be a company involved in a commodity that is close to a component or a raw material, and the node 2, which is close from the node 1, is determined to be a company involved in a commodity that is close to an end product. For instance, the main-path inferring unit 182 may infer that a company one stage upstream of a manufacturer that manufactures an end product is a company that sells, but not limited to, a component that is incorporated directly into the end product, or a manufacturing machine that is used directly in manufacturing the end product.

Further, the delete processing unit 161, the node adding unit 162, and the substitute-path calculating unit 163 may determine a path group that is to be presented, in accordance with an inference made by the main-path inferring unit 182. For instance, for a path group being presented where the first company is the node 1 (motor vehicle company) in FIG. 37, and where the second company is an upstream company in the supply chain of butteries, let a substitute path need to be presented due to a path partial deletion or other reasons. In this case, the delete processing unit 161 and other units may display a path including a company included in the main path as the substitute path in accordance with the phase difference (the number of stages) between a company that is to be deleted and the first company.

For instance, let a user's operation input be an input to delete a company two stages upstream of the first company. As illustrated in FIG. 37, in accordance with the processing executed by the structure inferring unit 118, the company corresponding to the node 3 is inferred to be a company located two stages upstream of the node 1 in the main path. Thus, the delete processing unit 161 and the substitute-path calculating unit 163 may execute processing to present a path including the nodes corresponding to the first and second companies, and the node 3. Doing so enables a company included in the main path, that is, a company inferred to be more important than the other companies to be determined preferentially as a target for presentation. In so doing, a company suitable as a substitute for the company that is to be deleted can be selected, because a phase (the number of stages) is reflected. For instance, in a supply chain for supplying a specific component or a specific material, a company that highly probably functions similarly to the company that is to be deleted can be used as the substitute company.

This embodiment has been detailed as described above. A person skilled in the art will readily appreciate that many modifications are possible without substantially departing from the new matter and advantageous effects of the present embodiment. Accordingly, all such modifications are included in the scope of the present disclosure. For instance, terms that appear at least once in the Specification or in the drawings along with other broader or synonymous terms can be replaced with the other broader or synonymous terms in any part of the Specification or the drawings. Further, all combinations of this embodiment and its modifications are encompassed in the scope of the present disclosure. Furthermore, the configurations and operations of the information processing system, the server system, the terminal device, and others are not limited to those described in this embodiment, and various modifications are possible.

Further, the technique in this embodiment is applicable to a method of information processing including process steps described below. The method of information processing includes the following steps: obtaining the supply chain network 121; extracting the subnetwork 122 of a processing target node; determining a complex vector representing the processing target node in accordance with the subnetwork 122; and calculating the similarity between nodes in accordance with two complex vectors. The step of obtaining the supply chain network 121 includes obtaining a supply chain network in which a plurality of nodes each corresponding to one of a plurality of companies are connected together though links each representing a trading relationship in which a supply source company of a product is associated with a supply destination company of the product. The step of extracting the subnetwork 122 includes extracting, from the supply chain network 121, the subnetwork 122 including at least one of an upstream subnetwork, which includes an upstream company that supplies the product to a company corresponding to the processing target node among the plurality of companies, and a downstream subnetwork, which includes a downstream company that is supplied with the product from the company corresponding to the processing target node. The step of determining the complex vector includes determining the complex vector representing the processing target node by assigning, to each of the plurality of nodes included in the subnetwork of the processing target node, a complex number having a phase corresponding to the distance to the processing target node, and having an absolute value corresponding to the amount of flow going to or coming from the processing target node. The step of calculating the similarity includes calculating the similarity between two of the plurality of nodes in accordance with the two complex vectors corresponding to the two nodes.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An information processing system comprising:

a hardware processor configured to:

obtain a supply chain network in which a plurality of nodes each corresponding to one of a plurality of companies are connected together through links each representing a trading relationship in which a supply source company of a product is associated with a supply destination company of the product;

extract, from the supply chain network, a subnetwork including at least one of an upstream subnetwork and a downstream subnetwork, the upstream subnetwork including an upstream company that supplies the product to a company corresponding to a processing target node among the plurality of companies, the downstream subnetwork including a downstream company that is supplied with the product from the company corresponding to the processing target node;

determine a complex vector representing the processing target node by assigning, to each of the plurality of nodes included in the subnetwork of the processing target node, a complex number having a phase corresponding to a distance to the processing target node, and having an absolute value corresponding to an amount of flow going to or coming from the processing target node; and calculate a similarity between two of the plurality of nodes in accordance with the two complex vectors corresponding to the two nodes, wherein the plurality of nodes includes first to $n^{th}$ nodes, where n is an integer equal to or greater than two, the complex vector corresponding to an $i^{th}$ node is defined as $x_i$, where i is an integer satisfying $1 \leq i \leq n$, a number of the plurality of nodes is in the order of thousands or more, and the hardware processor is configured to:

determine a matrix $X = [x_1, x_2, \ldots, x_n]$ in which the complex vectors corresponding to the first to $n^{th}$ nodes are arranged, and a matrix $X^*$ in which conjugate complex numbers of individual elements of the matrix X are transposed, and to determine a complex correlation matrix C through $C = XX^*$; and infer a main path in the supply chain network by subjecting the complex correlation matrix C to eigenvalue decomposition.

2. The information processing system according to claim 1, wherein the hardware processor is configured to:

determine a Hermitian inner product of a first complex vector and a second complex vector that are the two complex vectors, and a norm product of the first complex vector and the second complex vector, and calculate the similarity in accordance with a real part of a ratio between the Hermitian inner product and the norm product.

3. The information processing system according to claim 1, wherein the hardware processor is configured to infer the main path in accordance with an eigenvector corresponding to an eigenvalue obtained through the eigenvalue decomposition.

4. The information processing system according to claim 3, wherein the hardware processor is configured to determine the eigenvector having complex numbers as elements and infer the main path whose order is determined based on phases of the elements included in the eigenvector.

5. The information processing system according to claim 1, wherein the hardware processor is configured to infer a structure of the supply chain network in accordance with the main path.

6. The information processing system according to claim 1, wherein the hardware processor is configured to:

extract a path group including one or more paths connecting a node representing a first company and a node representing a second company different from the first company together through one or more of the links;

receive an operation input for redrawing of the one or more paths; and redraw the path group extracted by the path extracting unit.

7. The information processing system according to claim 6, wherein in response to the operation input to delete at least of one of the plurality of nodes included in the path group, the hardware processor is configured to redraw the path group including a substitute node with the similarity to a delete target node standing at a predetermined threshold or greater.

8. The information processing system according to claim 6, wherein in response to the operation input to add an additional node to the path group by connecting, through a link, a node of a company not included in the path group to at least of one of the plurality of nodes included in the path group, the hardware processor is configured to redraw the path group including the additional node by extracting candidate nodes that are to be possibly connected to the additional node through the link, and by connecting, through the link, any one of the candidate nodes selected based on the similarity to the additional node.

9. The information processing system according to claim 8, wherein in accordance with the similarity between each of the candidate nodes and another node included in the supply chain network, the hardware processor is configured to calculate an index indicating a likelihood that a virtual local graph appears in the supply chain network, the virtual local graph being formed when the additional node is connected to the candidate node, and determine a node that is to be connected to the additional node in accordance with the index.

10. A method of information processing performed by a hardware processor, comprising:

obtaining a supply chain network in which a plurality of nodes each corresponding to one of a plurality of companies are connected together through links each representing a trading relationship in which a supply source company of a product is associated with a supply destination company of the product;

extracting, from the supply chain network, a subnetwork including at least one of an upstream subnetwork and a downstream subnetwork, the upstream subnetwork including an upstream company that supplies the product to a company corresponding to a processing target node among the plurality of companies, the downstream subnetwork including a downstream company that is supplied with the product from the company corresponding to the processing target node;

determining a complex vector representing the processing target node by assigning, to each of the plurality of nodes included in the subnetwork of the processing target node, a complex number having a phase corresponding to a distance to the processing target node, and having an absolute value corresponding to an amount of flow going to or coming from the processing target node; and calculating a similarity between two of the plurality of nodes in accordance with the two complex vectors corresponding to the two nodes, wherein the plurality of nodes includes first to $n^{th}$ nodes, where n is an integer equal to or greater than two, the complex vector corresponding to an $i^{th}$ node is defined as $x_i$, where i is an integer satisfying $1 \leq i \leq n$, a number of the plurality of nodes is in the order of thousands or more, and the method comprises:

determining a matrix $X=[x_1, x_2, \ldots, x_n]$ in which the complex vectors corresponding to the first to $n^{th}$ nodes are arranged, and a matrix $X^*$ in which conjugate complex numbers of individual elements of the matrix X are transposed, and to determine a complex correlation matrix C through $C=XX^*$; and inferring a main path in the supply chain network by subjecting the complex correlation matrix C to eigenvalue decomposition.

\* \* \* \* \*